(12) United States Patent
Nishiyama et al.

(10) Patent No.: US 7,630,538 B2
(45) Date of Patent: Dec. 8, 2009

(54) CONFOCAL SCANNING MICROSCOPE

(75) Inventors: Yasuo Nishiyama, Tokyo (JP); Tadashi Haraguchi, Tokyo (JP); Shigeru Kanegae, Ina (JP)

(73) Assignee: Olympus Corporation, Tokyo (JP)

( * ) Notice: Subject to any disclaimer, the term of this patent is extended or adjusted under 35 U.S.C. 154(b) by 1193 days.

(21) Appl. No.: 10/833,234

(22) Filed: Apr. 27, 2004

(65) Prior Publication Data

US 2004/0238731 A1 Dec. 2, 2004

Related U.S. Application Data

(63) Continuation of application No. PCT/JP02/11204, filed on Oct. 29, 2002.

(30) Foreign Application Priority Data

| Nov. 2, 2001 | (JP) | ............................. 2001-338216 |
| Dec. 3, 2001 | (JP) | ............................. 2001-368545 |
| Dec. 6, 2001 | (JP) | ............................. 2001-372860 |

(51) Int. Cl.
G06K 9/00 (2006.01)
G02B 21/00 (2006.01)
(52) U.S. Cl. ..................... 382/154; 382/162; 359/368
(58) Field of Classification Search ....................... None
See application file for complete search history.

(56) References Cited

U.S. PATENT DOCUMENTS 5,127,730 A * 7/1992 Brelje et al. ................. 356/318
5,612,818 A * 3/1997 Kumagai et al. ............. 359/385
6,337,474 B1 * 1/2002 Morizono ................. 250/208.1
6,583,397 B2 * 6/2003 Vo-Dinh ................... 250/201.5
2004/0196365 A1 * 10/2004 Green et al. .................. 348/79

FOREIGN PATENT DOCUMENTS

| JP | 11-14917 | 1/1999 |
| JP | 11-84264 | 3/1999 |
| JP | 11-174332 | 7/1999 |
| JP | 2001-56438 | 2/2001 |
| JP | 2001-82935 | 3/2001 |

* cited by examiner

*Primary Examiner*—Charles Kim
(74) *Attorney, Agent, or Firm*—Scully, Scott, Murphy & Presser, P.C.

(57) ABSTRACT

A confocal scanning microscope obtains an observed image of a sample while changing the focal-plane of the sample in the optical axial direction, and generates a three-dimensional image or an image of a large depth of focus of the sample. It includes a capture unit for performing a photoelectric conversion on the light from the sample and outputting a plurality of brightness signals having different wavelength bands of light; a selection unit for selecting a brightness signal having the optimum wavelength band from among the plurality of brightness signals of different wavelength bands of light output from the capture unit; and an image forming unit for generating a three-dimensional image or an image of a large depth of focus of the sample using a brightness signal having the optimum wavelength band selected by the selection unit.

10 Claims, 54 Drawing Sheets

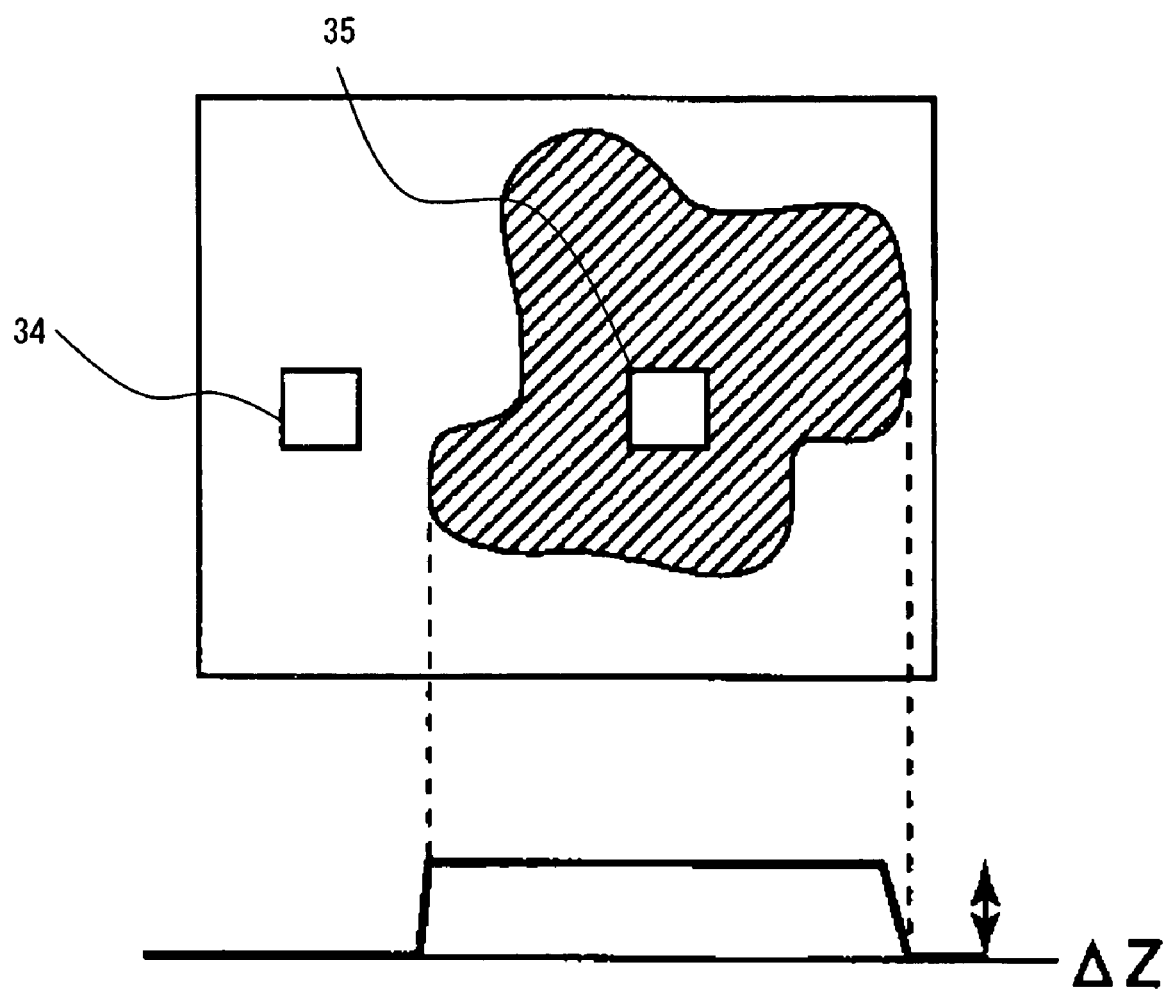
F I G. 10

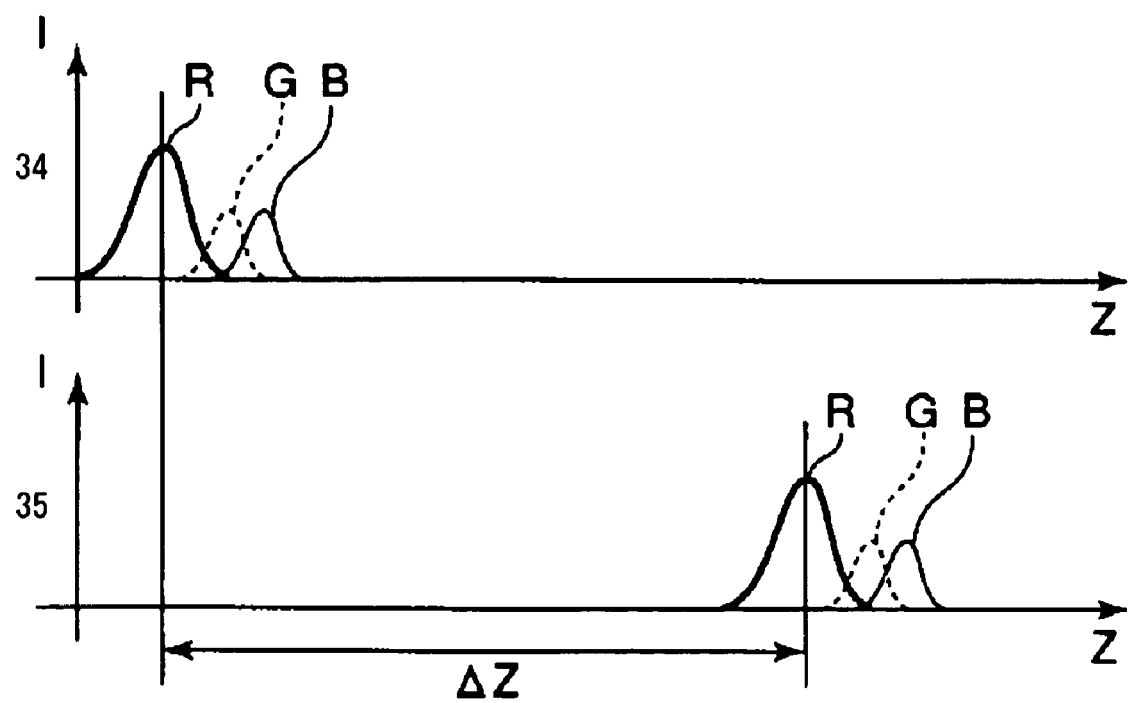
F I G. 1 2

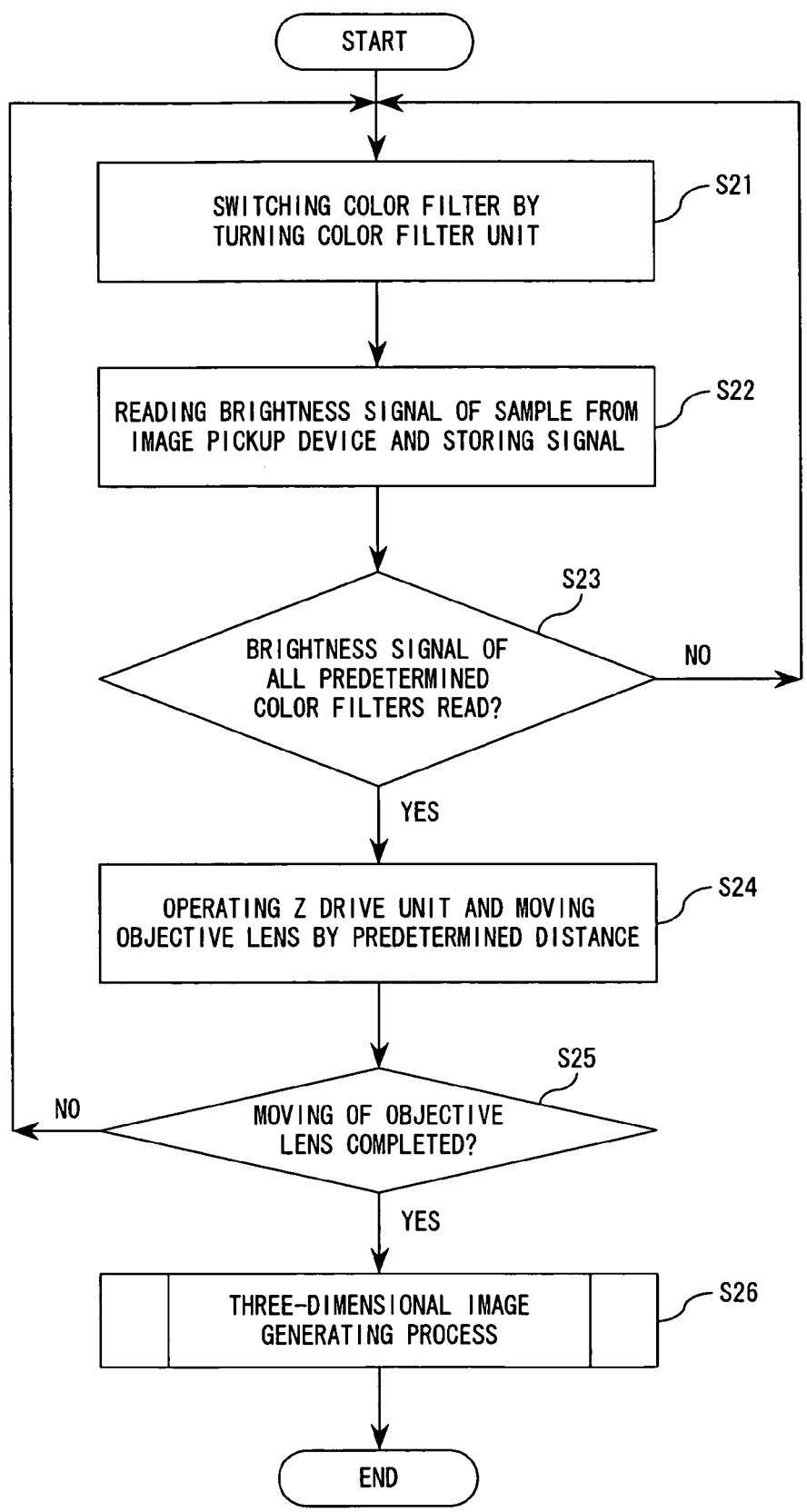
F I G. 1 7

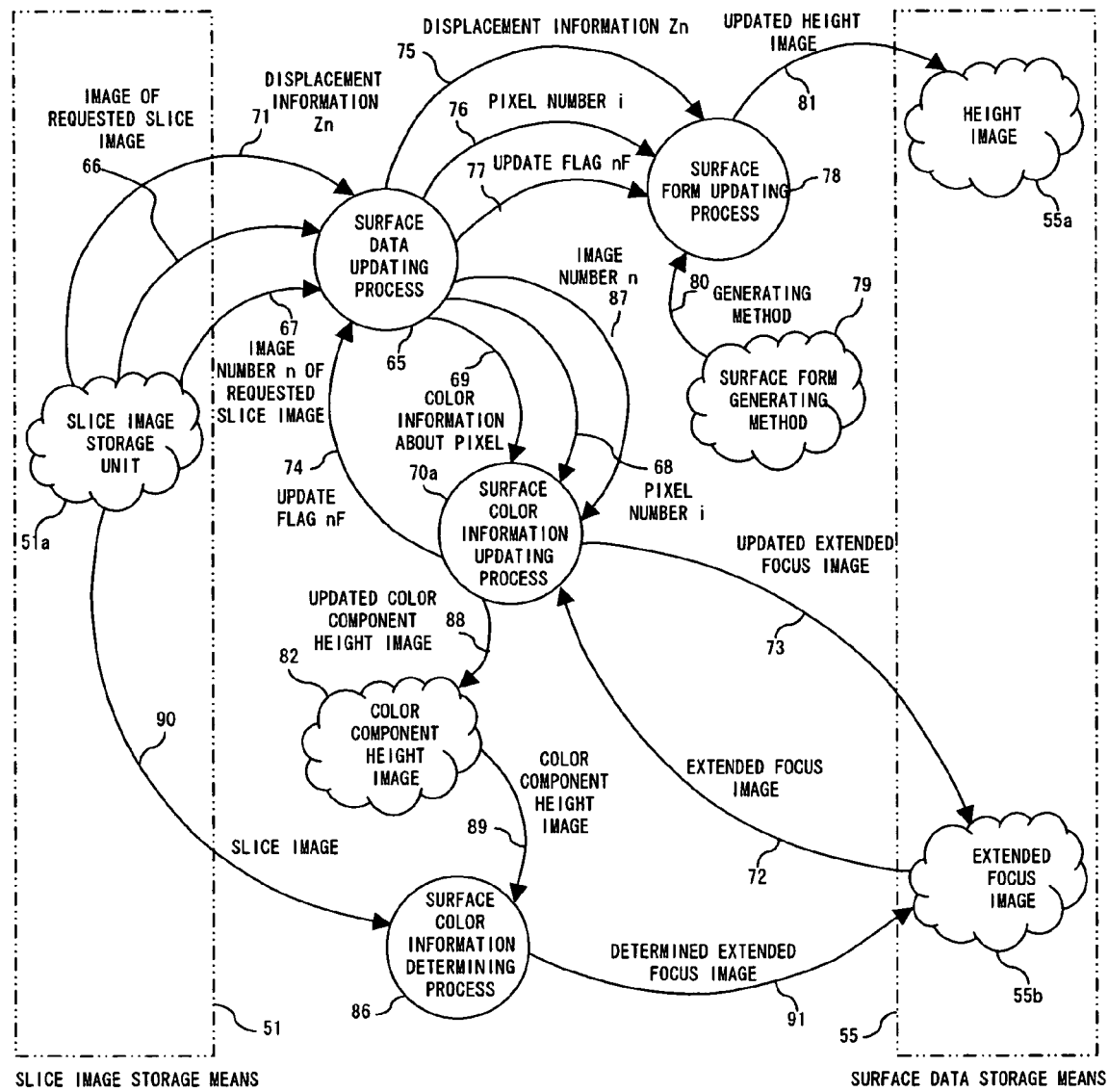
F I G. 3 2

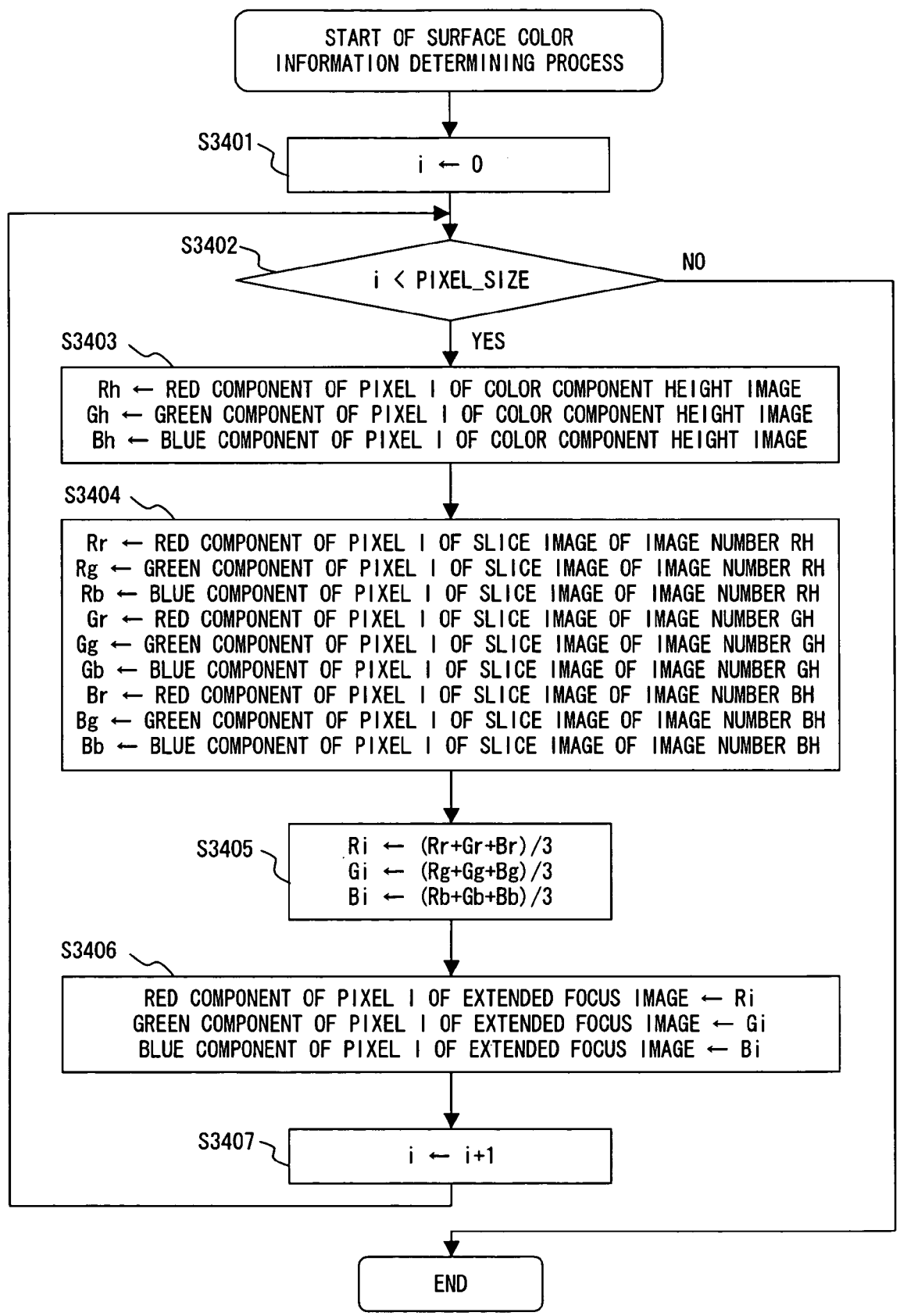
F I G. 3 4

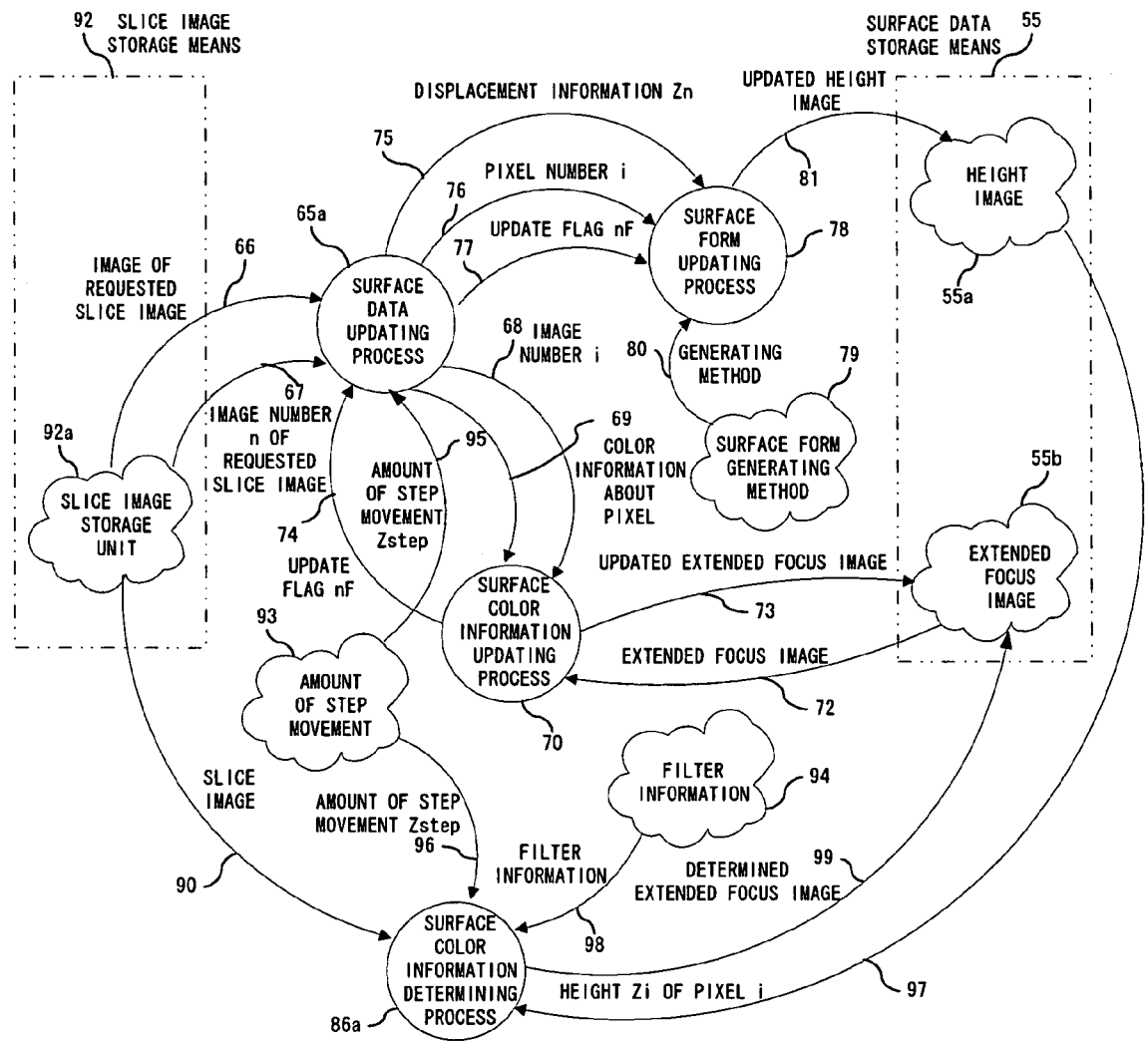
F I G. 3 7

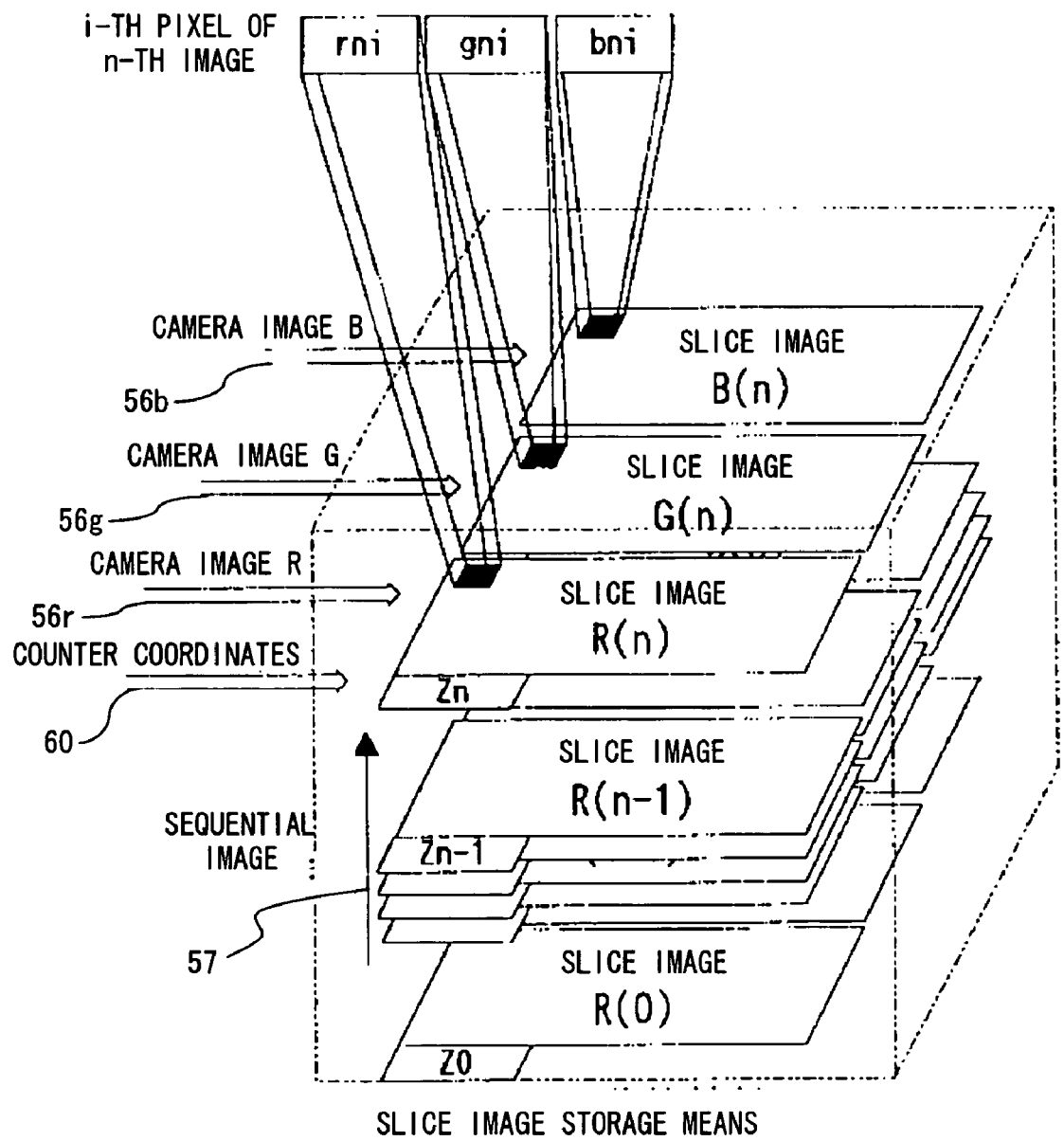
F I G. 4 1

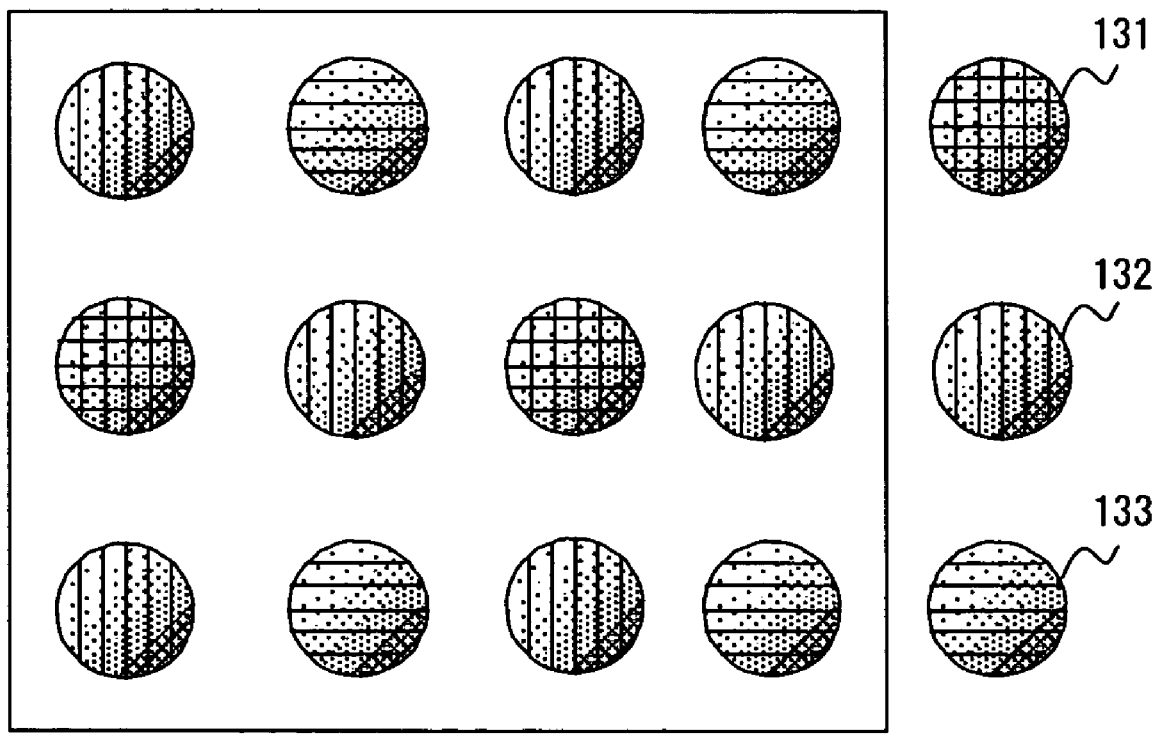
F I G. 4 5

CONFOCAL SCANNING MICROSCOPE

CROSS REFERENCE TO RELATED APPLICATIONS

This is a Continuation Application of PCT Application No. PCT/JP02/11204, filed Oct. 29, 2002, which was not published under PCT Article 21(2) in English.

This application is based upon and claims the benefit of priority from the prior Japanese Patent Applications No. 2001-338216, filed Nov. 2, 2001; No. 2001-372860, filed Dec. 6, 2001; and No. 2001-368545, filed Dec. 3, 2001, the entire contents of both of which are incorporated herein by reference.

BACKGROUND OF THE INVENTION

1. Field of the Invention

The present invention relates to the technology of a confocal scanning microscope using a confocal effect, and also to the three-dimensional measurement technology for obtaining the surface data of a sample using an image of a color-captured sample (including a measured object) through a confocal optical system. It also relates to the technology of selecting as the measuring range of the sample a predetermined area of a three-dimensional confocal microscope having color information depending on the sample obtained by the confocal scanning microscope.

2. Description of the Related Art

Generally, two types of confocal scanning microscopes, that is, a confocal disk scanning microscope and a confocal laser scanning microscope, are well known. The confocal disk scanning microscope is not only higher in horizontal resolution than a common microscope, but also is higher in sectioning effect in the optical axial direction (hereinafter also referred to as a "Z direction") of a sample. Based on these characteristics, it can be used with an image processing apparatus to generate the sample as a three-dimensional image.

FIG. 1 shows the configuration of the conventional confocal disk scanning microscope.

In FIG. 1, the illuminating light is emitted from a light source 1 enters a half mirror 3 through a collimator lens 2, reflected by the mirror, and illuminates a rotary disk 4. The rotary disk 4 can be a Nipkow disk for which a plurality of pinholes are provided in a spiral manner, a disk having a slit pattern, etc. In this example, a Nipkow disk is used, and the rotary disk 4 is attached to a rotation axis 5a of a motor 5, and rotates at a predetermined rotation speed. Therefore, the illuminating light irradiating the rotary disk 4 transmits through a plurality of pinholes formed in the rotary disk 4, and is formed as an image on a sample 7 by an objective lens 6.

The reflected light from the sample 7 passes through the objective lens 6 and the pinholes of the rotary disk 4, and transmits through the half mirror 3, and is formed as an image on a capture unit 9 by a converging lens 8. The capture unit 9 captures the reflected light from the sample 7, and outputs the brightness signal to a computer 10.

The computer 10 captures the brightness signal output from the capture unit 9, stores it, performs image processing, obtains predetermined image data, displays it on a monitor 11, simultaneously outputs a drive signal to a Z drive unit 12, moves all or a part of the optical system and the sample relatively in the optical axial direction, and changes the focal-plane position (focal position) of the sample. In this example, only the objective lens 6 is moved, but, for example, a stage loaded with the sample 7 can be moved in the optical axial direction. Then, the focal-plane position which is position information in the Z direction is associated with the above-mentioned image data and stored in the computer 10.

With the above-mentioned configuration, the confocal disk scanning microscope changes the amount of incident light to the capture unit 9 by moving the objective lens 6, and marks the maximum amount of incident light (brightness) when focus is achieved on the surface of the sample. Since each pixel of the image pickup device in the capture unit 9 outputs a brightness signal corresponding to the amount of light from each position of the sample 7, the three-dimensional shape of the sample 7 can be obtained by obtaining the position in the z direction of the highest brightness of each pixel, and an image can be generated only by the maximum brightness value of each pixel, thereby generating an image having a large depth of focus with focus achieved on the entire surface of the sample 7.

FIG. 2 shows the configuration of the conventional confocal laser scanning microscope.

In FIG. 2, the light emitted from a light source 13 transmits through a beam splitter 14, and enters a two-dimensional scanning mechanism 15. The two-dimensional scanning mechanism 15 includes a first optical scanner (X scanner) 15a and a second optical scanner (Y scanner) 15b, and each of the optical scanners 15a and 15b performs optical scanning using optical flux in a two-dimensional manner. By leading the optical flux to an objective lens 16, the optical flux enters the objective lens 16, converges by the objective lens 16, and scans the surface of a sample 17 in a two-dimensional manner. The light from the surface of the sample 17 passes through the objective lens 16 again, reaches the beam splitter 14 through the two-dimensional scanning mechanism 15, is reflected by the beam splitter 14 and converged on pinholes 19 by an imaging lens 18. Since the pinholes 19 are located in a position optically conjugate with the converging position, the light from the sample 17 is converged on the pinholes 19 and passes through the pinholes 19 when the sample 17 is in the converging position of the objective lens 16, but is not converged on the pinholes 19 and does not pass through the pinhole 19 when the sample 17 is not in the converging position of the objective lens 16. Therefore, the light from the sample 17 cannot pass through the pinholes 19 on the points other than the converging point of the objective lens, and only the light passing through the pinholes 19 is detected by a photodetector 20. The sample 17 is placed on a sample mount 22 corresponding to the X and Y stages, and can be moved by a Z stage 23 in the optical axial direction. The two-dimensional scanning mechanism 15, the Z stage 23, and the photodetector 20 are controlled by a computer 21.

With the above-mentioned configuration, if the two-dimensional scanning mechanism 15 performs two-dimensional scanning and imaging the output of the photodetector 20 in synchronization with the two-dimensional scanning mechanism 15, then the imaging operation is performed only for the specific height of the sample 17, thereby obtaining an optically sliced image (confocal microscopic image) of the sample 17. Furthermore, by discretely moving the sample 17 in the optical axial direction (Z direction) by the Z stage 23, operating the two-dimensional scanning mechanism 15 in each position to obtain a confocal microscopic image, and detecting the position of the Z stage 23 in which the output (brightness value) of the photodetector 20 is the highest at each point of the sample surface, the surface form (surface form information, height information) of the sample 17 can be obtained, and a three-dimensional image (three-dimensional confocal microscopic image) can be obtained depending on the surface form. Furthermore, by forming an image only with the output of the photodetector 20 which indicates the highest value at each point of the sample surface, an image having a large depth of focus with focus achieved on the entire surface of the sample 17.

To obtain a clear and high precision image with the above-mentioned confocal scanning microscope, it is necessary to have a steep curve (hereinafter referred to also as an "I-Z curve") indicating the relationship between the brightness value and the position in the Z direction.

FIGS. 3 and 4 show an example of an I-Z curve obtained by the above-mentioned confocal disk scanning microscope.

FIG. 3 shows an I-Z curve of the wavelength of green (G) as a characteristic in a narrow wavelength band. In FIG. 3, the peak of the brightness value indicating the highest brightness can be clearly discriminated. On the other hand, when the wavelength band of the illuminating light is not limited in a normal optical system, an obtained I-Z curve indicates a moderate peak mainly by the influence of the chromatic aberration generated by the objective lens 6. FIG. 4 shows the state in which there are different positions indicating the highest brightness of each wavelength of red (R), green (G), and blue (B) by the chromatic aberration of the lens, and the state in which the I-Z curve (white) of white light obtained by combining them has a moderate peak.

Therefore, using a narrow wavelength band by inserting a wavelength filter at the light source or in the capture unit, a steep I-Z curve can be obtained. In this case, the formed three-dimensional image is very precise.

FIG. 5 shows an example of another I-Z curve obtained with the confocal scanning microscope, and shows an example of an I-Z curve of each color component indicating an example of the relationship between the amount of displacement and the brightness value of a specific pixel of an image obtained by color-capturing the light of plural wavelengths from the sample surface through the confocal optical system while relatively displacing the focal-plane of the confocal optical system and the sample. The horizontal axis indicates the amount of displacement Z between the focal-plane of the confocal optical system and the sample, and the vertical axis indicates the brightness value I.

As shown in FIG. 5, the I-Z curve of each color component of R (red), G (green), and B (blue) color-captured by the color-capture unit indicates a different amplitude in brightness and peak position due to the optical characteristic on the surface of the sample, the wavelength dependence, and the aberration of the optical system. Each I-Z curve indicates a unimodal peak. The peak position matches the amount of displacement when focus is achieved on a small area of the sample surface. Therefore, as with other pixels within the vision, the peak position of the I-Z curve as shown in FIG. 5 can be detected, thereby obtaining the amount of displacement corresponding to the height of the surface in each position of the sample, and obtaining the surface form of the sample.

Thus, when the obtained surface form of a sample is observed, the surface form can be displayed in a three-dimensional array for easier visual recognition.

FIGS. 6, 7, and 8 show an example of the three-dimensional display method.

In FIGS. 6, 7, and 8, the method is to obtain a three-dimensional display of a sample colored as shown in FIG. 8 by coloring the three-dimensional display of the sample as shown in FIG. 7 using an observed image of the sample as shown in FIG. 6. As an observed image of a sample used in this example is an image of the sample surface with focus achieved in the entire position within the vision. That is, about the image, the color information in the peak position of the I-Z curve obtained in each position within the vision to obtain the surface form is the color information about the corresponding position within the vision.

Recently, as shown in FIGS. 6 through 8, there are some technologies of coloring an obtained three-dimensional image proposed to easily understand the correspondence with a sample. For example, Japanese Patent Application Laid-open No. 2001-82935 discloses the confocal color microscope for obtaining a three-dimensional color image (three-dimensional confocal color microscopic image) by combining a three-dimensional image depending on the surface form (surface form information) of the sample obtained by a confocal optical system with a color image according to the color information about a sample obtained by a nonconfocal optical system.

SUMMARY OF THE INVENTION

The confocal scanning microscope according to an aspect of the present invention obtains an observed image of a sample while changing the focal-plane of the sample in the optical axial direction, and generates a three-dimensional image or an image of a large depth of focus of the sample, and includes: a capture unit for performing a photoelectric conversion on the light from the sample and outputting a plurality of brightness signals having different wavelength bands of light; a selection unit for selecting a brightness signal having the optimum wavelength band from among the plurality of brightness signals of different wavelength bands of light output from the capture unit; and an image forming unit for generating a three-dimensional image or an image of a large depth of focus of the sample using a brightness signal having the optimum wavelength band selected by the selection unit.

BRIEF DESCRIPTION OF THE DRAWINGS

FIG. 10 is an explanatory view showing the method of generating a three-dimensional image of a sample by the confocal scanning microscope;

FIG. 12 is an explanatory view showing the method of generating a three-dimensional image of a sample by the confocal scanning microscope;

FIG. 17 is a flowchart showing the outline of the operation procedure of a computer;

FIG. 32 shows a data flow of the process relating to the surface data update unit according to the fifth embodiment of the present invention;

FIG. 34 is a flowchart showing the contents of the surface color information determining process;

FIG. 37 shows a data flow of the process relating to the surface data update unit according to the sixth embodiment of the present invention;

FIG. 41 shows another example of the configuration of the slice image storage unit;

FIG. 45 shows an example of a three-dimensional color image;

DESCRIPTION OF THE PREFERRED EMBODIMENT

The embodiments of the present invention are explained below by referring to the attached drawings.

First Embodiment

Figure 9:
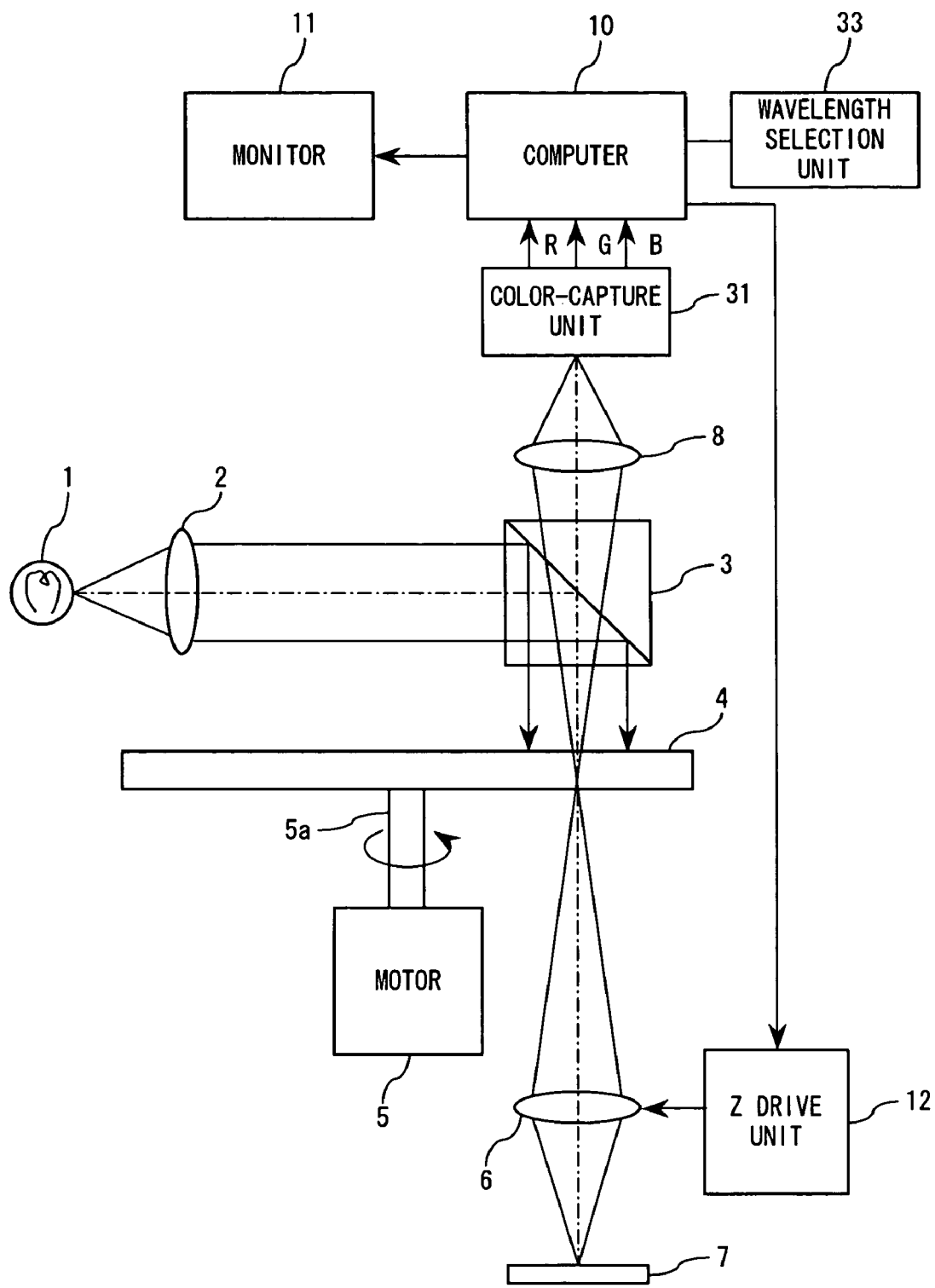
FIG. 9 shows the configuration of the confocal scanning microscope according to the first embodiment of the present invention.

FIG. 9 shows the configuration of the confocal scanning microscope according to the first embodiment of the present invention.

Figure 1:
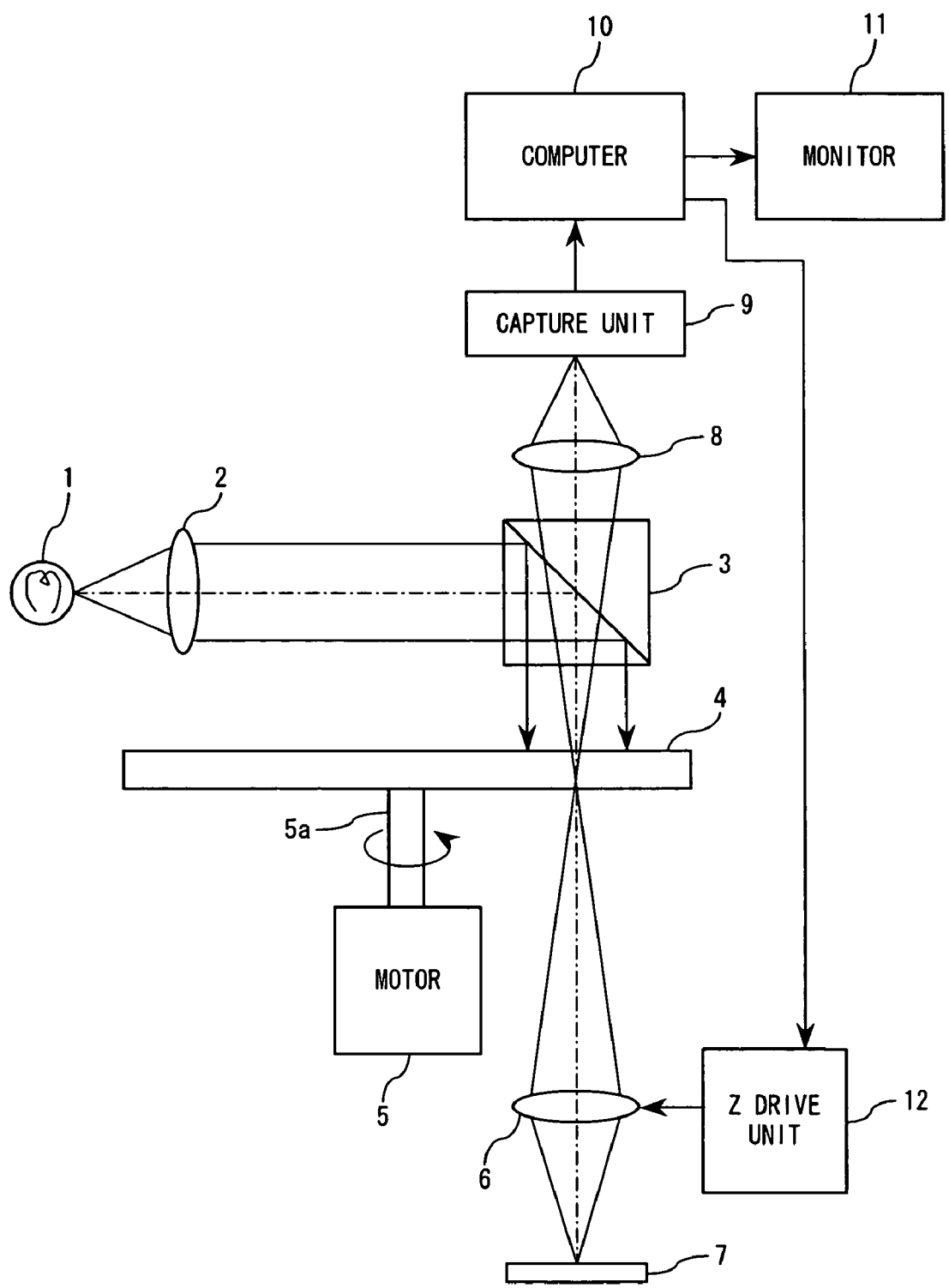
FIG. 1 shows the configuration of the conventional confocal disk scanning microscope.
Figure 2:
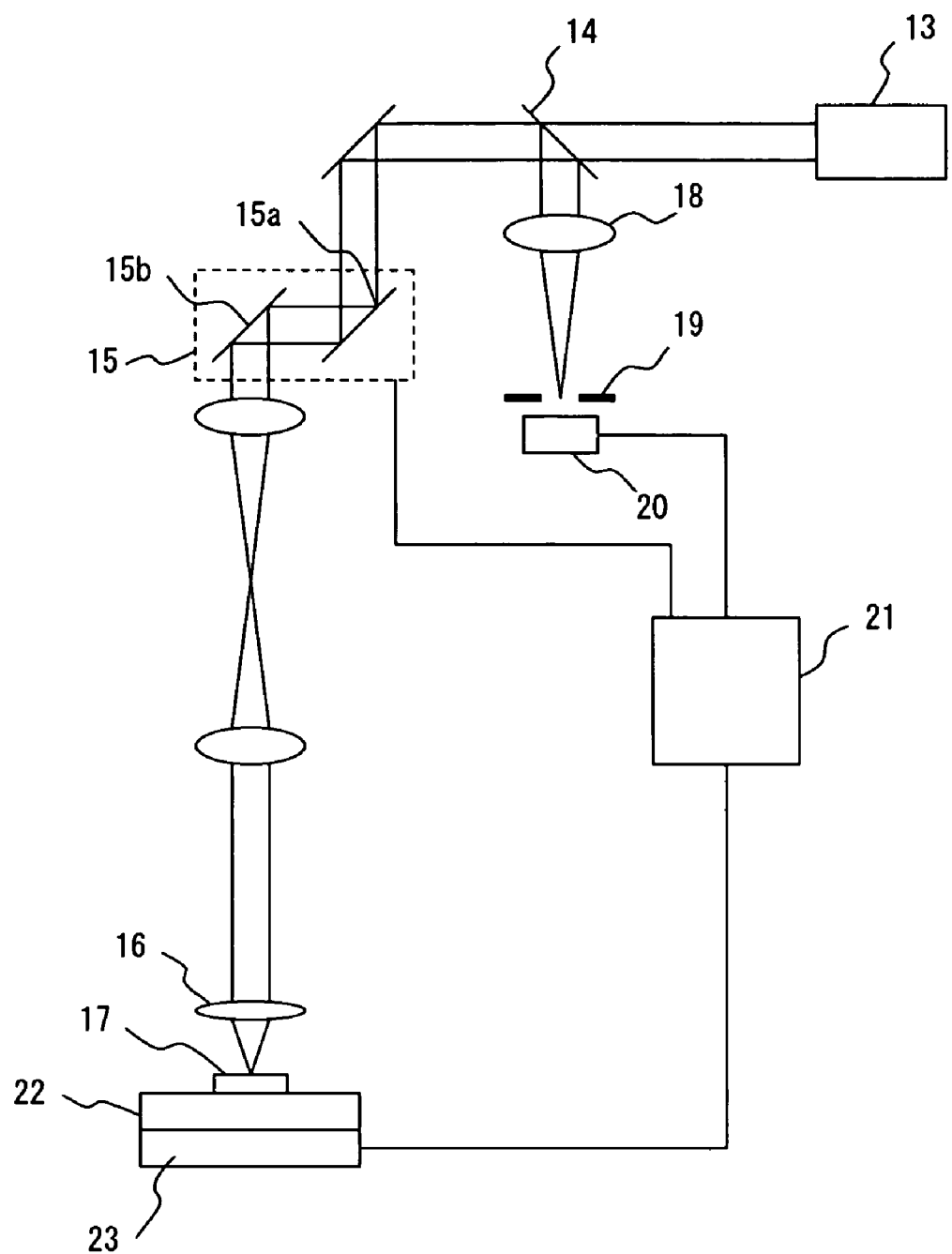
FIG. 2 shows the configuration of the conventional confocal laser scanning microscope.
Figure 3:
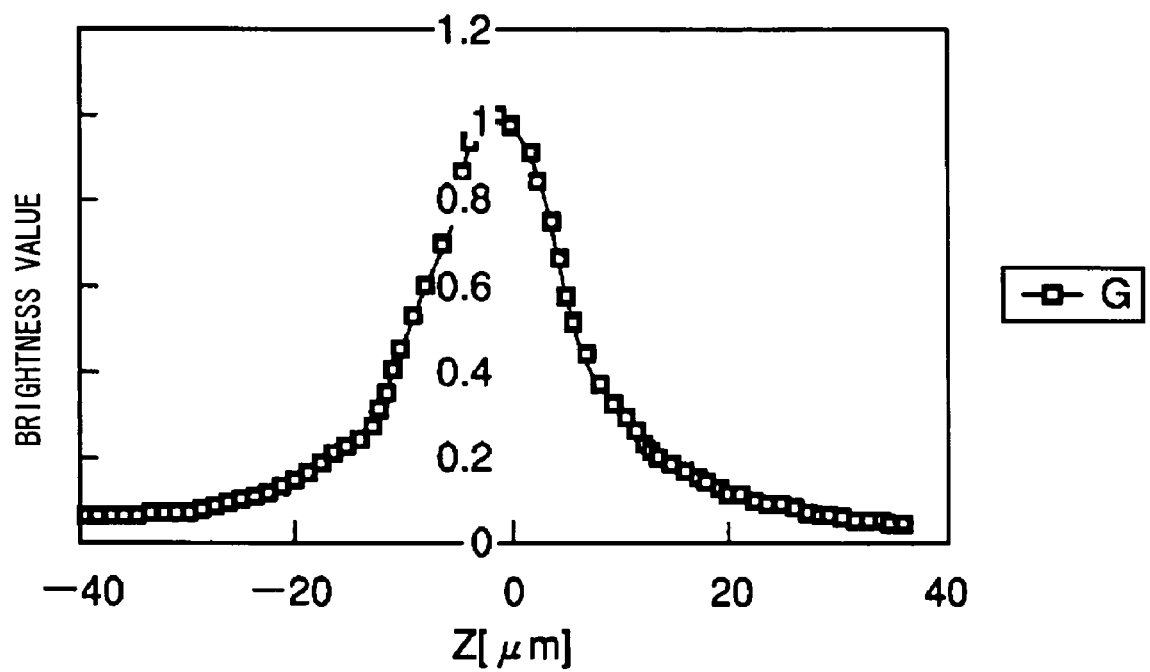
FIG. 3 shows an example of an I-Z curve obtained by the confocal disk scanning microscope.
Figure 4:
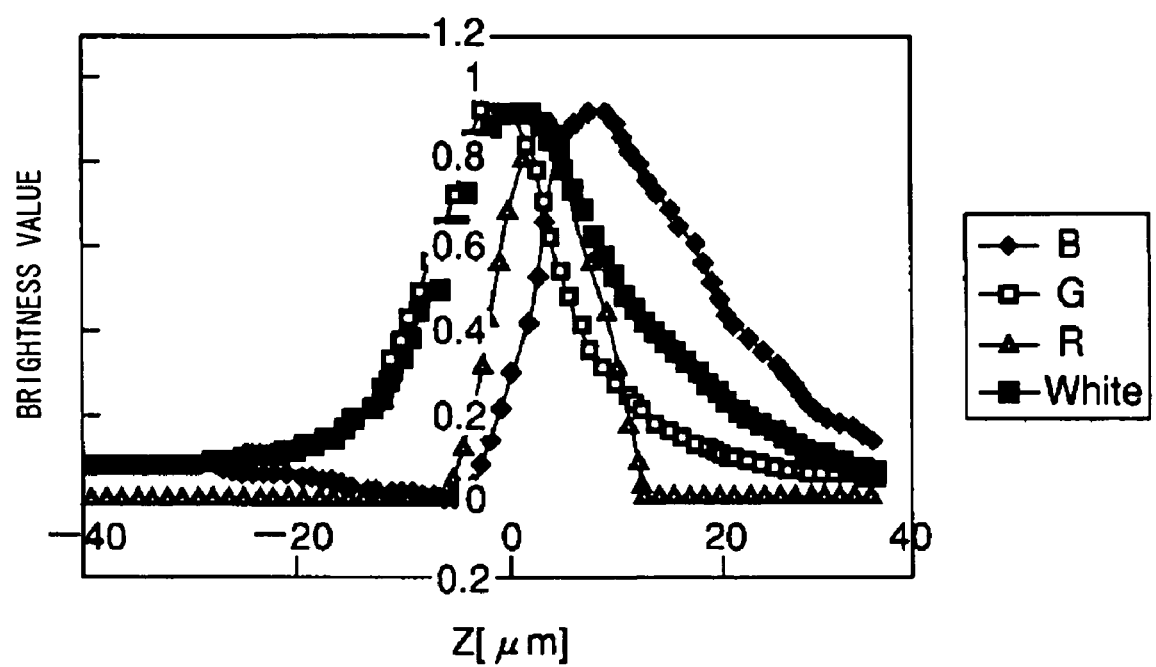
FIG. 4 shows an example of an I-Z curve obtained by the confocal disk scanning microscope.
Figure 5:
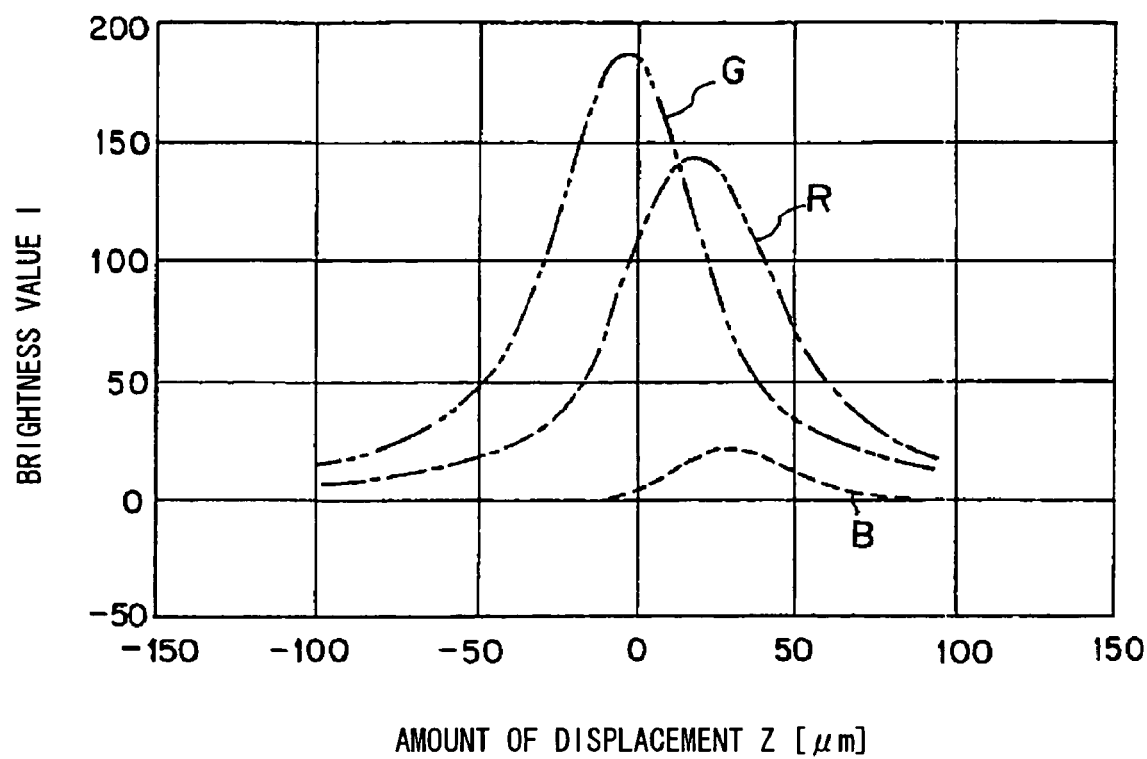
FIG. 5 shows another example of an I-Z curve obtained by the confocal scanning microscope.
Figure 6:
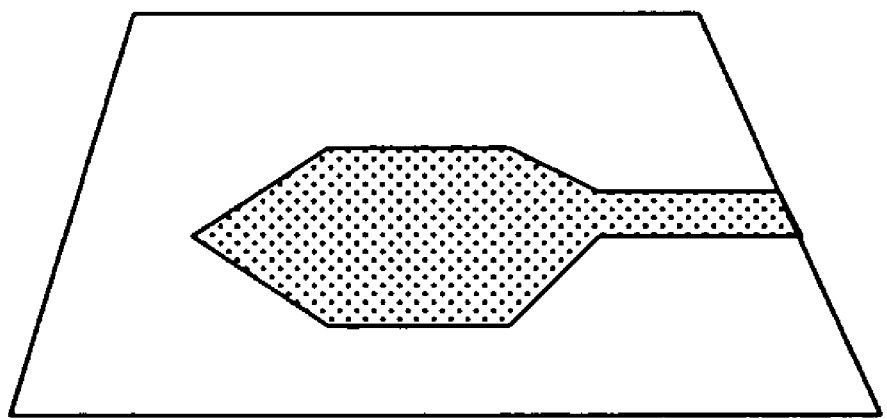
FIG. 6 is an explanatory view of the three-dimensional display method.
Figure 7:
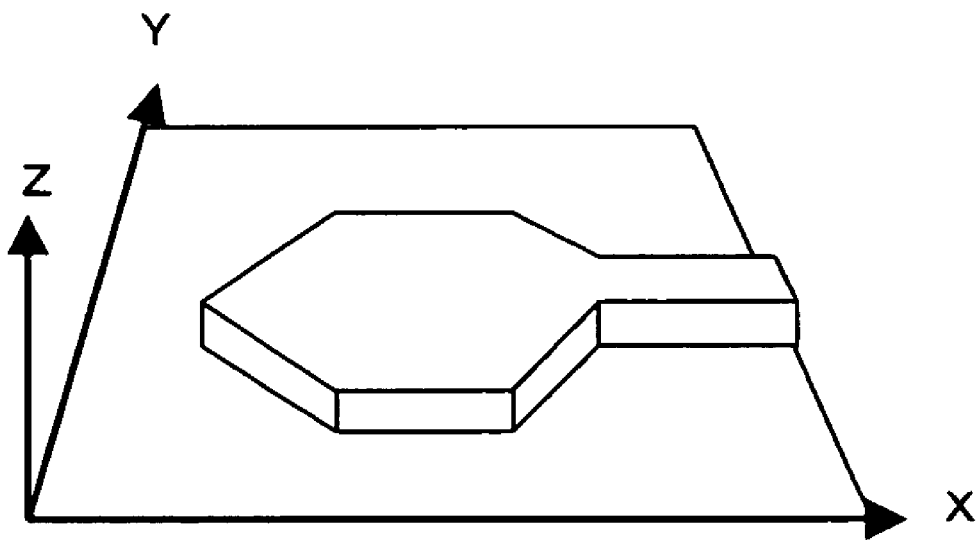
FIG. 7 is an explanatory view of the three-dimensional display method.
Figure 8:
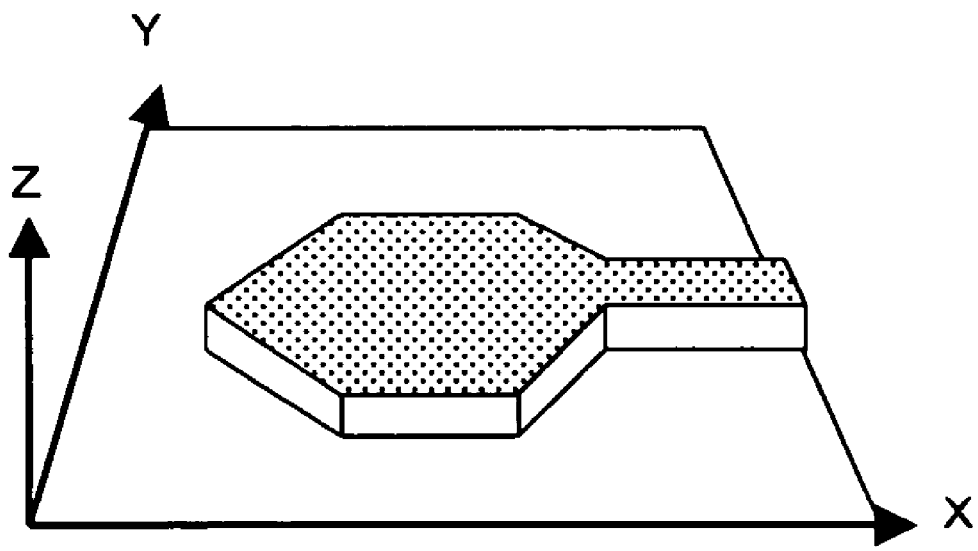
FIG. 8 is an explanatory view of the three-dimensional display method.

In FIG. 9, the components having the same functions as those shown in FIG. 1 are assigned the same reference numerals, and the detailed explanation is omitted here.

The illuminating light emitted from the light source 1 irradiates the rotary disk 4 in which a plurality of pinholes are formed through the collimator lens 2 and the half mirror 3. The rotary disk 4 is mounted on the rotation axis 5a of the motor 5 and rotates at a predetermined rotation speed, and the illuminating light which has passed through the plurality of pinholes formed in the rotary disk 4 is formed as an image on the sample 7 by the objective lens 6.

The reflected light from the sample 7 passes through the objective lens 6 and the pinholes in the rotary disk 4, and then through the half mirror 3, and is formed as an image on a color-capture unit 31 by the converging lens 8. A computer 32 captures the brightness signal (R, G, and B signals) output from the color image pickup device provided for the color-capture unit 31, performs image processing, and displays an image or an arithmetic result on the monitor 11.

The Z drive unit 12 changes the focal-plane position of the sample by relatively moving all or a part of the optical system and the sample in the optical axial direction at a command from the computer 32. According to the embodiment of the present invention, only the objective lens 6 is moved.

A signal from a wavelength selection unit 33 is input to the computer 32, and a wavelength band for use in generating a three-dimensional image can be selected from among the R, G, and B brightness signals read from the color image pickup device of the color-capture unit 31. In the present embodiment, the wavelength selection unit 33 is separate from the computer 32, but the present invention is not limited to this example, and it can be configured as the software operating in the computer 32.

Figure 11:
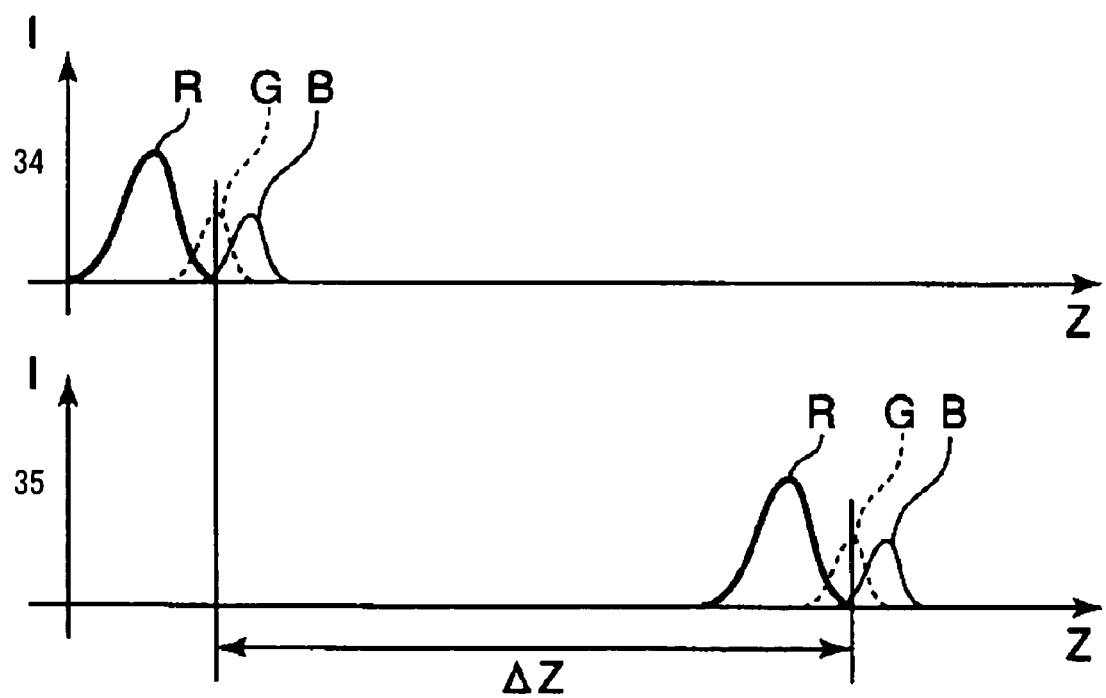
FIG. 11 is an explanatory view showing the method of generating a three-dimensional image of a sample by the confocal scanning microscope.

FIGS. 10, 11, and 12 are explanatory views showing the method of generating a three-dimensional image of a sample using the confocal scanning microscope according to the present invention.

FIG. 10 is a plan view and a sectional view of the sample 7, and shows a three-dimensional structure in which the diagonally shaded portion in the plan view is a convex portion. Described below is an example of obtaining the height ΔZ between the two points (34, 35) in FIG. 10.

FIG. 11 shows an I-Z curve of the R, G, and B brightness signals of each pixel corresponding to the two points (34, 35) of the color image pickup device. A correct ΔZ can be obtained by obtaining the difference (ΔZ) in the Z direction of the peak position by selecting any of the R, G, and B signals.

In the example shown in FIG. 11, the R signal is higher, and the G and B signals are lower. This occurs because of the influence of the color of the surface of the sample 7. That is, when the surface of the sample 7 is reddish, the G and B signals become low. Therefore, when DZ is obtained using the G signal for the sample 7, the S/N ratio is lower and the precision of DZ is reduced as compared with the case in which the R signal is used. This phenomenon similarly occurs not only when the R, G, and B signals are used, but also when, for example, a color filter is inserted into a light source to limit the illumination in a narrow band.

Therefore, according to the present embodiment, the wavelength selection unit 33 selects any of the R, G, and B signals, and the computer 32 generates a three-dimensional image using the selected signal.

Figure 13:
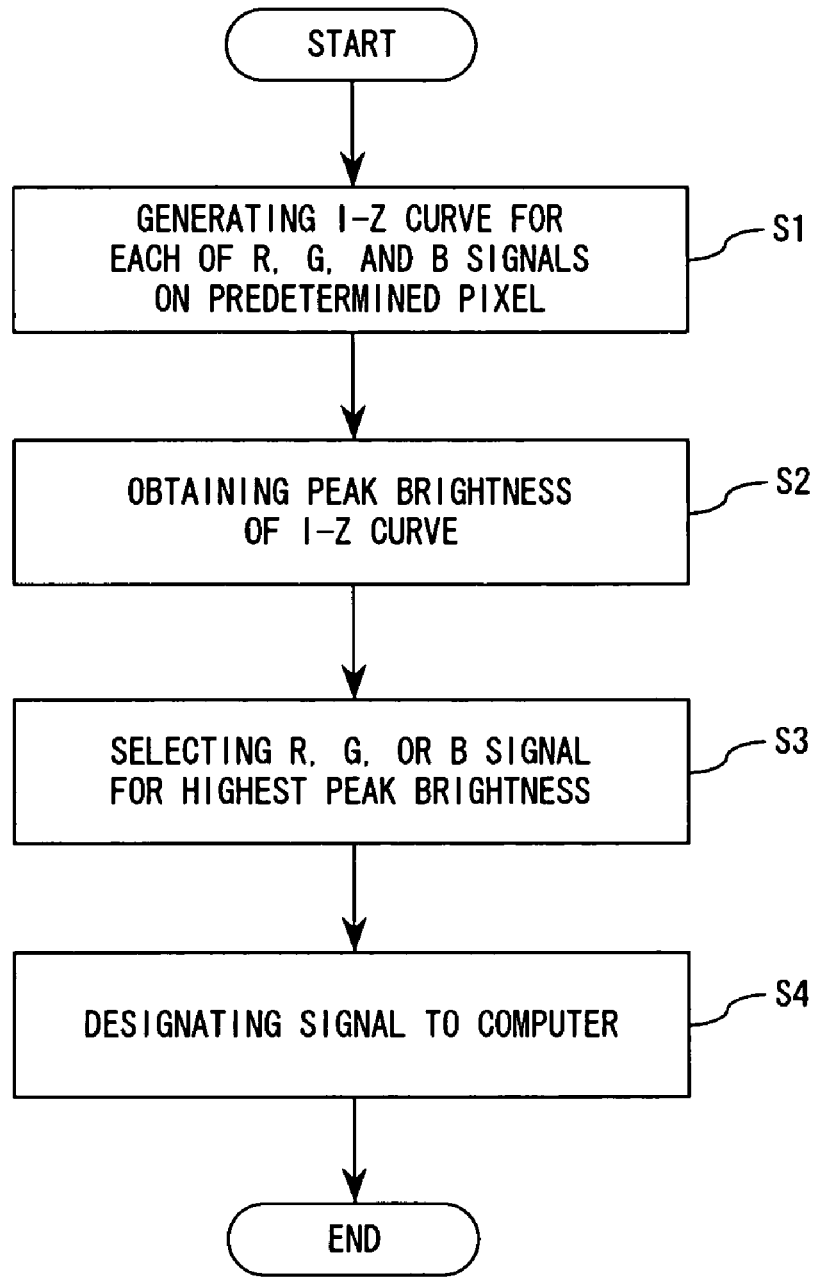
FIG. 13 is a flowchart of the outline of the operation procedure of the wavelength selection unit.

FIG. 13 is a flowchart showing the outline of the operation procedure of the wavelength selection unit 33.

The wavelength selection unit 33 generates an I-Z curve for each of the R, G, and B signals about a predetermined pixel or pixels in a predetermined area of the color image pickup device of the color-capture unit 31 (S1). The peak brightness of the I-Z curve is obtained for each of the R, G, and B signals (S2), and any of the R, G, and B signals having the highest peak brightness is selected (S3) Then, the selected signal is indicated to the computer 32 (S4).

In this example, a signal is selected based on the peak brightness, but the present invention is not limited to this example, and a signal can be selected from a predetermined algorithm based on the cuspidal index such as the peak brightness, the S/N ratio, the full width at half maximum (FWHM), etc., or an operator can determine the color of the sample 7, select a signal, and specify it in the wavelength selection unit 33.

Figure 14:
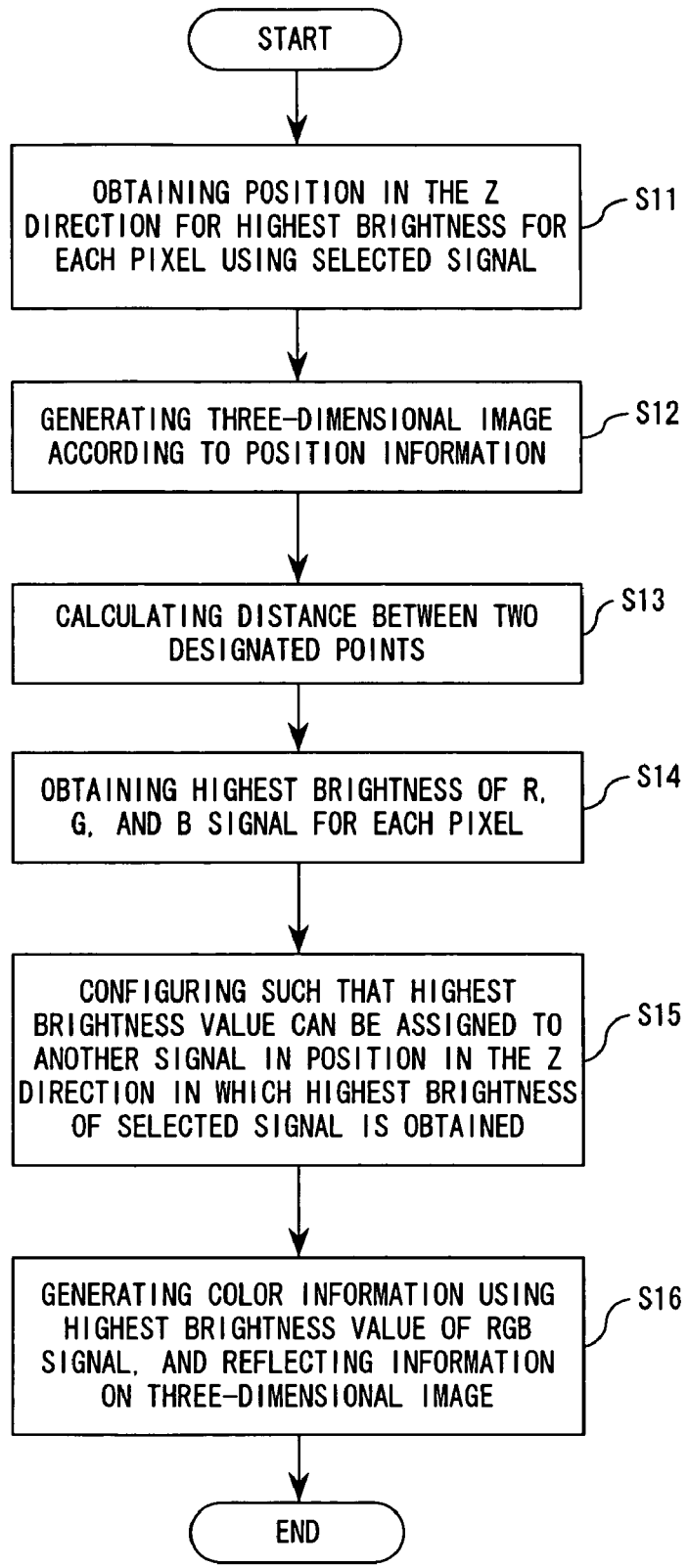
FIG. 14 is a flowchart of the outline of the operation procedure of a computer.

FIG. 14 is a flowchart showing the outline of the operation procedure of the computer 32.

The computer 32 obtains the position in the z direction having the highest brightness for each pixel using the signal selected by the wavelength selection unit 33 (s11), and generates a three-dimensional image according to the position information (S12). Furthermore, the distance between the specified two points (34, 35) are computed according to the information (Sl3).

FIG. 12 shows the state of computing ΔZ according to the selected R signal for the best S/N ratio.

Then, the computer 32 starts generating a color image. First, the highest brightness which is the peak brightness of the R, G, and B signals is obtained for each pixel (S14). Then, in the position in the z direction for the highest brightness of the selected signal (R signal according to the present embodiment), data is configured such that other signals (G and B signals) can also have the highest brightness (S15), and the color information is generated using the highest brightness of the R, G, and B signals, which is reflected by a three-dimensional image (S16).

As explained above, according to the confocal scanning microscope of the present embodiment, an appropriate wavelength band can be selected corresponding to the sample 7. Therefore, a high precision three-dimensional image can be generated using a signal of a high S/N ratio, and the three-dimensional image can be displayed as a color image. As a result, the three-dimensional measurement of the sample 7 and the appearance check such as fault detection, etc. can be simultaneously performed.

According to the present embodiment, the color information is reflected by a three-dimensional image in the process of the computer 32, but realistic colors can be regenerated by reflecting, etc. nonconfocal images by reflecting a nonconfocal image with the configuration of freely switching to a nonconfocal observation optical path in the optical system.

For example, parallel to the three-dimensional image generating operation using a brightness signal of a selected wavelength band or with a timing other than the operation, a color image (nonconfocal image) is obtained while associating it with the position in the z direction without the rotary disk 4, and by combining pieces of the image information, a color image can be reflected on a three-dimensional image.

Furthermore, according to the present embodiment, the color image pickup device of the color-capture unit 31 is described as outputting R, G, and B signals, but the present invention is not limited to this application, but the present invention can be applied to any color image pickup device from which R, G, and B signals can be extracted. Therefore, the color image pickup device for outputting YUV and NTSC is used to extract R, G, and B signals.

Second Embodiment

Figure 15:
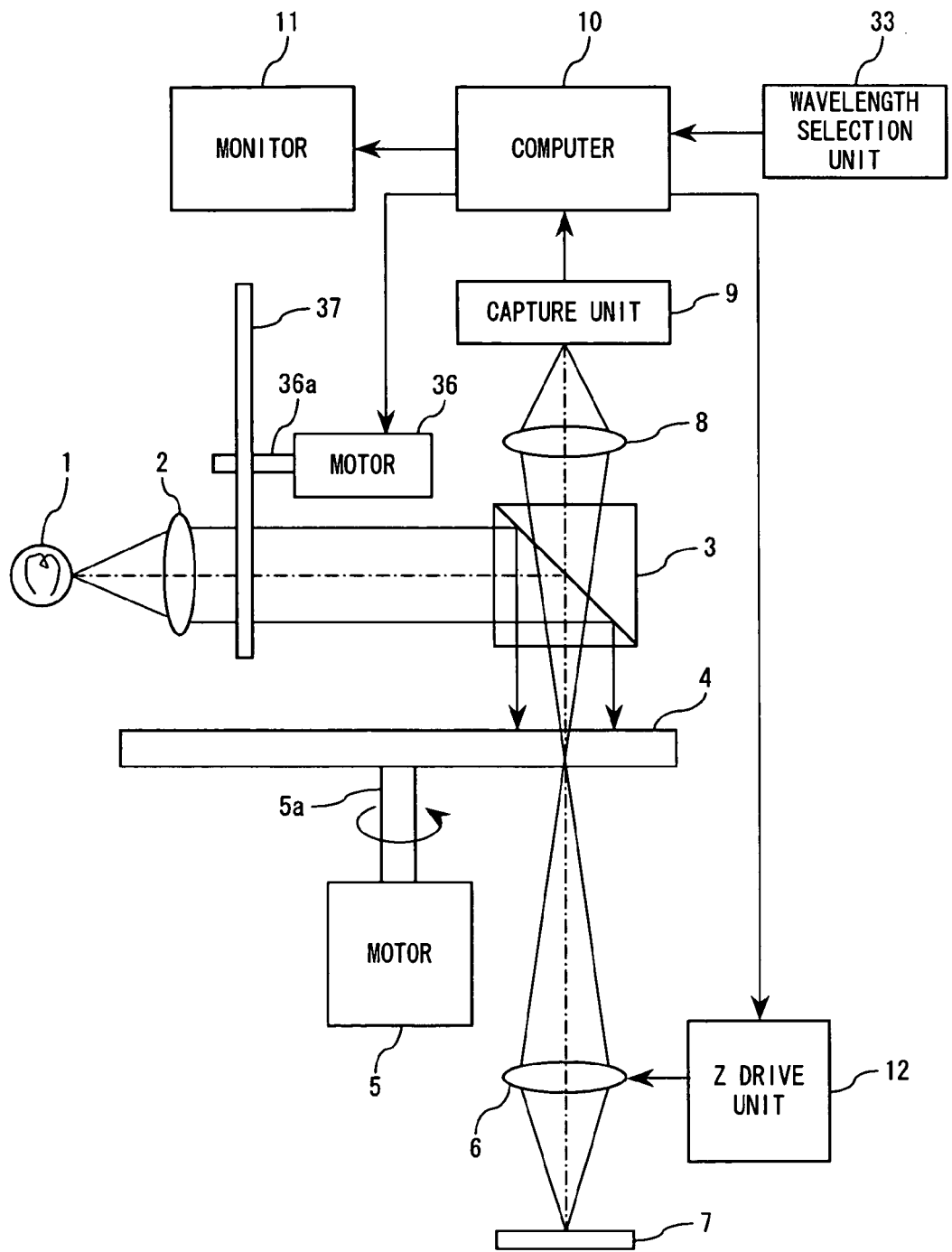
FIG. 15 shows the configuration of the confocal scanning microscope according to the second embodiment of the present invention.

FIG. 15 shows the configuration of the confocal scanning microscope according to the second embodiment. In FIG. 15, the components having the same functions as those shown in FIGS. 1 and 9 are assigned the same reference numerals, and the detailed explanation is omitted here.

In the confocal scanning microscope according to the present embodiment, a monochrome image pickup device is used in the capture unit 9, and a color filter unit 37 is inserted into the optical path at the stage subsequent to the light source 1. The color filter unit 37 is attached to a rotation axis 36a of a motor 36, and rotates at a command of the computer 32.

Figure 16:
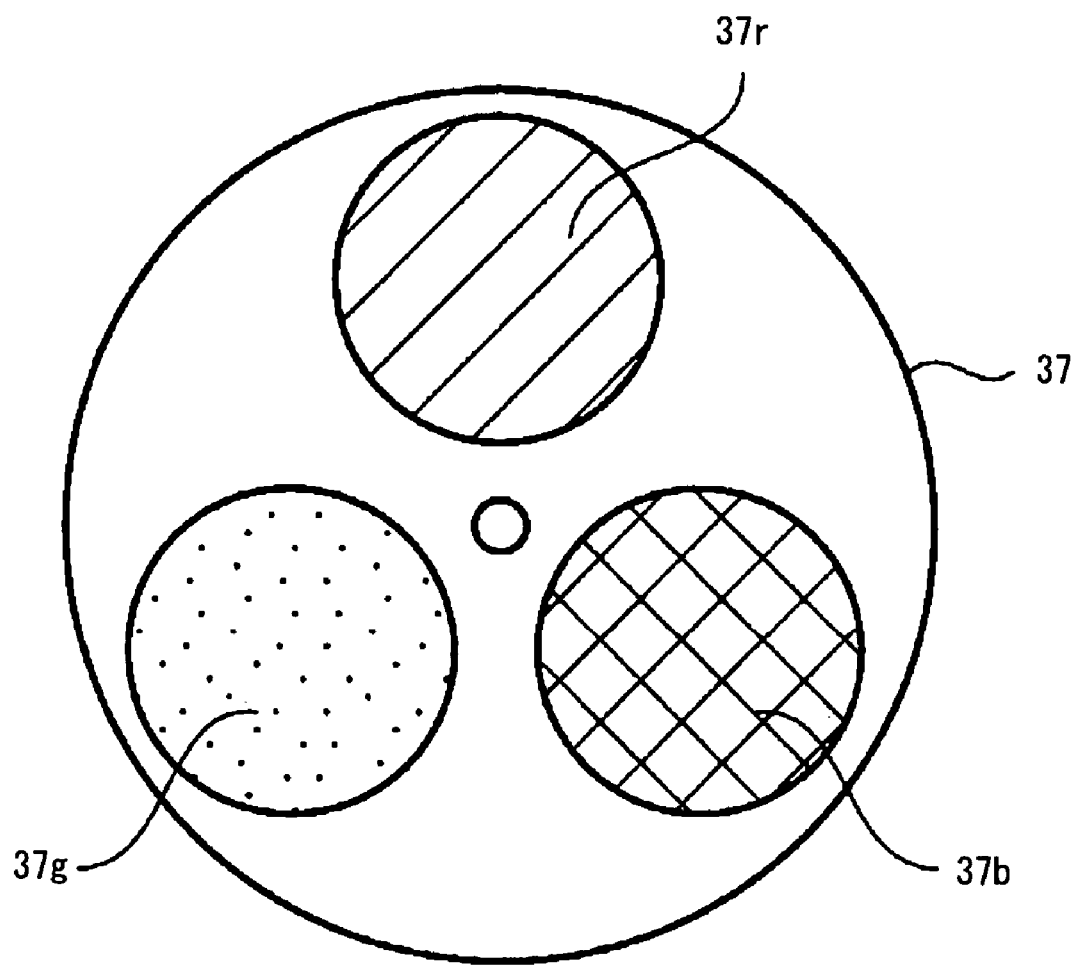
FIG. 16 shows the configuration of a color filter unit.

FIG. 16 shows the configuration of the color filter unit 37.

The color filter unit 37 is provided with three filters (37r, 37g, 37b) of the red, green, and blue wavelength bands, and any of the filters can be inserted into the optical path by the rotation in the predetermined positions.

FIG. 17 is a flowchart showing the outline of the operation procedure of the computer 32.

The computer 32 switches the color filters by rotating the color filter unit 37 (S21). Then, a brightness signal of the sample 7 is read from the image pickup device of the capture unit 9 under the illumination in the selected narrow wavelength band (S22) and is stored. The process is repeated for predetermined color filters, and the brightness signals are read from the image pickup device of the capture unit 9. If the brightness signals of all predetermined color filters have been processed (S23), then the Z drive unit 12 is operated to move the objective lens 6 by a predetermined distance (S24), and the process is repeated until the objective lens 6 completes moving in a predetermined range (S25).

Since necessary brightness signals have been read in the above-mentioned process, a three-dimensional image can be generated in the similar process (S1~S6) described above (S26).

Since the wavelength band of the illuminating light is selected using color filters in the present embodiment, various wavelength bands can be more freely selected as compared with the first embodiment. Therefore, the number of selectable wavelength bands is not limited to three. For example, a number of filters of the narrow wavelength bands are prepared to obtain a steep I-Z curve and select wavelength bands in more detail than the wavelength bands of R, G, and B for higher precision. If a larger number of wavelength bands are selected in detail, the color filter unit 37 is to be provided with color filters equal in number to the wavelength bands.

As described above, according to the confocal scanning microscope of the second embodiment of the present invention, a high precision three-dimensional image can be generated using a signal of high S/N ratio by selecting wavelength bands depending on the sample 7 as in the first embodiment, and the color of the sample 7 can be reflected in the three-dimensional image although a longer processing time is required than according to the second embodiment. As a result, the three-dimensional measurement of the sample 7 and the appearance check such as fault detection, etc. can be simultaneously performed.

Since the width and the number of wavelength bands can be freely set and selected especially in the present embodiment, the measurement can be performed using the wavelength bands more appropriate for a sample, thereby obtaining higher measurement precision.

Third Embodiment

Figure 18:
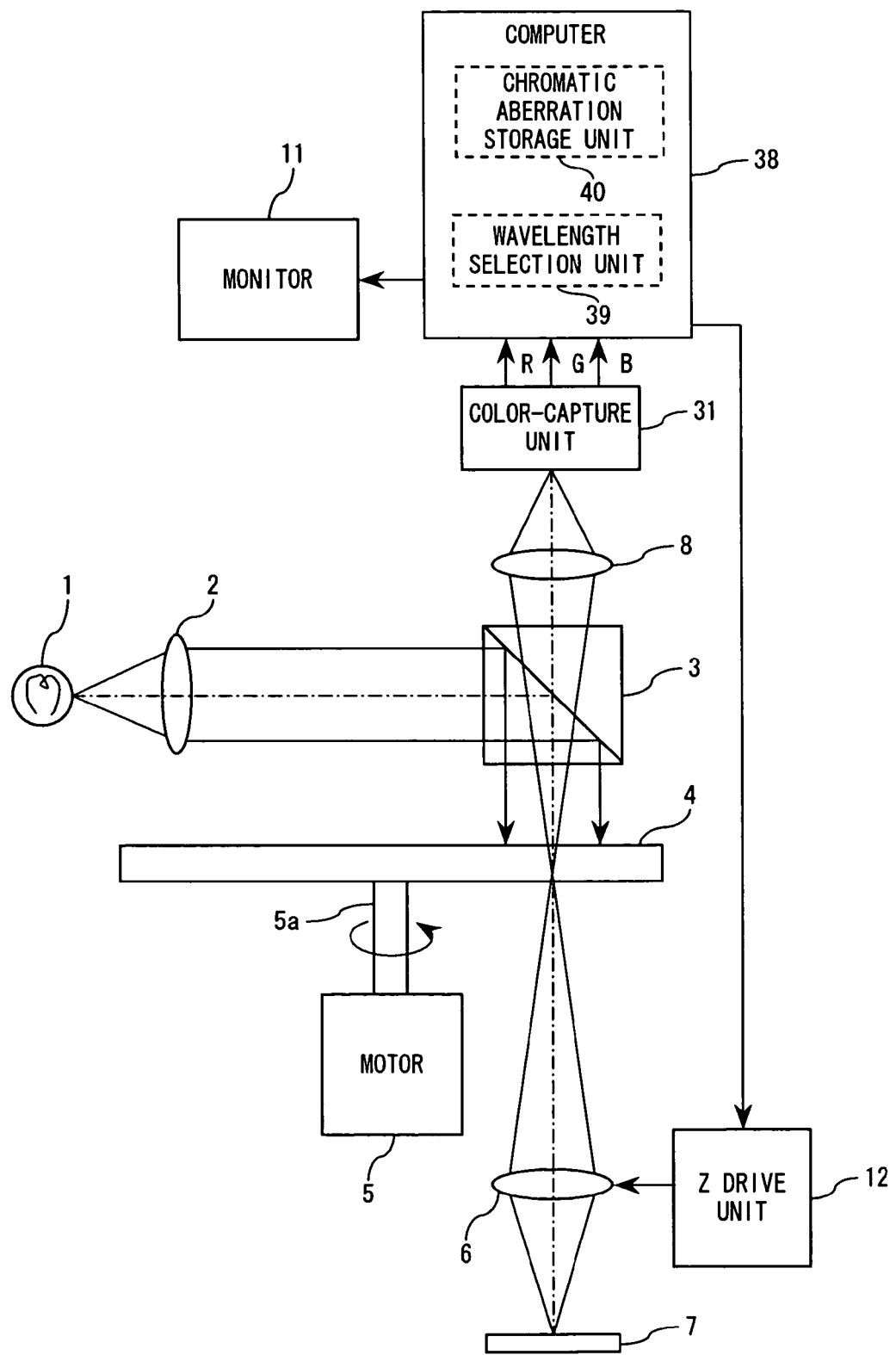
FIG. 18 shows the configuration of the confocal scanning microscope according to the third embodiment of the present invention.

FIG. 18 shows the configuration of the confocal scanning microscope according to the third embodiment of the present invention. In FIG. 18, the components also shown in FIGS. 1, 9, and 15 are assigned the same reference numerals, and the detailed explanation is omitted here.

In the present embodiment, the color-capture unit 31 is used as a capture unit, and a computer 38 is configured such that color brightness signals (R, G, B) from the color image pickup device provided for the color-capture unit 31 can be input, and a wavelength selection unit 39 and a chromatic aberration storage unit 40 are incorporated into the computer 38.

The wavelength selection unit 39 selects the optimum wavelength band for each corresponding point of the sample 7 for each pixel by selecting a signal having the highest brightness value after comparing the R, G, and B signals for each pixel or each of the specified areas according to the color brightness signal captured by the computer 38.

The chromatic aberration storage unit 40 stores a position correction value as chromatic aberration information about the respective wavelength bands to correct chromatic aberration, and the wavelength selection unit 39 has the function of correcting the distance due to the chromatic aberration using the position correction value further.

In the present embodiment, the wavelength selection unit 39 is realized by the software operating in the computer 38, and the chromatic aberration storage unit 40 is realized by the memory in the computer 38. These functions can also be configured by hardware.

Figure 19:
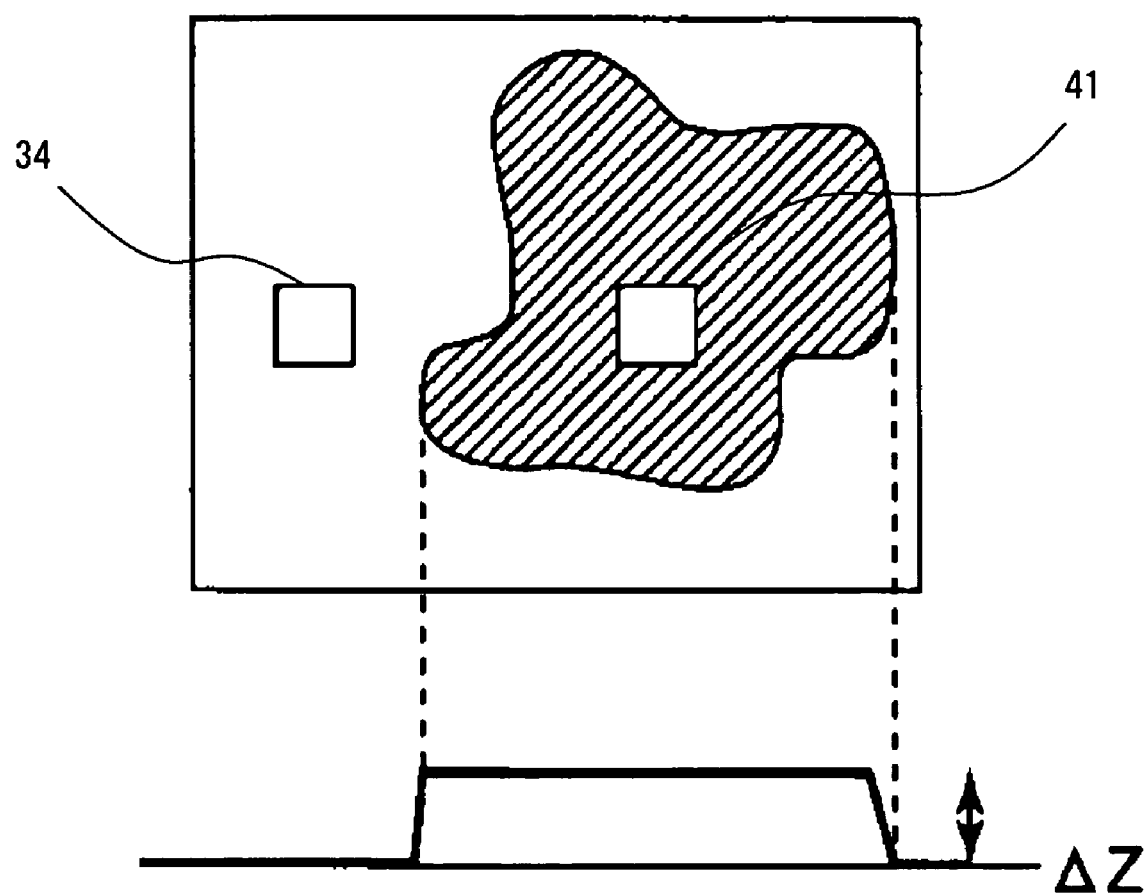
FIG. 19 is an explanatory view showing the method of generating a three-dimensional image of a sample according to the third embodiment.
Figure 20:
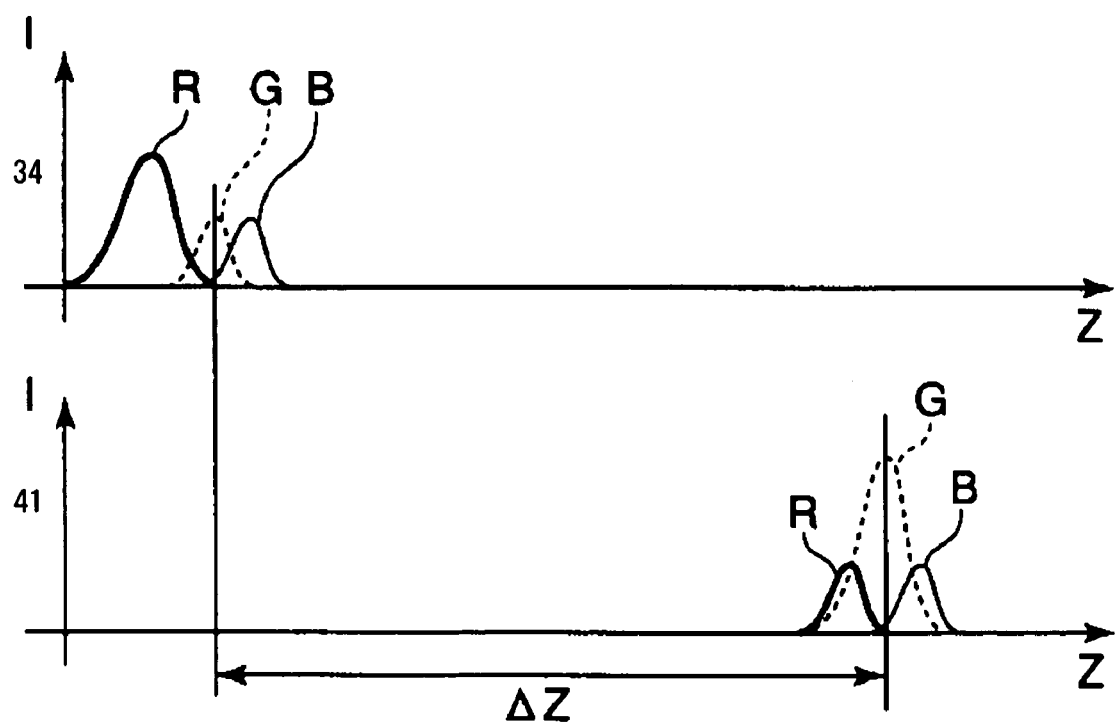
FIG. 20 is an explanatory view showing the method of generating a three-dimensional image of a sample according to the third embodiment.
Figure 21:
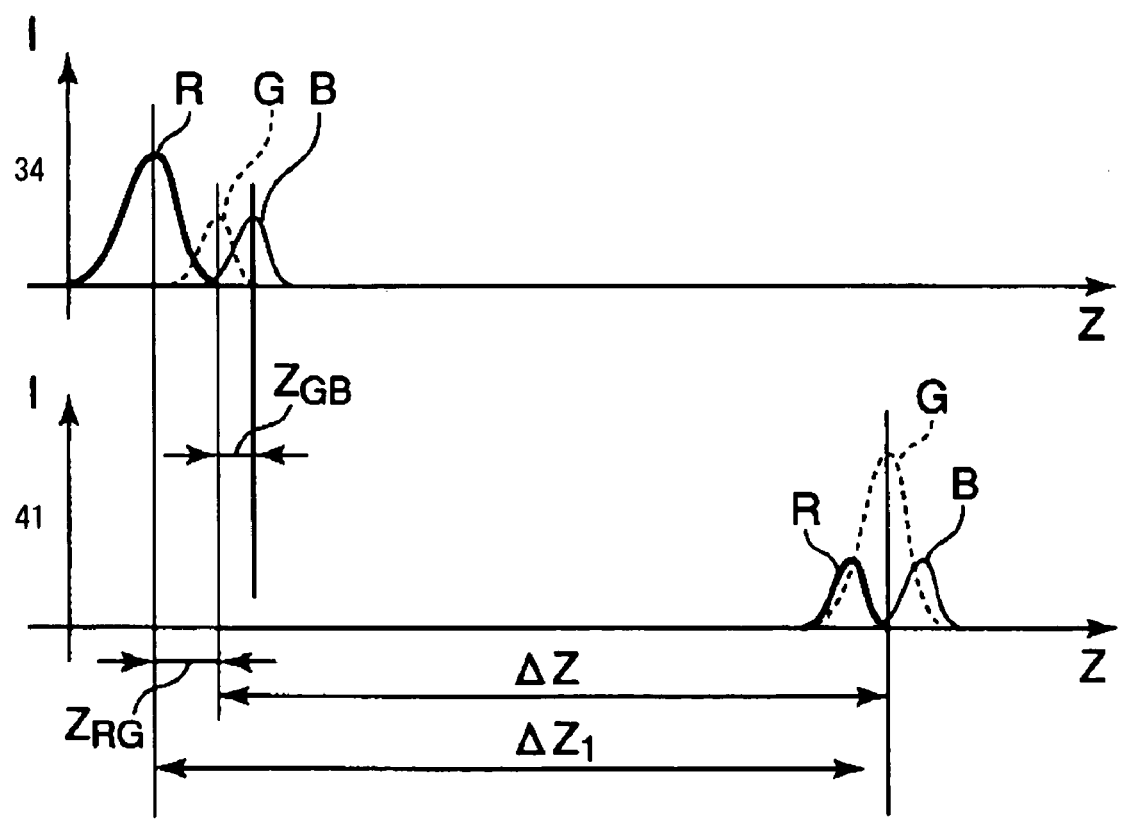
FIG. 21 is an explanatory view showing the method of generating a three-dimensional image of a sample according to the third embodiment.

FIGS. 19, 20, and 21 are explanatory views of the method of generating a three-dimensional image of a sample according to the third embodiment of the present invention.

FIG. 19 is a plan view and a sectional view of the sample 7, and shows a three-dimensional structure in which the diagonally shaded portion in the plan view is a convex portion. Described below is an example of obtaining the height $\Delta Z$ between the two points (34, 41) in FIG. 19.

FIG. 20 shows an I-Z curve of the R, G, and B brightness signals of each pixel corresponding to the two points (34, 41) of the color image pickup device. A correct $\Delta Z$ can be obtained by obtaining the difference ($\Delta Z$) in the Z direction of the peak position by selecting any of the R, G, and B signals.

In the example shown in FIG. 20, at the point 34, the R signal is higher, and the G and B signals are lower. This occurs because of the influence of the color of the surface of the sample 7. That is, when the surface of the sample 7 is reddish, the G and B signals become low. On the other hand, at the point 41, the G signal is higher and the R and B signals are lower. When the surface of the sample 7 is greenish, the R and B signals become low.

Therefore, if green is selected as the color of the wavelength band for the sample 7 and the same green wavelength band is applied to the entire screen, then the optimum selection can be made on the point 41, but the peak position of the brightness value is obtained using a low S/N ratio for the point 34, thereby reducing the precision.

In this situation, the present embodiment is configured such that the wavelength selection unit 39 can select any of the R, G, and B signals for each pixel.

Figure 22:
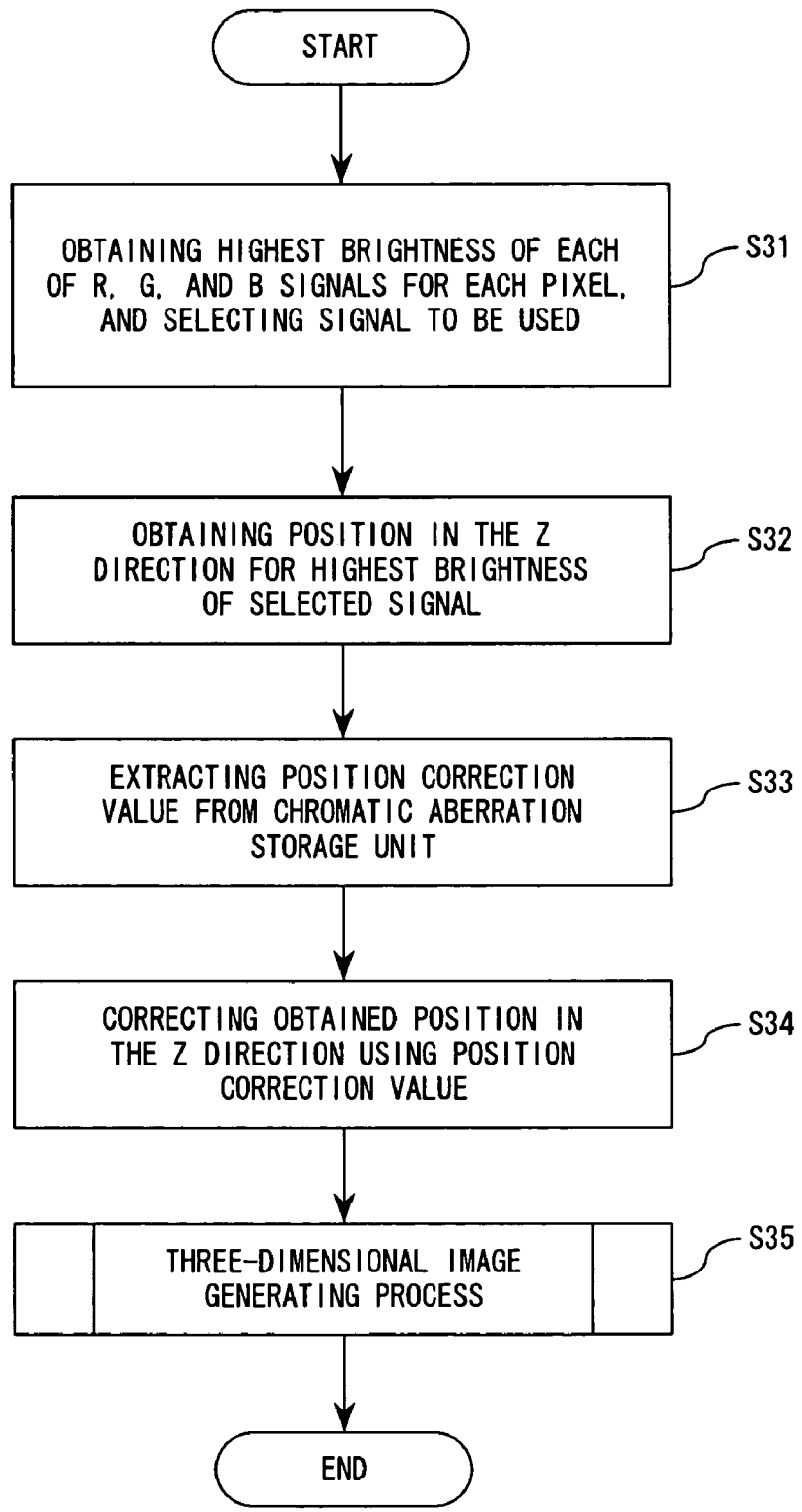
FIG. 22 is a flowchart showing the outline of the operation procedure of the wavelength selection unit.

FIG. 22 is a flowchart showing the outline of the operation procedure of the wavelength selection unit 39.

The wavelength selection unit 39 selects a signal for use in generating a three-dimensional image by obtaining the highest brightness for each of the R, G, and B signals for each pixel of the color image pickup device (S31). Then, the position in the z direction for the highest brightness of the selected signal is obtained (S32).

Thus, the peak of the brightness value can be obtained using the signal having the highest S/N ratio in all points on the screen. However, since the chromatic aberration occurs in the normal optical system as described above, an error arises when the distance is obtained between the peaks of different wavelength bands in the z direction.

FIG. 21 is an explanatory view showing the influence of the chromatic aberration.

In FIG. 21, the distance is computed using the R signal and the G signal. Therefore, the value is $\Delta Z1$, and indicates the error due to the influence of the chromatic aberration by $Z_{RG}$ compared with the true value of $\Delta Z$.

Therefore, the wavelength selection unit 39 extracts the position correction value which is the chromatic aberration information about the wavelength bands from the chromatic aberration storage unit 40 (S33). The position correction value corrects the positions in the z direction of the R signal and the B signal based on the Z position of the respective G signal. Therefore, when the selected signal is the R signal, the $Z_{RG}$ which is the position correction value is added to the position in the z direction, and when the selected signal is the B signal, the $Z_{GB}$ which is the position correction value is subtracted from the position in the z direction, thereby converting the Z position of the G signal.

Although the position correction value has a unique value corresponding to the objective lens 6, the value is not limited to one according to the present embodiment, but the value can be determined for each pixel and stored, and the value can also be determined and stored for each of the predetermined areas.

Thus, the position in the z direction obtained from each selected signal is corrected by the position correction value (S34), and the above-mentioned three-dimensional image generating process is performed using the position in the z direction (S35).

As described above, according to the present embodiment, the wavelength band can be selected for each pixel or a specified area. Therefore, a signal having a higher S/N ratio can be applied, thereby generating a correct three-dimensional image and performing high precision three-dimensional measurement. Furthermore, since the color of a sample can be regenerated as in the first embodiment, an appearance check such as defect detection, etc. can be simultaneously performed.

According to the present embodiment, the capture unit can be a color image pickup device, and the available wavelength bands are the three wavelength bands depending on the R, G, and B signals of brightness signals. However, the present embodiment is not limited to these applications, but as in the second embodiment, a plurality of color filters can be arranged in an optical path to use a wavelength band depending on the arranged color filter. In this case, an image has to be captured for each wavelength, which takes a longer processing time, but can perform measurement on a three-dimensional shape with high precision.

According to the present embodiment, for example, the rotary disk 4 having pinholes arranged in a spiral manner is used, but the rotary disk 4 can be provided with slits. Furthermore, the present invention does not necessarily require a rotating operation, but a mask pattern member can be used in controlling the transmission and cutoff of the light by changing a predetermined pattern. This can be realized by, for example, replacing the rotary disk 4 with liquid crystal, etc.

In the above-mentioned first through third embodiments, the confocal disk scanning microscope is used as an example of the confocal scanning microscope, but a confocal laser scanning microscope can also be used.

Thus, according to the first through third embodiments of the present invention, a high precision three-dimensional image can be obtained, and the color information about the sample surface can be regenerated.

Fourth Embodiment

Figure 23:
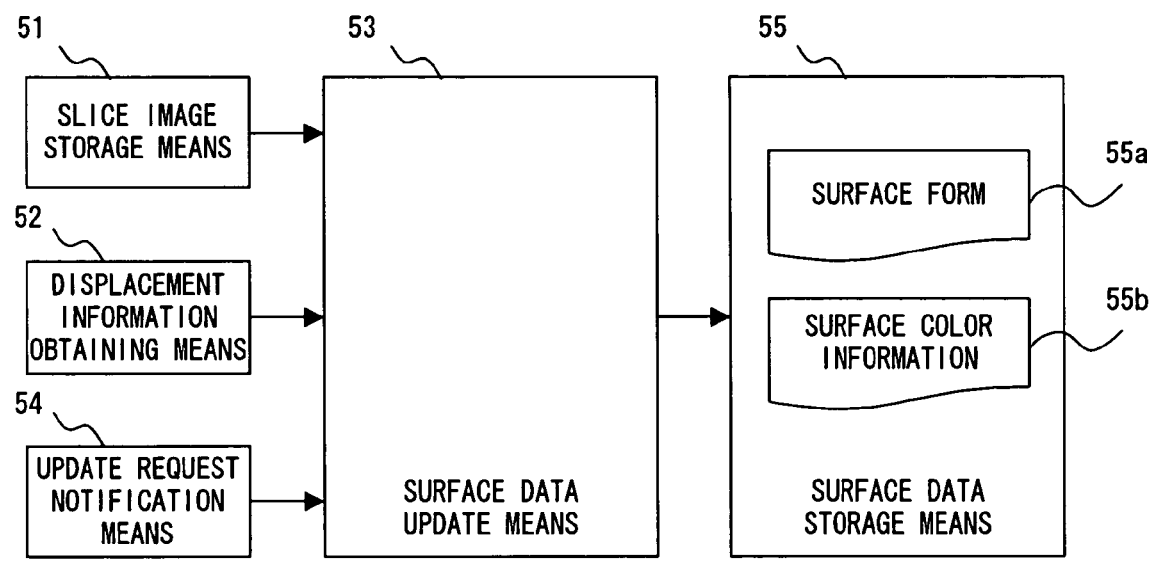
FIG. 23 is a block diagram showing an example of the configuration of the three-dimensional measurement apparatus according to the fourth embodiment of the present invention.

FIG. 23 is a block diagram showing an example of the configuration of the three-dimensional measurement apparatus according to the fourth embodiment of the present invention.

As shown in FIG. 23, the three-dimensional measurement apparatus according to the present embodiment comprises a slice image storage means 51, a displacement information obtaining means 52, a surface data update means 53, an update request notification means 54, a surface data storage unit 55, a CPU (central processing unit) for controlling the operation of the three-dimensional measurement apparatus by executing the control program stored in advance in internal memory although not shown in the attached drawings.

In FIG. 23, the light of a plurality of wavelengths from the sample color-captured by the color-capture apparatus (not shown in the attached drawings), etc. through the confocal optical system is stored in the slice image storage means 51 as color information (slice image). The color information which can be stored in the slice image storage means 51 is not limited to one piece, but all necessary color information for measurement can be stored. One piece of color information stored in the slice image storage means 51 selectively stores the light reflected by the focal-plane of the confocal optical system in the light of a plurality of wavelengths from the sample, and the amount of displacement between the focal-plane of the confocal optical system and the sample when a color-capture is performed about the respective color information can be uniquely obtained by the displacement information obtaining means 52. The surface data update means 53 updates the surface data stored in the surface data storage means 55 according to the color information stored in the slice image storage means 51 and the displacement information obtained by the displacement information obtaining means 52. The surface data comprises at least a surface form 55a including height information in each position of the sample surface, and surface color information 55b including color information in each position of the sample surface, and the surface data update means 53 updates at least the surface form 55a and the surface color information 55b with the timing of the request to update the surface data. The surface color information 55b is updated according to the color information about the vicinity of the surface of the sample. Thus, the surface color information 55b corresponding to the surface form 55a of the sample is determined with the light from the surface form of the sample taken into account, thereby obtaining the realistic color of the sample. In addition, the update request notification means 54 directly requests the above-mentioned update of the surface data, and the request can be manually issued by an operator, etc. or can also be automatically issued.

Then, the above-mentioned slice image storage means 51, the displacement information obtaining means 52, the surface data update unit 53, the update request notification means 54, and the surface data storage means 55 are explained below in more detail. However, according to the present embodiment, it is assumed that the displacement information obtaining means 52 is included in the slice image storage means 51.

Figure 24:
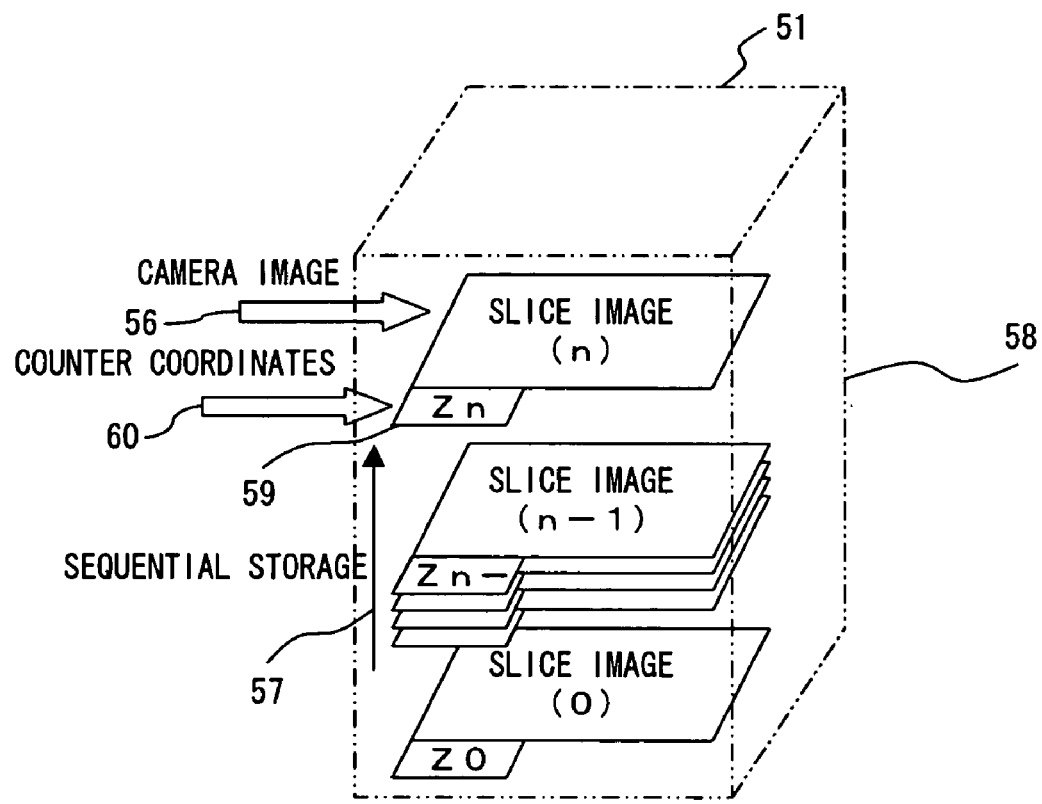
FIG. 24 shows an example of the configuration of the slice image storage unit.
Figure 25:
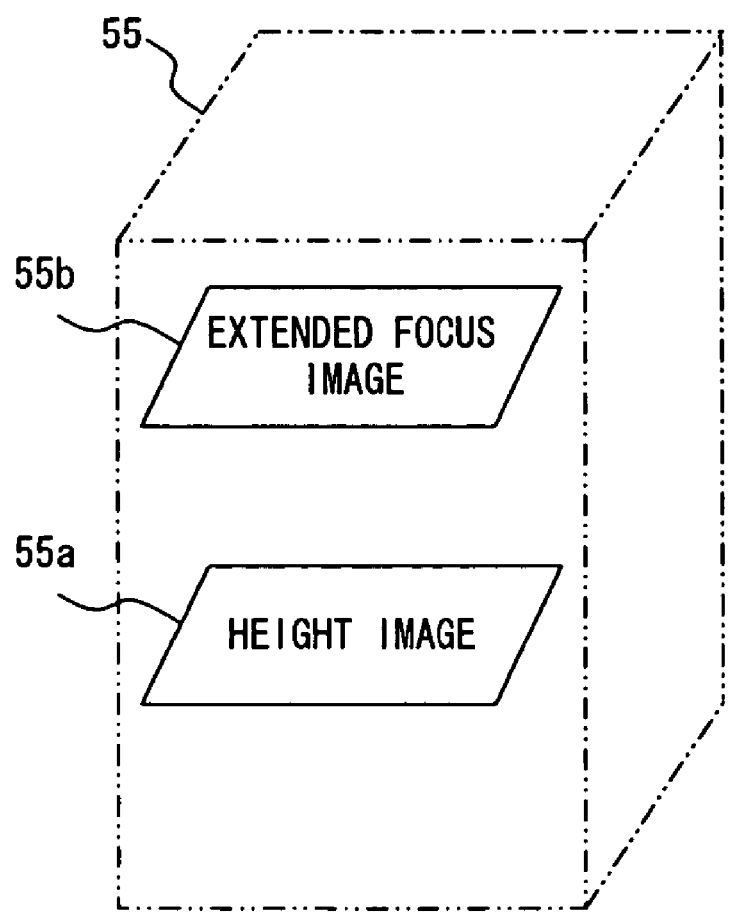
FIG. 25 shows an example of the configuration of the surface data storage unit.
Figure 26:
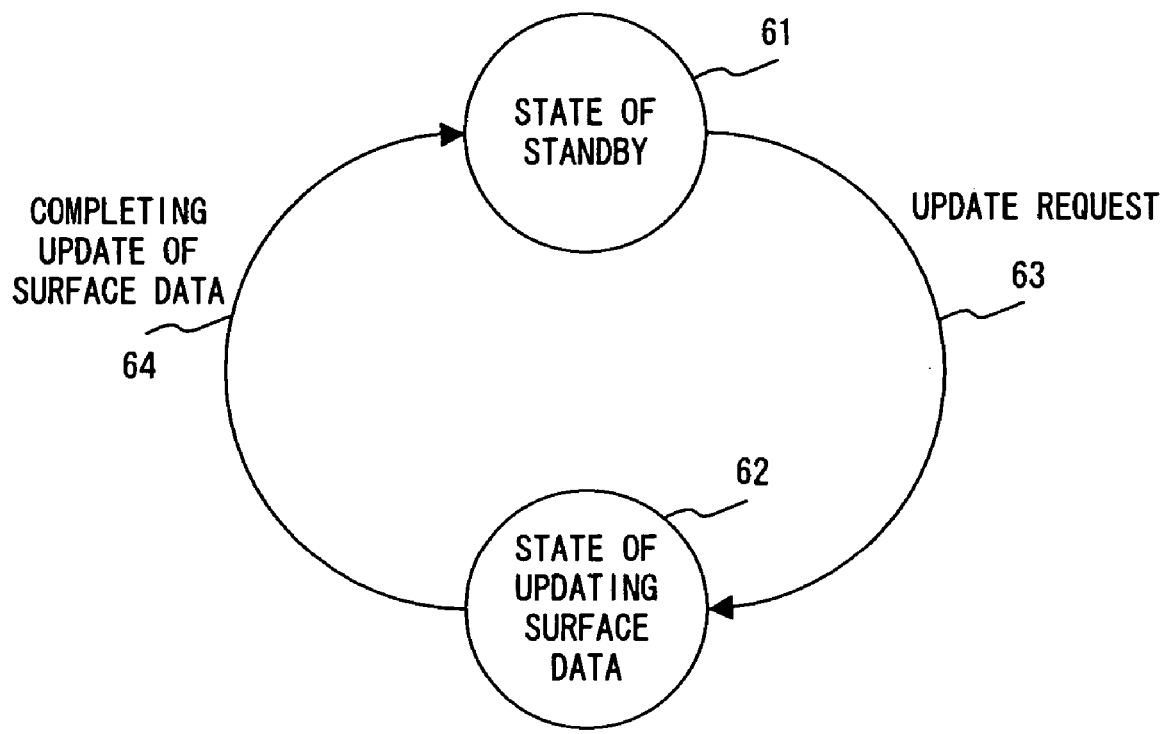
FIG. 26 shows the state transition of the surface data update unit.

FIG. 24 shows an example of the configuration of the slice image storage means 51, FIG. 25 shows an example of the configuration of the surface data storage unit 55, and FIG. 26 shows the state transition of the surface data update unit 53.

First, the slice image storage means 51 is explained by referring to FIG. 24.

In FIG. 24, the slice image storage means 51 contains a storage medium (not shown in the attached drawings), and can store the light of a plurality of wavelengths from the sample color-captured by the color-capture apparatus, etc. in the storage medium as a plurality of slice images (camera images) having color information through the confocal optical system as indicated by an arrow 56. When a new slice image is stored in the slice image storage means 51, an image number subsequent to the image number already assigned to the stored slice image is assigned as the image number for uniquely identifying a slice image, and the new slice image is added (stored) in the position corresponding to the assigned image number in the list storing slice images. Therefore, as indicated by an arrow 57, slice images are sequentially accumulated. For example, a slice image 58 is an n-th (n=0, 1, ...) stored slice image. The amount of displacement Zn 59 between the focal-plane of the confocal optical system and the sample obtained when the n-th (n=0, 1, ...) stored slice image is color-captured is read as counter coordinates as indicated by an arrow 60 in the method not shown in the attached drawings, associated with the n-th stored slice image and is stored in the storage medium. That is, the displacement information obtaining means 52 obtains the displacement information $Z_n$.

Then, the surface data storage means 55 is explained by referring to FIG. 25.

As shown in FIG. 25, the surface data storage means 55 contains a storage medium (not shown in the attached drawings), and can store an extended focus image 55b and a height image 55a in the storage medium. The extended focus image 55b refers to the surface color information 55b comprising color information in each position of the sample surface, and the height image 55a refers to the surface form 55a comprising height information in each position of the sample surface. The extended focus image 55b and the height image 55a are overwritten each time they are updated by the surface data update unit 53.

The process relating to the update request notification means 54 is explained below by referring to FIG. 26.

FIG. 26 shows the state transition of the surface data update unit 53, shows the state in which the surface data update means 53 has not performed processing as a state of standby 61, and shows the state in which the surface data has been updated based on the slice image stored in the slice image storage means 51 and the displacement information Zn as a state of updating surface data 62. The update request notification means 54 provides an event of a transition state from the state of standby 61 to the state of updating surface data 62, issues an update request event to the surface data update means 53 immediately after a new slice image and displacement information Zn are stored in the slice image storage means 51 and requests to update the surface data according to the newly stored slice image and the displacement information Zn. The surface data update means 53 which receives the update request event in the state of standby 61 changes into the state of updating surface data 62 (arrow 63), and the surface data updating process 65 described later is started. Upon completion of a surface data updating process 65, the surface data update means 53 changes into the state of standby 61 (arrow 64), and awaits the next update request event.

The controlling process performed by the CPU of the three-dimensional measurement apparatus with the above-mentioned configuration is explained below. The controlling process is realized by reading and executing the control program stored in the internal memory of the CPU. In the present embodiment, an example of the controlling process is explained below mainly by referring to the process relating to the surface data update unit 53.

Figure 27:
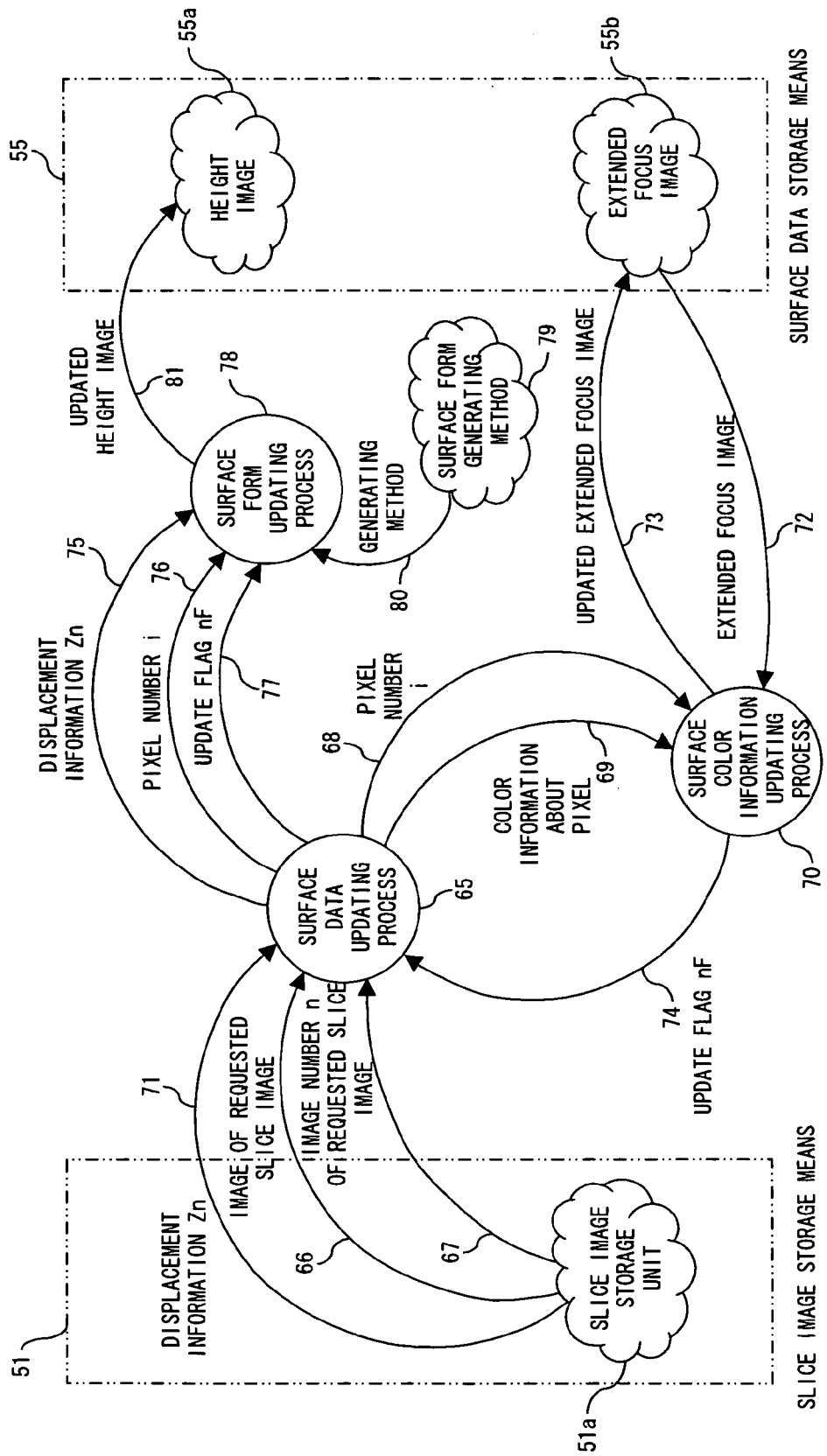
FIG. 27 shows a data flow of the process relating to the surface data update unit according to the fourth embodiment of the present invention.

FIG. 27 shows the data flow in the process relating to the surface data update unit 53.

In FIG. 27, When the surface data update means 53 receives the update request event from the update request notification means 54, the surface data updating process 65 is started. In the surface data updating process 65, the slice image storage unit 51a of the slice image storage means 51 passes a requested slice image (image of the slice image) and the image number n of the requested slice image (arrows 66, 67), and the pixel number i of the requested slice image and the color information about the pixel of the pixel number i are passed to a surface color information updating process 70 (arrows 68, 69). In the surface data updating process 65, the slice image storage unit 51a of the slice image storage means 51 passes the displacement information Zn obtained from the displacement information obtaining means 52 (arrow 71).

In the surface color information updating process 70, the contents of the pixel of the pixel number i of the extended focus image 55b are updated as necessary (arrows 72, 73), and the update flag nF indicating the presence/absence of the update is passed to the surface data updating process 65 (arrow 74). When the update flag nF is passed to the surface data updating process 65, the update flag nF, the pixel number i, and the above-mentioned displacement information Zn are passed to a surface form updating process 78 (arrow 75, 76, 77).

In the surface form updating process 78, according to the predetermined generating method (arrow 80) passed from a surface form generation unit 79 and based on the determination of the presence/absence of the update based on the update flag nF, the contents of the pixel of the pixel number i of the height image 55a are updated using the displacement information Zn obtained by the displacement information obtaining means 52 as necessary (arrow 81). The predetermined generating method is, for example, selected at an instruction of an operator, etc.

The above-mentioned processes are repeated on all pixels of a requested slice image, and the update of the surface data using the requested slice image is completed. The process relating to one slice image is repeated on all slice images required for measurement.

Described below in detail are the surface data updating process 65, the surface color information updating process 70, and the surface form updating process 78.

Figure 28:
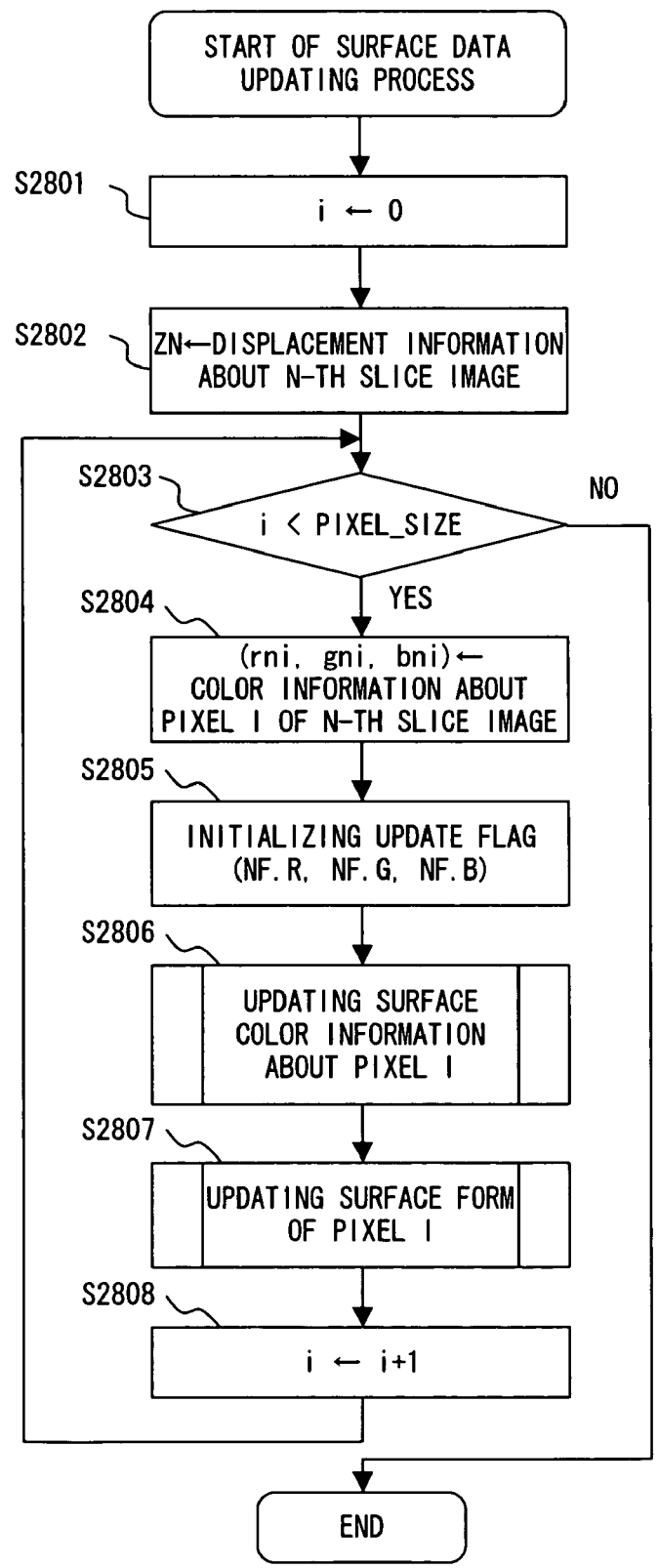
FIG. 28 is a flowchart showing the contents of the surface data updating process.
Figure 29:
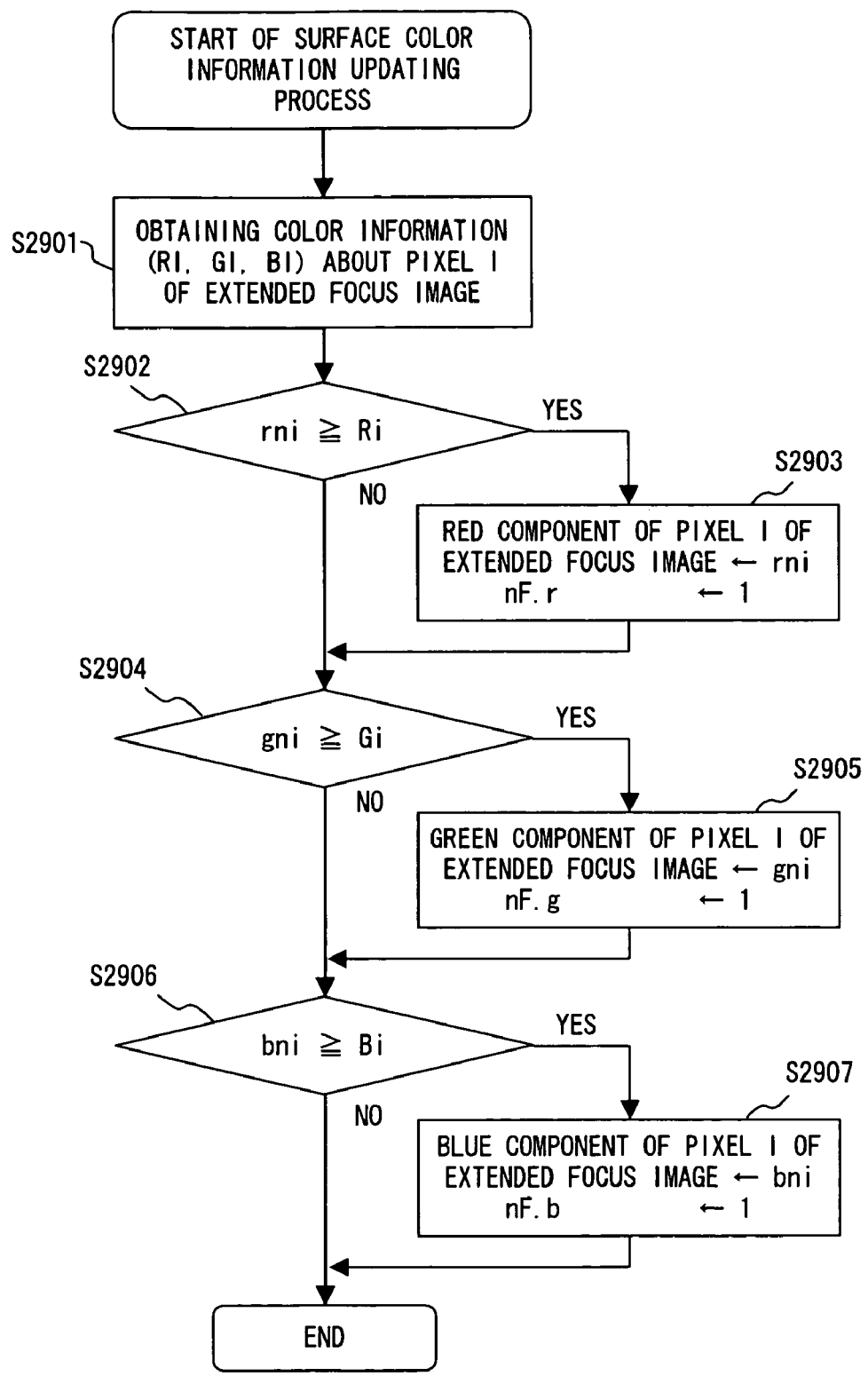
FIG. 29 is a flowchart showing the contents of the surface color information updating process.
Figure 30:
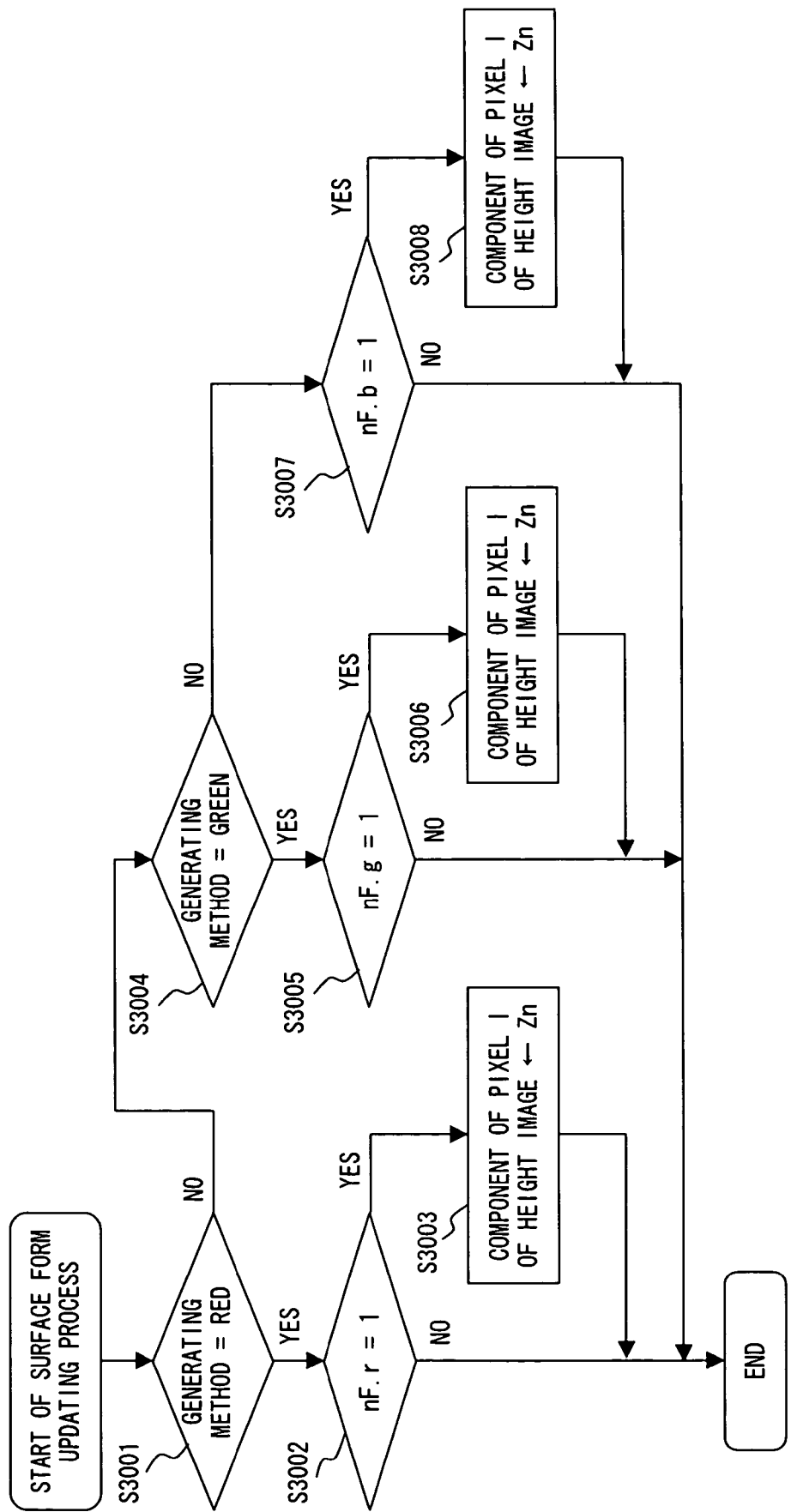
FIG. 30 is a flowchart showing the contents of the surface form updating process.

FIG. 28 is a flowchart showing the contents of the surface data updating process 65, FIG. 29 is a flowchart showing the contents of the surface color information updating process 70, and FIG. 30 is a flowchart showing the contents of the surface form updating process 78.

First, the surface data updating process 65 is explained by referring to FIG. 28.

In FIG. 28, the process of "i←0" is performed in S2801. That is, the target pixel number i in updating the surface data is initialized to 0.

In S2802, the process of "Zn←displacement information about n-th slice image" is performed. That is, the displacement information about the n-th slice image (the slice image of the image number n) obtained by the displacement information obtaining means 52 is assigned to Zn.

In S2803, the determining process of "i<PIXEL_SIZE" is performed. That is, it is determined whether or not the updating process has not been completed on the surface data of all pixels (whether or not i<PIXEL_SIZE). If the determination result is "YES", control is passed to S2804. If the determination result is "NO", the current process terminates.

In S2804, the process of "(rni, gni, bni)←color information about pixel i of n-th slice image" is performed. That is, the color information rni (red component), gni (green component), and bni (blue component) about the pixel of the pixel number i of the n-th slice image is obtained.

In S2805, the process of "initializing update flag (nF. r, nF. g, nF. b)" is performed. That is, the update flags nF. r (presence/absence of update of red component), nF. g (presence/absence of update of green component), and nF. b (presence/absence of update of blue component) indicating the presence/absence of the update of each pixel are initialized to 0.

In S2806, the process of "updating surface color information about pixel i" is performed. That is, the surface color information updating process 70 described later on the pixel number i is performed.

In S2807, the process of "updating surface form of pixel i" is performed. That is, the surface form updating process 78 described later on the pixel i is performed.

In S2808, the process of "i←i+1" is performed. That is, i+1 is assigned to i, the pixel number i is updated to the next pixel number, and control is returned to S2803.

Then, the surface color information updating process 70 which is performed in S2806 as described above is explained by referring to FIG. 29.

In FIG. 29, the process of "obtaining color information (Ri, Gi, Bi) about pixel i of extended focus image" is performed in S2901. That is, the color information Ri (red component), Gi (green component), and Bi (blur component) about the pixel of the pixel number i of the extended focus image 55b is obtained. When the surface data updating process 65 is started, the color information about each pixel of the extended focus image 55b is initialized, and the values are all 0.

In the subsequent processes in S2902 through S2907, the color components of the respective pixels of the pixel number i of the extended focus image 55b obtained in S2901 and the slice image obtained in S2804 are sequentially compared, and the corresponding processes are performed.

In S2902, "rni≧Ri" is determined. That is, the red components are compared, and it is determined whether or not the value rni of the slice image is equal to or larger than the value Ri of the extended focus image 55b (rni≧Ri). If the determination result is "YES", control is passed to S2903. If it is "NO", control is passed to S2904.

In S2903, the process of "red component of pixel i of extended focus image←rni, nF. r←1" is performed. That is, the red component of the pixel of the pixel number i of the extended focus image 55b is replaced with rni, and 1 is assigned to the update flag nF. r of the red component.

In S2904, "gni≧Gi" is determined. That is, the green components are compared, and it is determined whether or not the value gni of the slice image is equal to or larger than the value Gi of the extended focus image 55b (gni≧Gi). If the determination result is "YES", control is passed to S2905. If it is "NO", control is passed to S2906.

In S2905, the process of "green component of pixel i of extended focus image←gni, nF. g←1" is performed. That is, the green component of the pixel of the pixel number i of the extended focus image 55b is replaced with gni, and 1 is assigned to the update flag nF. g of the green component.

In S2906, "bni≧Bi" is determined. That is, the blue components are compared, and it is determined whether or not the value bni of the slice image is equal to or larger than the value Bi of the extended focus image 55b (bni≧Bi). If the determination result is "YES", control is passed to S2907. If it is "NO", the current process terminates.

In S2907, the process of "blue component of pixel i of extended focus image←bni, nF. b←1" is performed. That is, the blue component of the pixel of the pixel number i of the extended focus image 55b is replaced with bni, and 1 is assigned to the update flag nF. b of the blue component, thereby terminating the current process.

Then, by referring to FIG. 30, the process in the above-mentioned S2807 which is the surface form updating process 78 is explained below.

In FIG. 30, in S3001, the process of determining "generating method=red" is performed. That is, it is determined whether or not the generating method received from the surface form generation unit 79 is a generating method relating to a red component. If the determination result is "YES", then control is passed to S3002. If it is "NO", control is passed to S3004.

In S3002, the process of determining "nF. r=1" is performed. That is, it is determined whether or not nF. r is 1 (whether or not the update flag of the red component is 1). If the determination result is "YES", control is passed to S3003. If it is "NO", the present process terminates.

In S3003, the process of "component of pixel i of height image←Zn" is performed. That is, the component of the pixel of the pixel number i of the height image 55a is overwritten on the displacement information Zn, and the present process terminates.

In S3004, the process of determining "generating method=green" is performed. That is, it is determined whether or not the generating method received from the surface form generation unit 79 is a generating method relating to a green component. If the determination result is "YES", then control is passed to S3005. If it is "NO", control is passed to S3007.

In S3005, the process of determining "nF. g=1" is performed. That is, it is determined whether or not nF. g is 1 (whether or not the update flag of the green component is 1). If the determination result is "YES", control is passed to S3006. If it is "NO", the present process terminates.

In S3006, the process of "component of pixel i of height image←Zn" is performed. That is, the component of the pixel of the pixel number i of the height image 55a is overwritten on the displacement information Zn, and the present process terminates.

In S3007, the process of determining "nF. b=1" is performed. That is, it is determined whether or not nF. b is 1 (whether or not the update flag of the blue component is 1). If the determination result is "YES", control is passed to S3008. If it is "NO", the present process terminates.

In S3008, the process of "component of pixel i of height image←Zn" is performed. That is, the component of the pixel of the pixel number i of the height image 55a is overwritten on the displacement information Zn, and the present process terminates.

As described above, according to the fourth embodiment of the present invention, not only the correct surface data (surface form, surface color information, etc.) can be generated according to each slice image color-captured using the confocal optical system and the displacement information Zn obtained when the color-capture is performed, but also the extended focus image 55b close to the image observed by the nonconfocal optical system with reduced chromatic aberration specific to the confocal optical system can be generated by the pixel value (brightness value) of the peak of each color component of the I-Z curve represented as the color information about each pixel. In the present specifications, chromatic aberration refers to the difference in color in comparison with the observation using the nonconfocal optical system. Each time each slice image is stored, the surface data update means 53 updates the surface data. Therefore, the surface data, that is, the latest surface data, can be measured while being displayed on the display device, etc. (not shown in the attached drawings).

In the slice image storage unit 51, all color-captured slice images are stored, but only one image can be stored. Thus, the storage requirement of the storage medium which stores slice images can be reduced.

Furthermore, according to the present embodiment, the displacement information Zn is stored in the slice image storage unit 51, but it is not an indispensable configuration requirement. For example, the displacement information Zn corresponding to a slice image can be obtained from an external counter device, etc. (not shown in the attached drawings) through serial communications each time a new slice image is stored in the slice image storage unit 51.

Additionally, according to the present embodiment, as a notification event by the update request notification means 54 to the surface data update unit 53, a collective update request event to be issued when all slice images required in the measurement are stored in the slice image storage means 51 is set, and when the surface data update means 53 receives the collective update request event, all slice images from the head to the tail stored in the slice image storage means 51 can be collectively treated in the surface data updating process. In this case, the subject cannot be displayed until the process is completed. Therefore, other information can be displayed on the display device, etc. during the measurement (processing). Furthermore, when for the automated use in which it is not necessary to display data during the measurement, the process contents can be reduced, and the measuring speed (processing speed) can be increased.

Fifth Embodiment

In the fifth embodiment of the present invention, the difference from the fourth embodiment is the process relating to the update request notification means 54 and the surface data update means 53 in the controlling process performed by the CPU of the three-dimensional measurement apparatus. Therefore, the processes relating to the update request notification means 54 and the surface data update means 53 are mainly explained below. The controlling process relating to the fifth embodiment can be realized by the CPU of the above-mentioned three-dimensional measurement apparatus reading and executing the control program stored in the internal memory.

Figure 31:
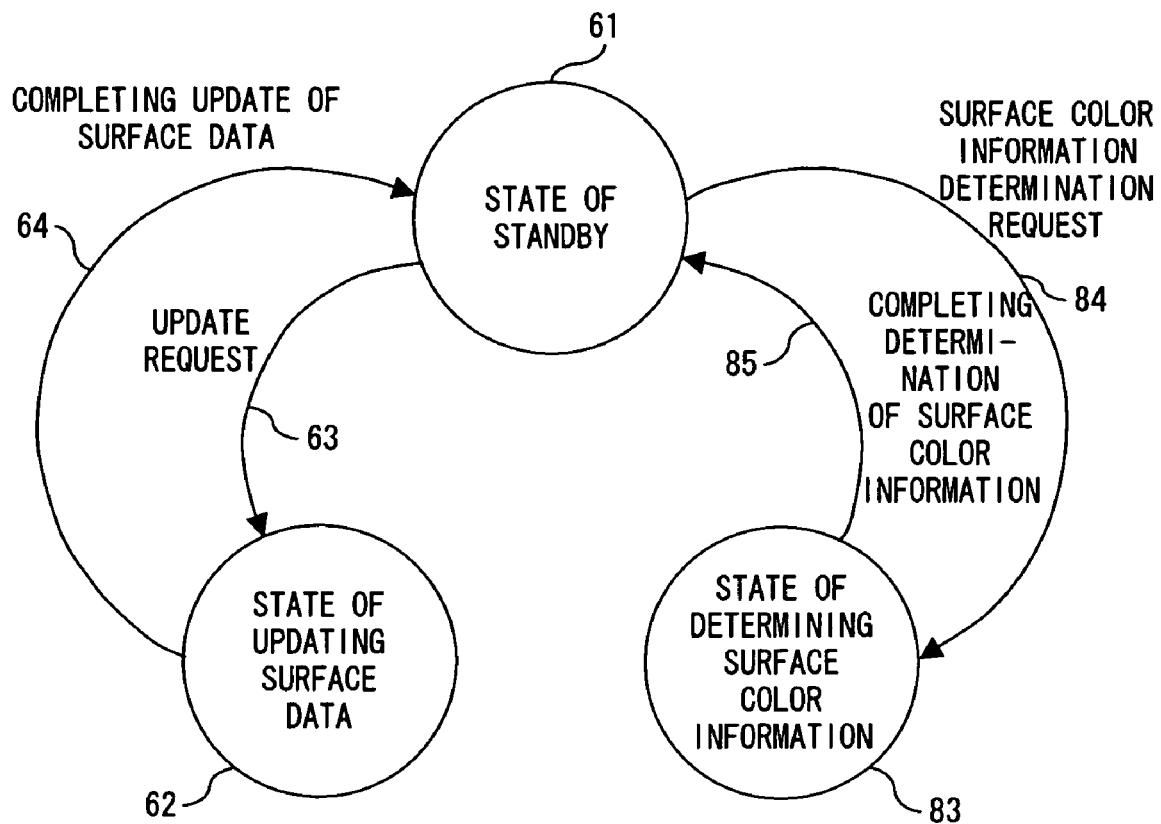
FIG. 31 shows the state transition of the surface data update unit according to the fifth embodiment of the present invention.

FIG. 31 shows the state transition of the surface data update means 53 according to the present embodiment, and FIG. 32 shows the data flow of the process relating to the surface data update means 53 according to the present embodiment.

First, the process relating to the update request notification means 54 of the present embodiment is explained by referring to FIG. 31.

FIG. 31 shows the state transition of the surface data update unit 53, and the state in which the surface data update means 53 is not performing a process is defined as the state of standby 61, and the state in which the surface data is being updated according to the slice image stored in the slice image storage means 51 and the displacement information $Z_n$ is defined as the state of updating surface data 62. In addition, the state in which the extended focus image 55b is determined based on the slice image and a color component height image 82 described later is defined as a state of determining surface color information 83. The update request notification means 54 provides a state transition event from the state of standby 61 to the state of updating surface data 62. It issues an update request event to the surface data update means 53 immediately after the slice image storage means 51 stores a new slice image and displacement information $Z_n$, and requests to update the surface data according to the newly stored slice image and displacement information $Z_n$. Upon receipt of the update request event in the state of standby 61, the surface data update means 53 enters the state of updating surface data 62 (arrow 63), thereby starting the surface data updating process 65. When the surface data updating process 65 is completed, the surface data update means 53 enters the state of standby 61 again (arrow 64), and awaits the next state transition event.

The update request notification means 54 provides a state transition event from the state of standby 61 to the state of determining surface color information 83. It issues a surface color information determination request event to the surface data update means 53 immediately after updating the surface data using all slice images and displacement information $Z_n$ required in measurement, and requests to determine the extended focus image 55b based on the slice image stored in the slice image storage means 51 and the color component height image 82 described later. Upon receipt of the surface color information determination request event in the state of standby 61, the surface data update means 53 enters the state of determining surface color information 83 (arrow 84), thereby starting a surface color information determining process 86. When the surface color information determining process 86 is completed, the surface data update means 53 enters the state of standby 61 again (arrow 85), thereby awaiting the next state transition event.

Described below is the process relating to the surface data update means 53 according to the present embodiment by referring to FIG. 32.

In FIG. 32, when the surface data update means 53 receives an update request event from the update request notification means 54, the surface data updating process 65 is started. The slice image storage means 51 passes the requested slice image (image of the slice image) and the image number n of the requested slice image to the surface data updating process 65 (arrow 66, 67), and the image number n of the requested slice image, the pixel number i, and the color information about the pixel of the pixel number i are passed to a surface color information updating process 70a (arrow 87, 68, 69) The slice image storage means 51 passes the displacement information $Z_n$ obtained by the displacement information obtaining means 52 to the surface data updating process 65 (arrow 71).

In the surface color information updating process 70a, the contents of the pixel of the pixel number i of the extended focus image 55b are updated as necessary (arrow 72, 73), and the corresponding color component of the pixel of the pixel number i of the color component height image 82 is updated to the image number n of the color component of the updated pixel of the pixel number i (arrow 88). Furthermore, the update flag nF indicating the presence/absence of the update is passed to the surface data updating process 65 (arrow 74). When the update flag nF is passed to the surface data updating process 65, the update flag nF, the pixel number i, and the above-mentioned displacement information $Z_n$ are passed to the surface form updating process 78 (arrow 75, 76, 77). In the surface form updating process 78, based on the predetermined generating method (arrow 80) input by the surface form generation unit 79 and the determination of the presence/absence of the update based on the update flag nF, the contents of the pixel of the pixel number i of the height image 55a are updated using the displacement information $Z_n$ obtained by the displacement information obtaining means 52 as necessary (arrow 81).

The above-mentioned process is repeated on all pixels of the requested slice image, and the update of the surface data is completed using the requested slice image. The process relating to one slice image is repeated on all slice images required in the measurement.

Thus, when the surface data update means 53 receives the surface color information determination request event from the update request notification means 54 immediately after the update of the surface data is completed according to all slice images and displacement information required in the measurement, the above-mentioned surface color information determining process 86 is started. In the surface color information determining process 86, the color component height image 82 and the slice image stored in the slice image storage means 51 are passed (arrow 89, 90), the extended focus image is determined, and the extended focus image 55b of the surface data storage means 55 is overwritten with the determined extended focus image (arrow 91).

Then, the above-mentioned surface color information updating process 70a and the surface color information determining process 86 are explained below in detail. Since the surface data updating process 65 and the surface form updating process 78 are similar to those shown in FIGS. 28 and 30, the explanation is omitted here.

Figure 33:
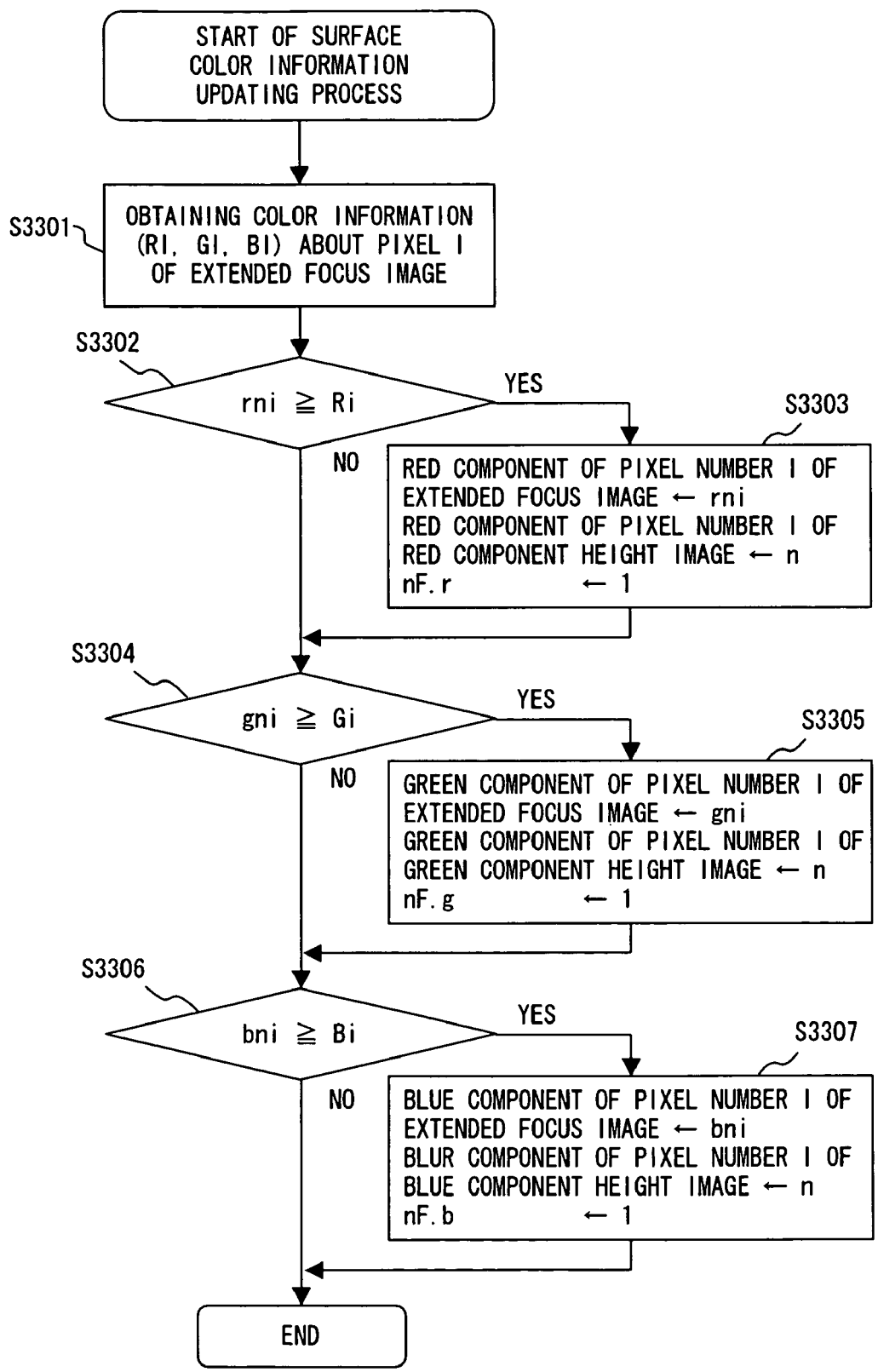
FIG. 33 is a flowchart showing the contents of the surface color information updating process.
Figure 35:
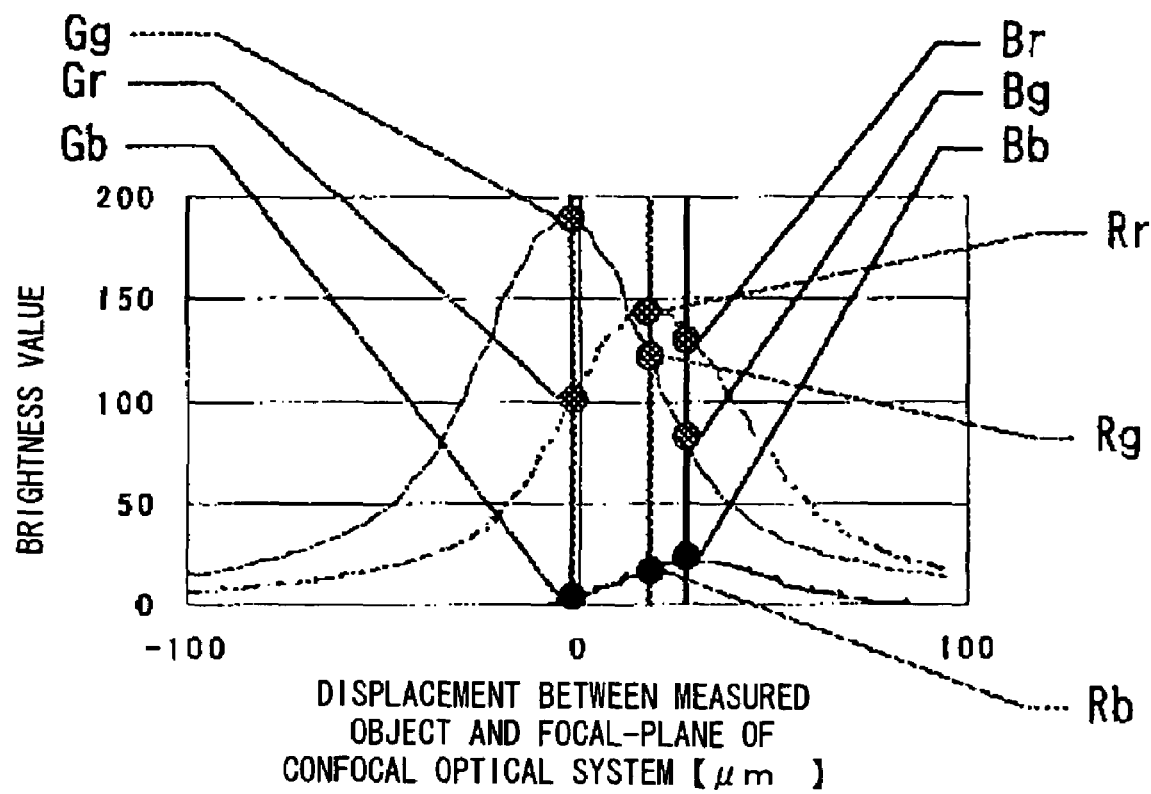
FIG. 35 shows the I-Z curve for explanation of FIG. 34.

FIG. 33 is a flowchart showing the contents of the surface color information updating process 70a, FIG. 34 is a flowchart showing the contents of the surface color information determining process 86, and FIG. 35 shows the I-Z curve for explanation of FIG. 34.

First, the surface color information updating process 70a is explained by referring to FIG. 33.

In FIG. 33, the process of "obtaining color information (Ri, Gi, Bi) about pixel i of extended focus image" is performed in S3301. That is, the color information Ri (red component), Gi (green component), and Bi (blur component) about the pixel of the pixel number i of the extended focus image 55b is obtained. When the surface data updating process 65 is started, the color information about each pixel of the extended focus image 55b is initialized, and the values are all 0.

In the subsequent processes in S3302 through S3307, the color components of the respective pixels of the pixel number i of the extended focus image 55b and the slice image are sequentially compared, and the corresponding processes are performed.

In S3302, "rni≧Ri" is determined. That is, the red components are compared, and it is determined whether or not the value rni of the slice image is equal to or larger than the value Ri of the extended focus image 55b (rni≧Ri). If the determination result is "YES", control is passed to S3303. If it is "NO", control is passed to S3304.

In S3303, the process of "red component of pixel number i of extended focus image←rni, red component of pixel number i of red component height image←n, nF. r←1" is performed. That is, the red component of the pixel of the pixel number i of the extended focus image 55b is replaced with rni, the red component of the pixel of the pixel number i of the color component height image 82 is replaced with the image number n, and 1 is assigned to the update flag nF. r of the red component.

In S3304, "gni≧Gi" is determined. That is, the green components are compared, and it is determined whether or not the value gni of the slice image is equal to or larger than the value Gi of the extended focus image 55b (gni≧Gi). If the determination result is "YES", control is passed to S3305. If it is "NO", control is passed to S3306.

In S3305, the process of "green component of pixel number i of extended focus image←gni, green component of pixel number i of green component height image←n, nF. g←1" is performed. That is, the green component of the pixel of the pixel number i of the extended focus image 55b is replaced with gni, the green component of the pixel of the pixel number i of the color component height image 82 is replaced with the image number n, and 1 is assigned to the update flag nF. g of the green component.

In S3306, "bni≧Bi" is determined. That is, the blue components are compared, and it is determined whether or not the value bni of the slice image is equal to or larger than the value Bi of the extended focus image 55b (bni≧Bi). If the determination result is "YES", control is passed to S3307. If it is "NO", the current process terminates.

In S3307, the process of "blue component of pixel number i of extended focus image←bni, blue component of pixel number i of blue component height image←n, nF. b←1" is performed. That is, the blue component of the pixel of the pixel number i of the extended focus image 55b is replaced with bni, the blue component of the pixel of the pixel number i of the color component height image 82 is replaced with the image number n, and 1 is assigned to the update flag nF. b of the blue component, thereby terminating the current process.

The surface color information determining process 86 is explained below by referring to FIG. 34.

In FIG. 34, first in S3401, the process of "i←0" is performed. That is, 0 is assigned to the pixel number i for which the color information is determined, and the leading pixel is defined as a target pixel.

In S3402, the process of determining "i<PIXEL_SIZE" is performed. That is, it is determined whether or not the color information is not determined on all pixels (whether or not i<PIXEL_SIZE). If the determination result is "YES", control is passed to S3403. If it is "NO", the present process terminates.

In S3403, the process of "Rh←red component of pixel i of color component height image, Gh←green component of pixel i of color component height image, Bh←blue component of pixel i of color component height image" is performed. That is, the heights Rh, Gh, and Bh of the respective color components of the pixel number i of the color component height image 82 are read. The Rh, Gh, and Bh indicate the image numbers of the slice image in which each component is the largest.

In S3404, the process of "Rr←red component of pixel i of slice image of image number Rh, Rg←green component of pixel i of slice image of image number Rh, Rb←blue component of pixel i of slice image of image number Rh, Gr←red component of pixel i of slice image of image number Gh, Gg←green component of pixel i of slice image of image number Gh, Gb←blue component of pixel i of slice image of image number Gh, Br←red component of pixel i of slice image of image number Bh, Bg←green component of pixel i of slice image of image number Bh, and Bb←blue component of pixel i of slice image of image number Bh," is performed. That is, the value of each color component of the pixel of the pixel number i is obtained for the slice image of the respective image numbers of Rh, Gh, and Bh. Then, the red component, green component, and blue component of the pixel of the pixel number i of the slice image of the image number Rh are respectively assigned to Rr, Rg, and Rb. Similarly, the red component, green component, and blue component of the pixel of the pixel number i of the slice image of the image number Gh are respectively assigned to Gr, Gg, and Gb, and the red component, green component, and blue component of the pixel of the pixel number i of the slice image of the image number Bh are respectively assigned to Br, Bg, and Bb.

FIG. 35 shows the Rr, Rg, Rb, Gr, Gg, Gb, Br, Bg, and Bb on the I-Z curve. That is, as shown in FIG. 35, the red component, green component, and blue component obtained when the maximum value of the red component is obtained are represented by Rr, Rg, and Rb; the red component, green component, and blue component obtained when the maximum value of the green component is obtained are represented by Gr, Gg, and Gb; and the red component, green component, and blue component obtained when the maximum value of the blue component is obtained are represented by Br, Bg, and Bb.

Back in FIG. 34, in S3405, the process of "Ri←(Rr+Gr+Br)/3, Gi←(Rg+Gg+Bg)/3, Bi←(Rb+Gb+Bb)/3" is performed. That is, based on Rr, Rg, Rb, Gr, Gg, Gb, Br, Bg, and Bb obtained in the preceding step, the average value of each color component of the pixel number i of the three slice images of each image number of Rh, Gh, and Bh is calculated. That is, the average value Ri of the red component is obtained by (Rr+Gr+Br)/3; the average value Gi of the green component is obtained by (Rg+Gg+Bg)/3; and the average value Bi of the blue component is obtained by (Rb+Gb+Bb)/3.

In S3406, the process of "red component of pixel i of extended focus image←Ri, green component of pixel i of extended focus image←Gi, blue component of pixel i of extended focus image←Bi" is performed. That is, as the determined color information, Ri, Gi, and Bi obtained in the preceding step are overwritten as the respective color components of the pixel of the pixel number i of the extended focus image 55b. Thus, the color information about the pixel number i is determined.

In S3407, the process of "i←i+1" is performed. That is, i is incremented, the target pixel number i is defined as the next image number, and control is returned to S3402.

As described above, according to the fifth embodiment of the present invention, not only the correct surface data (surface form, surface color information, etc.) can be generated according to each slice image color-captured using the confocal optical system and the displacement information Zn obtained when the color-capture is performed, but also the extended focus image close to the image observed by the nonconfocal optical system with reduced chromatic aberration specific to the confocal optical system can be generated by the average value of each color component of a plurality of slice images of the peak of each color component of the I-Z curve represented as the color information about each pixel.

In the present embodiment, an extended focus image determined by the surface color information determining process 86 cannot be displayed on the display device, etc. until the measurement (process) is completed. However, the surface data is updated by the surface data update means 53 each time each slice image is stored. Therefore, the updated surface data, that is, the latest surface data, can be constantly displayed on the display device, etc. Thus, the progress of the measurement (process) can be confirmed.

According to the present embodiment, the displacement information Zn is stored in the slice image storage means 51, but it is not an indispensable configuration requirement. For example, the displacement information Zn corresponding to a slice image can be obtained from an external counter device, etc. through serial communications each time a new slice image is stored in the slice image storage means 51.

Sixth Embodiment

In the sixth embodiment, the difference from the fourth embodiment is the configuration of the slice image storage means 51 and the process relating to the surface data update means 53 in the controlling process performed by the CPU of the three-dimensional measurement apparatus. Therefore, the configuration of the slice image storage unit and the process relating to the surface data update means 53 are mainly explained. The controlling process according to the present embodiment is realized by the CPU of the three-dimensional measurement apparatus reading and executing the control program stored in the internal memory.

Figure 36:
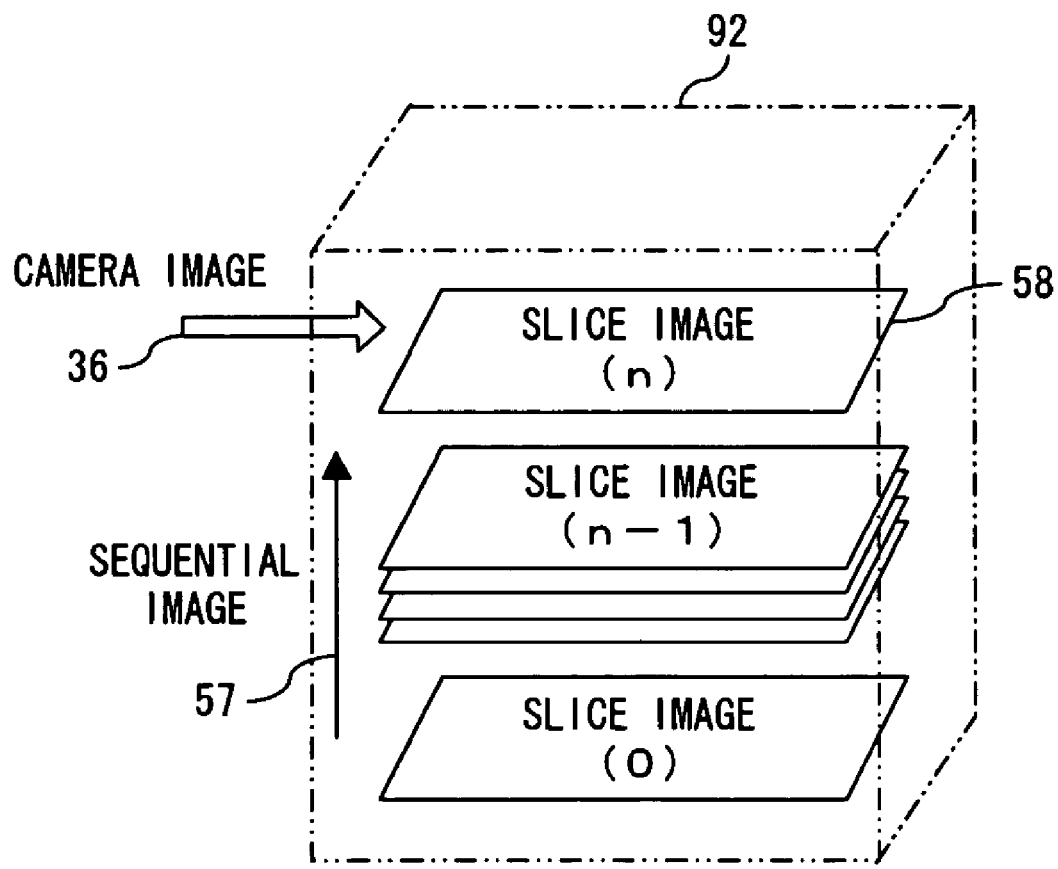
FIG. 36 shows an example of the configuration of the slice image storage unit according to the sixth embodiment of the present invention.

FIG. 36 shows an example of the configuration of a slice image storage unit 92 according to the present embodiment. FIG. 37 shows the data flow of the process relating to the surface data update means 53 according to the present embodiment.

First, the configuration of the slice image storage unit 92 according to the present embodiment is explained by referring to FIG. 36.

As shown in FIG. 36, the slice image storage unit 92 according to the present embodiment is not provided with the displacement information obtaining means 52 unlike the configuration shown in FIG. 24. Therefore, no displacement information Zn is stored. According to the present embodiment, the displacement information Zn is obtained by the calculation in the surface data updating process 65a described later using the image number n and the amount of step movement 93 described later.

In the process relating to the update request notification means 54 of the present embodiment, the process similar to that explained above by referring to FIG. 31 is performed. That is, each time a new slice image is stored in the slice image storage unit 92, an update request event is issued to the surface data update unit 53, and a surface color information determination request event is issued to the surface data update means 53 immediately after the update of the surface data is completed using all slice images required in the measurement.

Then, the process relating to the surface data update means 53 according to the present embodiment is explained below by referring to FIG. 37.

The process relating to the surface data update means 53 according to the present embodiment is a variation of the process explained above by referring to FIG. 27. The difference is that a surface color information determining process 86a, an amount of step movement 93, and filter information 94 are newly added. The amount of step movement 93 refers to a pitch used when each slice image is color-captured with the amount of displacement between the focal-plane of the confocal optical system and the sample displaced at an equal pitch. The filter information 94 refers to the information for making the surface color information determined in the surface color information determining process 86a close to the actual sample.

In FIG. 37, no displacement information Zn is passed to the surface data updating process 65a, but the amount of step movement (Zstep) 93 is passed (arrow 95). A slice image from a slice image storage unit 92a, the amount of step movement (Z step) 93, the height Zi of the pixel number i from the height image 55a, and the filter information 94 are passed to the surface color information determining process 86a (arrow 90, 96, 97, 98), a determined extended focus image is passed to the surface data storage unit 55, and the extended focus image 55b is overwritten with the determined extended focus image (arrow 99).

Then, the surface data updating process 65a and the surface color information determining process 86a are described below in more detail.

Figure 38:
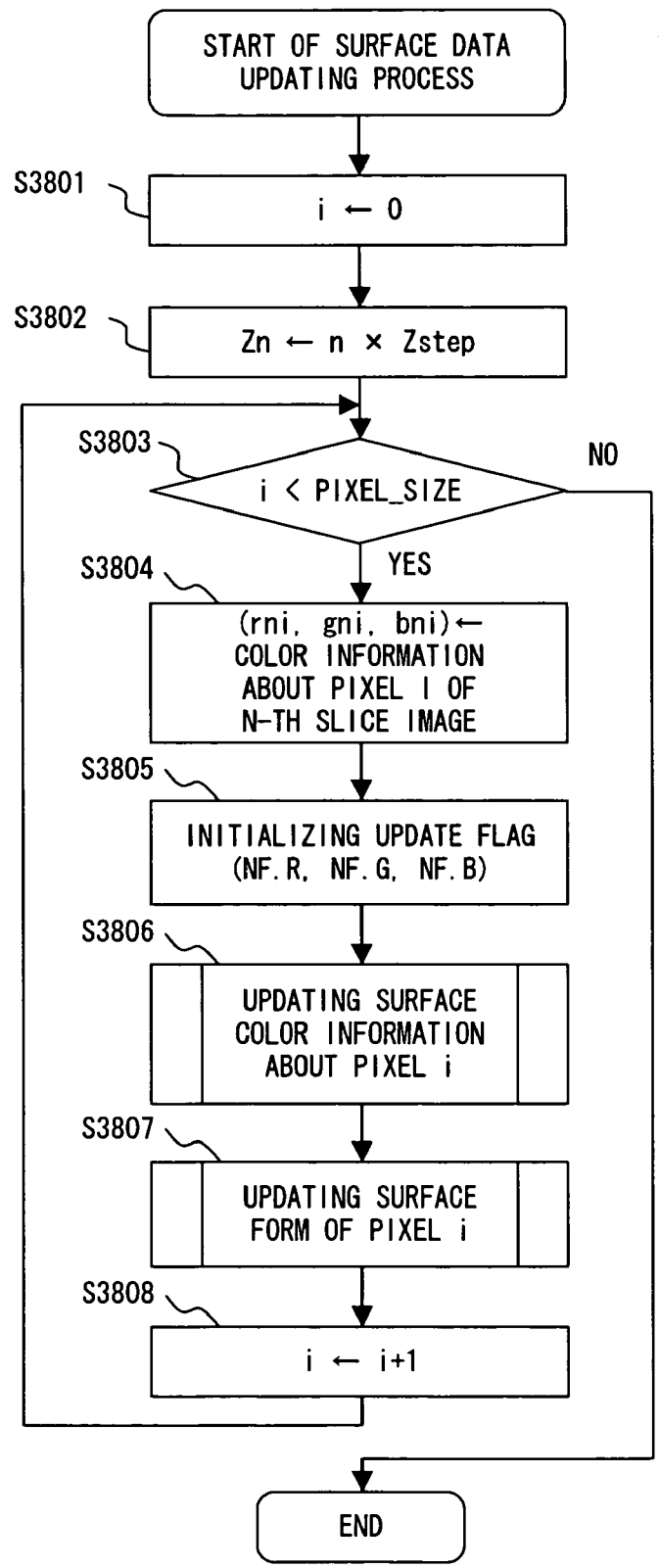
FIG. 38 is a flowchart showing the contents of the surface data updating process.
Figure 39:
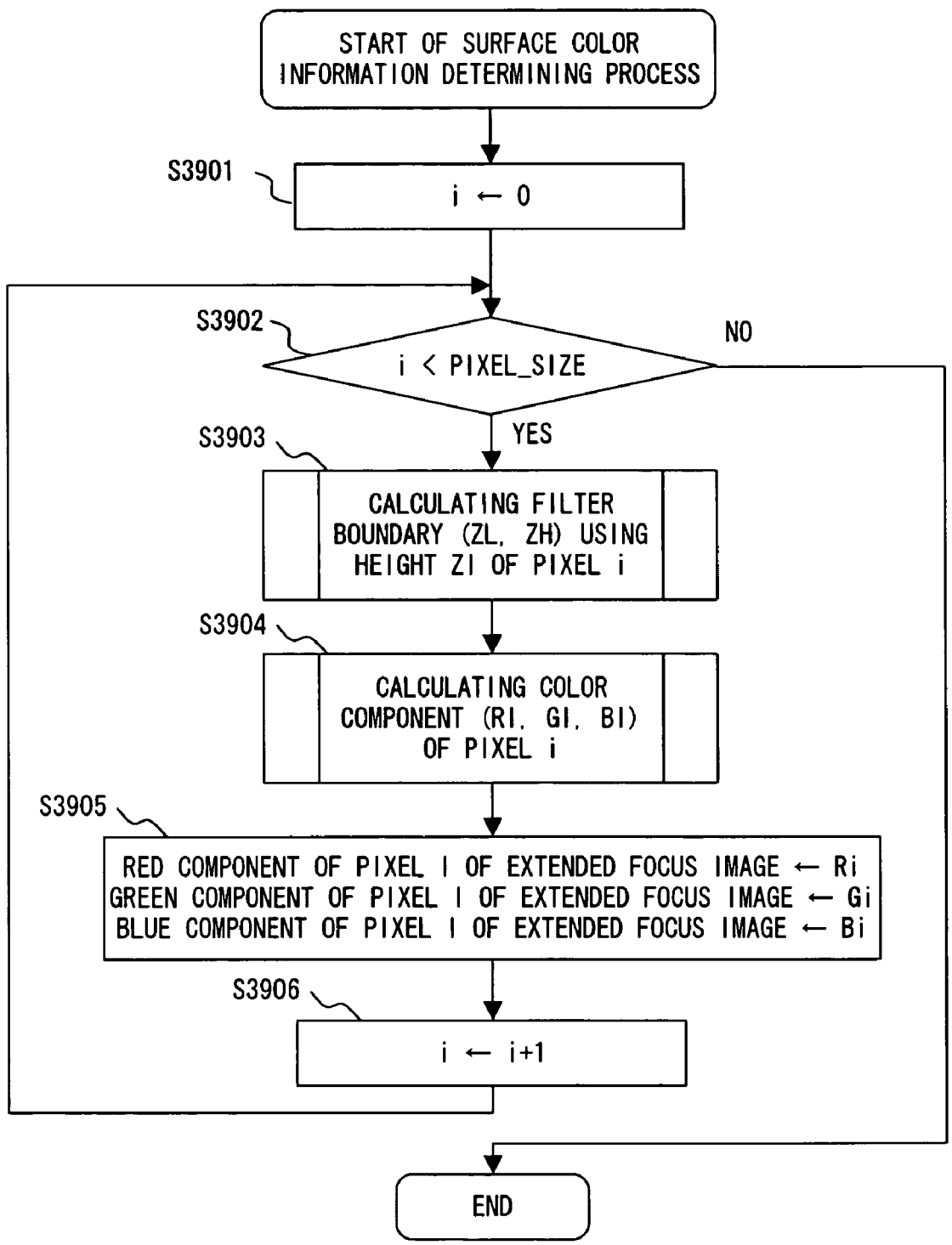
FIG. 39 is a flowchart showing the contents of the surface color information determining process.
Figure 40:
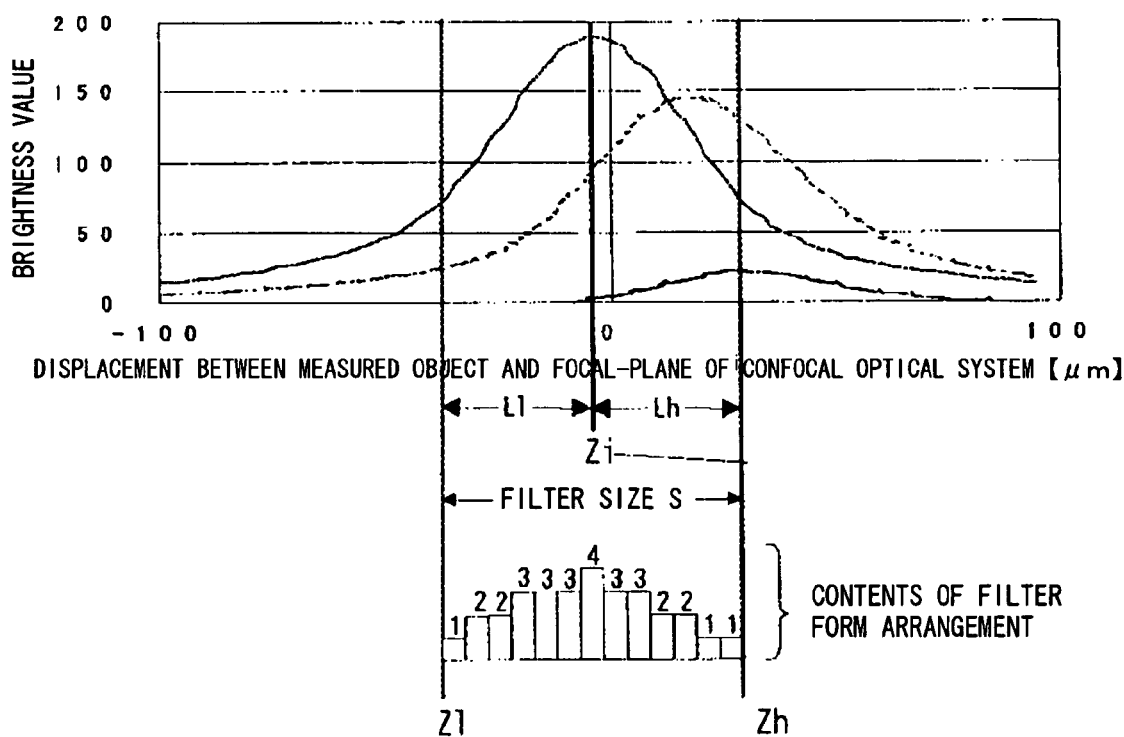
FIG. 40 shows the I-Z curve for explanation of FIG. 39.

FIG. 38 is a flowchart showing the contents of the surface data updating process 65a, FIG. 39 is a flowchart showing the contents of the surface color information determining process 86a, and FIG. 40 shows the I-Z curve for explanation of FIG. 39.

First, the surface data updating process 65a is explained below by referring to FIG. 38.

In FIG. 38, first in S3801, the process of "i←0" is performed. That is, 0 is assigned to the target pixel number i in updating the surface data, and the leading pixel is defined as a target pixel.

In S3802, the process of "Zn←n*Z step" is performed. That is, the displacement information Zn is obtained from the image number n and the amount of step movement Z step. The displacement information Zn is obtained by the calculation of n×Z step.

In S3803, the process of determining "i<PIXEL_SIZE" is performed. That is, it is determined whether or not the updating process on the surface data about all pixels has not been completed (whether or not i<PIXEL_SIZE). If the determination result is "YES", control is passed to S3804. If it is "NO", the present process terminates.

In S3804, the process of "(rni, gni, bni)←color information about pixel i of n-th slice image" is performed. That is, the color information rni (red component), gni (green component), and bni (blue component) of the pixel of the pixel number i of the n-th slice image is obtained.

In S3805, the process of "initialization of update flag (nf. r, nf. g, nf. b)" is performed. That is, the update flag nF. r (presence/absence of update of red component), nF. g (presence/absence of update of green component), nf. b (presence/absence of update of blue component) indicating the presence/absence of the update of each pixel is initialized to zero.

In S3806, the process of "updating surface color information about pixel i" is performed. That is, the surface color information updating process 70 shown in FIG. 29 for the pixel number i is performed.

In S3807, the process of "updating surface form of pixel i" is performed. That is, the surface form updating process 78 shown in FIG. 30 on the pixel number i is performed.

In S3808, the process of "i←i+1" is performed. That is, i+1 is assigned to i, and the pixel number i is updated to the next pixel number, thereby returning control to S3803.

The surface color information determining process 86s is described below by referring to FIG. 39.

In FIG. 39, first in S3901, the process of "i←0" is performed. That is, 0 is assigned to the target pixel number i for which the color information is determined, and the leading pixel is defined as a target pixel.

In S3902, the process of determining "i<PIXEL_SIZE" is performed. That is, it is determined whether or not the color information has not been determined on all pixels (whether or not i<PIXEL_SIZE). If the determination result is "YES", control is passed to S3903. If it is "NO", the present process terminates.

In S3903, the process of "calculating filter boundary (Zl, Zh) using height Zi of pixel i" is performed. That is, the lower limit amount of displacement Zl and the upper limit amount of displacement Zh are obtained by the following equations (1) and (2) using the height Zi of the pixel number i which is the reference amount of displacement read from the height image 55a, the amount of step movement Z step, and the filter boundary information Ll, Lh read from the filter information 94.

$$Zl = Zi - Ll * Zstep \quad \text{equation (1)}$$

$$Zh = Zi + Lh * Zstep \quad \text{equation (2)}$$

The filter boundary information Ll and Lh is designated by, for example, an operator, etc.

In S3904, the process of "calculating color component (Ri, Gi, Bi) of pixel i" is performed. That is, the color components Ri (red), Gi (green), and Bi (blue) of the pixel number i are obtained by the following equations (3), (4), and (5) using to all color information about the pixel i of the slice image in the range of the filter boundary, and the filter form array which is the array stored the filter form.

$$Ri = \left( \frac{\sum_{n=Zl/Zstep}^{Zh/Zstep} \left\{ \begin{array}{l} \text{red component of pixel } i \text{ of image} \\ \text{number } n \times \text{filter}[n - Z // Zstep] \end{array} \right\}}{Zh/Zstep - Zl/Zstep} \right) \quad \text{equation (3)}$$

$$Gi = \left( \frac{\sum_{n=Zl/Zstep}^{Zh/Zstep} \left\{ \begin{array}{l} \text{green component of pixel } i \text{ of image} \\ \text{number } n \times \text{filter}[n - Zl/Zstep] \end{array} \right\}}{Zh/Zstep - Zl/Zstep} \right) \quad \text{equation (4)}$$

$$Bi = \left( \frac{\sum_{n=Zl/Zstep}^{Zh/Zstep} \left\{ \begin{array}{l} \text{blue component of pixel } i \text{ of image} \\ \text{number } n \times \text{filter}[n - Zl/Zstep] \end{array} \right\}}{Zh/Zstep - Zl/Zstep} \right) \quad \text{equation (5)}$$

Ri (red), Gi (green), and Bi (blue) obtained in the equations (1) through (5) are described below in more detail by referring to FIG. 40.

FIG. 40 shows an I-Z curve based on each color component of the pixel of the pixel number i. In the present embodiment, the generating method relating to a green component (G) selected as a surface form generating method is explained.

In this case, the height of the pixel of the pixel number i of the height image 55a is Zi which is the peak position of the I-Z curve of the green component as shown in FIG. 40. Zl and Zh for designation of the filter size (S shown in FIG. 40) are calculated by the above-mentioned equations (1) and (2) according to the height Zi, the Ll and Lh which are the filter boundary information, and the amount of step movement Z step. For each color component, the average value obtained by weighting the brightness value at each amount of displacement (each height) contained in the range of Zl and Zh, that is, the average value of the values each of which is obtained by multiplying the brightness value at each amount of displacement by the corresponding filter form array (filter shown in FIG. 40), is obtained, and the average value of each color component is defined as each color component (Ri (red), Gi (green), Bi (blue)) of the pixel of the pixel number i. The filter form array used in the present embodiment is, as shown in FIG. 40, filter [0]=1, filter [1]=2, filter [2]=2, filter [3]=3, filter [4]=3, filter [5]=3, filter [6]=4, filter [7]=3, filter [8]=3, filter [9]=2, filter [10]=2, filter [11]=1, and filter [12]=1, wherein the closer in height corresponding to the peak position of the I-Z curve, the larger in weight. On the other hand, the farther in height corresponding to the peak position, the smaller in weight.

Back in FIG. 39, the process of "red component of pixel i of extended focus image←Ri, green component of pixel i of extended focus image←Gi, and blue component of pixel i of extended focus image←Bi" is performed in S3905. That is, the color components Ri (red), Gi (green), and Bi (blue) of the pixel number i obtained in the preceding step are overwritten respectively on the red component, green component, and blue component of the extended focus image 55b. Thus, the color information about the pixel number i is determined.

In S3906, the process of "i←i+1" is performed. That is, i is incremented, and the target pixel number i is defined as the next pixel number, thereby returning control to the process in S3902.

As described above, according to the sixth embodiment, not only the correct surface data (surface form, surface color information, etc.) can be generated based on each slice image color-captured through the confocal optical system and the amount of step movement at the time, but also the extended focus image close to the image observed by the nonconfocal optical system with reduced chromatic aberration specific to the confocal optical system can be generated by the average value obtained by weighting the brightness value of each amount of displacement (each height) in the range of the lower limit amount of displacement Zl and the upper limit amount of displacement Zh of each color component of the I-Z curve represented as the color information about each pixel.

In the present embodiment, the extended focus image determined in the surface color information determining process 86a cannot be displayed on the display device, etc. until the measurement (process) is completed, but the surface data update means 53 updates the surface data each time each slice image is stored. Therefore, for example, the updated surface data, that is, the latest surface data, can be constantly displayed on the display device, etc. Thus, the progress of the measurement (process) can be confirmed.

According to the fourth through sixth embodiments of the present invention, in the slice image storage means 51 and 92 shown in FIGS. 24 and 36, a stored slice image has a plurality of color components. However, for example, a slice image can be stored for each color component. FIG. 41 shows an example of the configuration of such a slice image storage unit. In the example shown in FIG. 41, one slice image shown in FIGS. 24 and 36 is stored as three slice images for each color component as indicated by the arrows 56r, 56g, and 56b, that is, an example of storing a slice image of the red component (R), a slice image of the green component (G), and a slice image of the blue component (B) In the present embodiment, each of the color components rni, gni, and bni of the pixel of the pixel number i of the slice image of the image number n is obtained respectively from the slice image (R (n)) of the red component, the slice image (G (n)) of the green component, and the slice image (B (n)) of the blue component. With the above-mentioned configuration, the measurement using a slice image captured by a plurality of capture apparatuses each having selective sensitivity for a different color component can be realized.

Furthermore, in the fourth through sixth embodiments, the surface data update means 53 can comprise a color correction lookup table for each color component so that obtained color information can be converted according to the color correction lookup table, and then the extended focus image 55b can be overwritten. Thus, although the color information obtained in the surface color information updating process 70 (70a) or the surface color information determining process 86 (86a) is different from the color information of the actual sample, it can be corrected according to the color correction lookup table. At this time, the contents of the amount of the correction stored in the color correction lookup table can be the color component after the correction directly stored in the table, or the color coordinate conversion can be performed on the color information using the color coordinates of XYZ, etc., and the resultant hue information, brightness information, and the combination of them can also be available.

At this time, the contents of the amount of the correction stored in the color correction lookup table can be the color component after the correction directly stored in the table, or the color information can be used as the hue information, the brightness information, or the combination of them after the color coordinate conversion using the color coordinates of XYZ, etc.

Furthermore, in the surface color information updating process 70 (70a) or the surface color information determining process 86 (86a), the color information can be updated or determined based on the close correlation in color information between vicinal pixels of a normal image using a vicinal color value to suppress a pseudo color.

In the fourth through sixth embodiments of the present invention, the light of a plurality of wavelengths from the sample color-captured by a capture apparatus, etc. through a confocal optical system and stored as color information (slice image) is obtained by, for example, a disk scanning or laser scanning confocal scanning microscope.

In the fourth through sixth embodiments, the controlling process performed by the CPU of the three-dimensional measurement apparatus can also be executed by a computer. In this case, the control program stored in the internal memory of the three-dimensional measurement apparatus can be stored in a portable storage medium 102 such as CD-ROM 100, a flexible disk 101 (or MO, DVD, CD-R, CD-RW, removable hard disk, etc.), the inserted (arrow 103) portable storage medium 102 can be read by a medium drive device 105 of a computer 104, a read control program can be stored in internal memory (RAM, ROM, hard disk, etc.) 106 of the computer 104, and the control program can be executed by the computer 104. Otherwise, the control program can be stored in a storage unit (database, etc.) 108 in an external device (server, etc.) 107 of an information provider, transferred to the computer 104 in the communications through a network circuit 109, stored in the memory 106, and executed by the computer 104. The control program stored in the above-mentioned units can be executed only for a part of the controlling process performed by the CPU of the three-dimensional measurement apparatus.

As described above, according to the fourth through sixth embodiments of the present invention, the color information corresponding to the surface form of a sample obtained through the confocal optical system can be a color close to the actual sample, and can be easily compared with the actual sample.

Seventh Embodiment

Figure 43:
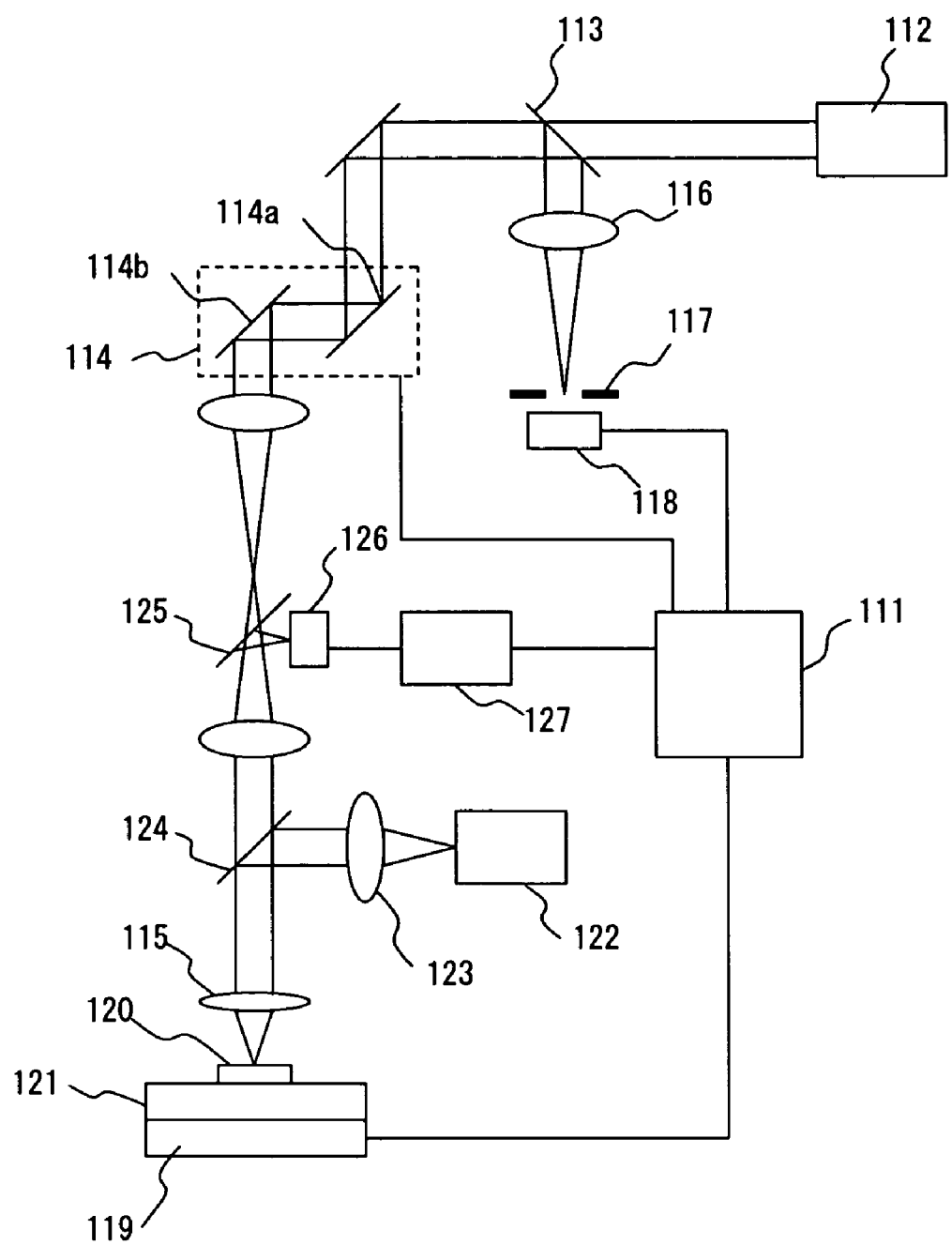
FIG. 43 shows an example of the configuration of the confocal color microscope according to the seventh embodiment of the present invention.

FIG. 43 shows an example of the configuration of the confocal color microscope according to the seventh embodiment of the present invention.

The confocal color microscope shown in FIG. 43 comprises the computer 111, the configuration for obtaining the surface form information (three-dimensional confocal microscopic image, height information) about a sample, the configuration for obtaining the color information (color image) about a sample, etc.

The computer 111 comprises a CPU (central processing unit) for controlling the operation of the entire confocal color microscope by executing the control program stored in advance in the internal memory, an operation unit for a keyboard, a mouse, etc. which accepts various instructions from the user, a display unit for displaying data relating to the GUI (graphical user interface) and images, etc., and so on.

The configuration for obtaining the surface form information about a sample includes a light source 112, a beam splitter 113, a two-dimensional scanning mechanism 114, an objective lens 115, an imaging lens 116, a pinhole 117, a photodetector 118, etc. The two-dimensional scanning mechanism 114, the photodetector 118 and a Z stage 119 are controlled by the computer 111. In the configuration of obtaining the surface form information, the light emitted from the light source 112 (laser beam, etc.) is passed through the beam splitter 113, and enters the two-dimensional scanning mechanism 114. The two-dimensional scanning mechanism 114 comprises a first optical scanner 114a and a second optical scanner 114b, performs scanning using optical flux in a two-dimensional manner, and leads the optical flux to the objective lens 115. Thus, the optical flux input to the objective lens 115 is converged by the objective lens 115 for scanning on the surface of a sample 120. The light from the surface of the sample 120, that is, the reflected light in this embodiment, passes through the objective lens 16 again, is led to the beam splitter 113 through the two-dimensional scanning mechanism 114, reflected by the beam splitter 113, and converged on the pinhole 117s by the imaging lens 116. The pinholes 117 are in the positions optically conjugate with the converging position by the objective lens 115. When the sample 120 is in the converging position by the objective lens 115, the reflected light from the sample 120 is converged on the pinhole 117s, and passes through the pinholes 117. When the sample 120 is not in the converging position by the objective lens 115, the reflected light from the sample 120 is not converged on the pinhole 117s, and cannot pass through the pinholes 117. Therefore, the reflected light from the point other than the converging point on the sample 120 is cut off by the pinholes 117, and only the light passing through the pinholes 117 are detected by the photodetector 118. The sample 120 is placed on a sample mount 121, and can be moved in the optical axial direction by the Z stage 119. With the above-mentioned configuration, the two dimensional scanning is performed on the converging point by the two-dimensional scanning mechanism 114, and the output of the photodetector 118 is formed as an image in synchronization with the two-dimensional scanning mechanism 114, thereby imaging only the specific height of the sample 120, and obtaining an image (confocal microscopic image) optically sliced from the sample 120. Furthermore, the sample 120 is discretely moved in the optical axial direction, the two-dimensional scanning mechanism 114 scans in each position and obtains a confocal microscopic image, the surface form (surface form information) is obtained depending on the sample 120 by detecting the position of the Z stage 119 in which the output of the photodetector 118 is the maximum at each point of the sample surface, and a three-dimensional image (three-dimensional confocal microscopic image) of the sample 120 depending on the surface form can be obtained.

The configuration for obtaining the color information about a sample includes a white light source 122, a lens 123, half mirrors 124 and 125, a color CCD 126, a CCD drive circuit 127, etc. The CCD drive circuit 127 is controlled by the computer 111. With the configuration of obtaining the color information, the white light output from the white light source 122 passes through the lens 123, the optical path is changed by the half mirror 124, and the light is converged by the objective lens 115 on the surface of the sample 120 on the sample mount 121. The white light reflected by the sample 120 passes through the objective lens 115, the half mirror 124, etc., the optical path is changed by the half mirror 125, and the light enters the color CCD 126 and an image is formed. The color CCD 126 is provided in the position conjugate with the pinholes 117. The analog signal depending on the color image of the sample 120 captured by the color CCD 126 is read by the CCD drive circuit 127, output to the computer 111, and is converted by the computer 111 into a digital signal. Thus, the color information is obtained depending on the captured sample 120, and a color image of the sample 120 can be obtained according to the color information.

Thus, by combining the color image of the sample 120 obtained with the configuration for obtaining color information with the three-dimensional image of the sample 120 obtained with the configuration for obtaining the above-mentioned surface form information, a three-dimensional color image (three-dimensional confocal color microscopic image, three-dimensional confocal color microscopic image having color information) depending on the sample 120 can be obtained.

Figure 44:
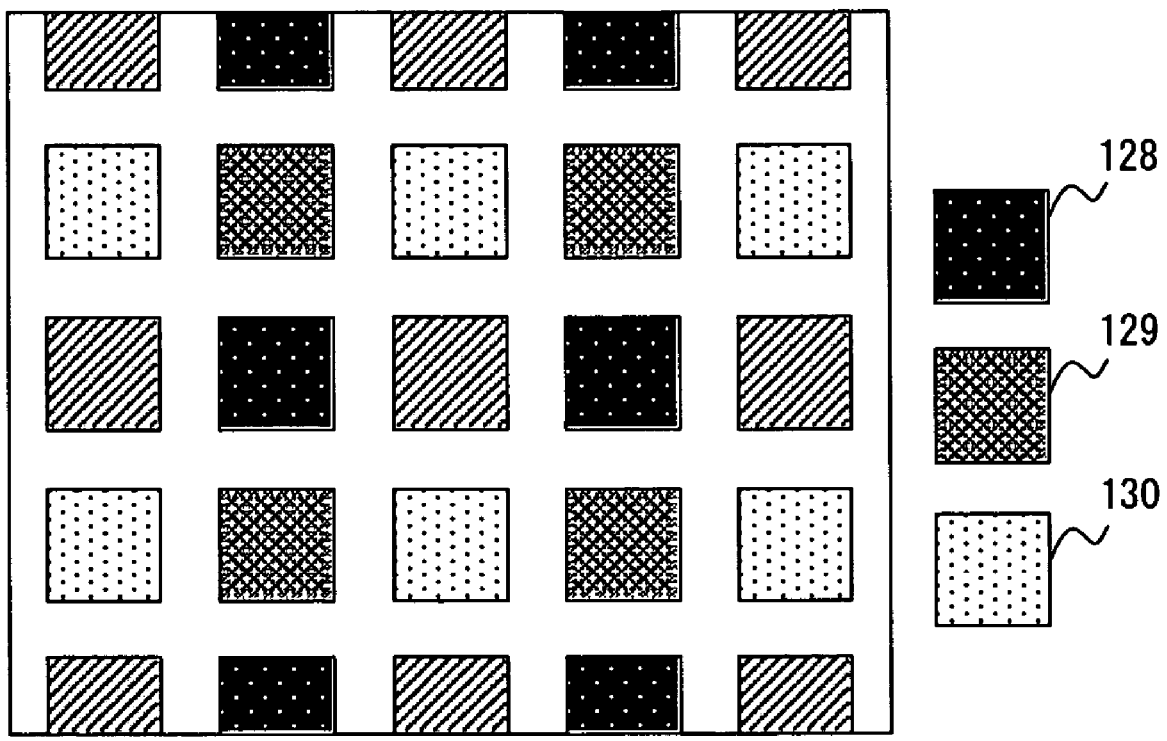
FIG. 44 shows an example of a three-dimensional color image.

FIGS. 44 and 45 show an example of a three-dimensional color image obtained then, and depend on the sample whose sample surface has a plurality of colors.

FIG. 44 shows an example of a three-dimensional color image depending on the sample indicating a single color in each area (enclosed by the rectangle shown in FIG. 44) of the sample surface. In FIG. 44, the portion corresponding to 128 is red, the portion corresponding to 129 is blue, and the portion corresponding to 130 is yellow.

FIG. 45 shows an example of a three-dimensional color image depending on the sample indicating uneven color (fluctuation in density, etc.) in each area (enclosed by the circle shown in FIG. 45) of the sample surface. In FIG. 45, the portion corresponding to 131 is unevenly red. The portion corresponding to 132 is unevenly blue, and the portion corresponding to 133 is unevenly purple.

Then, the measuring process performed by the CPU of the computer 111 is described below. The measuring process is realized by the CPU of the computer 111 reading and executing the control program stored in the internal memory.

Figure 46:
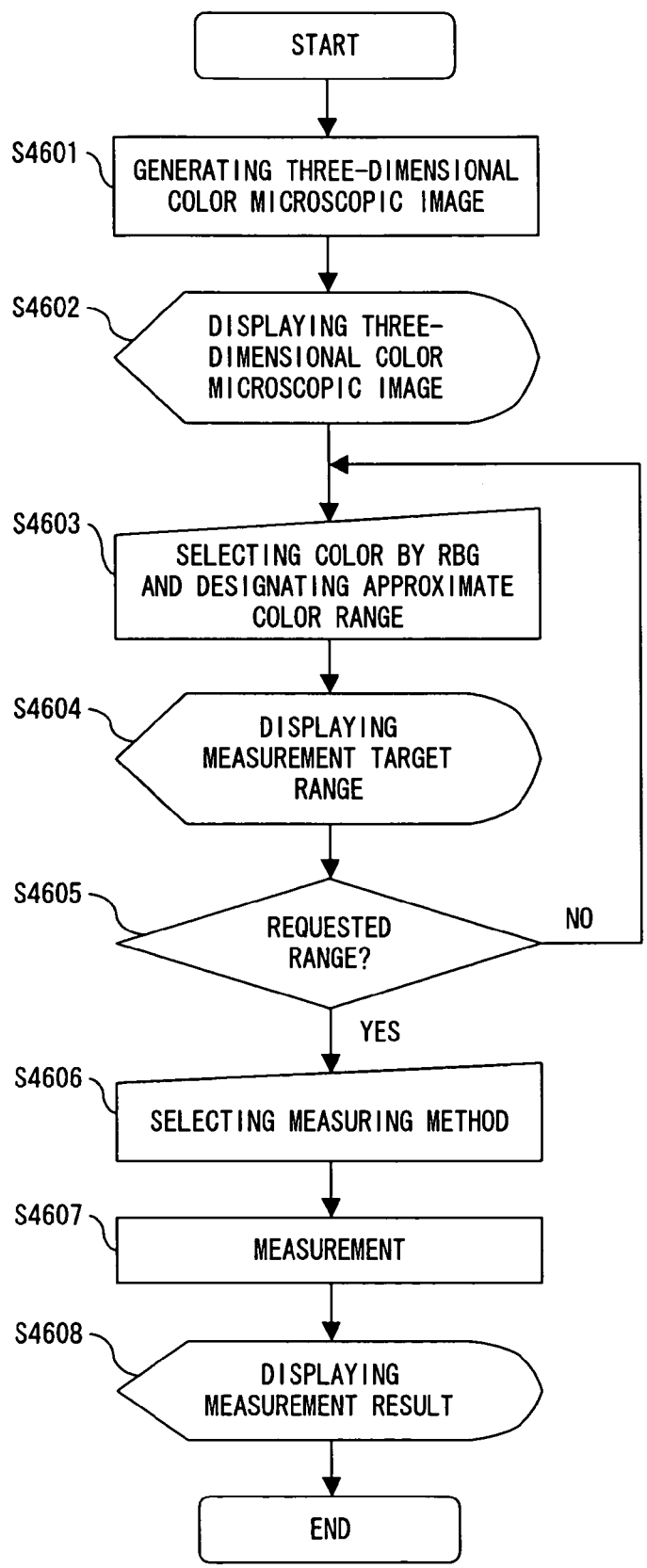
FIG. 46 is a flowchart showing the contents of the measuring process according to the seventh embodiment of the present invention.

FIG. 46 is a flowchart showing the contents of the measuring process according to the seventh embodiment of the present invention.

In FIG. 46, first in S4601, the process of "generating a three-dimensional color microscopic image" is performed. That is, a three-dimensional color image is generated and obtained. As described above, the three-dimensional color image is generated by combining the three-dimensional image according to the obtained surface form information with the color image according to the obtained color information.

In S4602, the process of "displaying three-dimensional color microscopic image" is performed. That is, the display unit of the computer 111 displays a three-dimensional color image generated in the preceding step, and a color selection GUI is displayed.

The color selection GUI according to the present embodiment provides the function of an interface for accepting an indication about color information (color) from a user. For example, the function of selecting a corresponding color according to a numeral indication about the content of three primary colors of red (R), blue (B), and green (G), the function of selecting a corresponding color by an indication of a color on a color palette (color sample), the function of selecting a corresponding color by a numeral indication of the density, brightness, hue, chroma, lightness, etc. of the designated color (the density, brightness, hue, chroma, lightness, etc. are hereinafter referred to simply as density, etc.), the function of selecting the color in a corresponding range by a numeral indication of the range of the density of a designated color, etc., the function of selecting the color in a predetermined corresponding range by an indication of the position on a color map, etc. are provided.

In S4603, the process of "selecting color by RBG and designating approximate color range" is performed. That is, the designation of a color can be received through the color selection GUI. However, in the present step, the user designates the content of the three primary colors by numbers, and the colors contained in the corresponding range, that is, in the approximate color range can be selected by a numeral indication of the range of the density, etc. of the specified color. Thus, the area of the three-dimensional color image having the same colors as the color in the approximate color range can be selected as the measuring range of the sample 120.

In S4604, the process of "displaying measurement target range" is performed. That is, a three-dimensional color image in which the range as a measuring range which is a range corresponding to the color in the approximate color range selected in the preceding step distinguished from other areas is displayed on the display unit of the computer 111.

Figure 47:
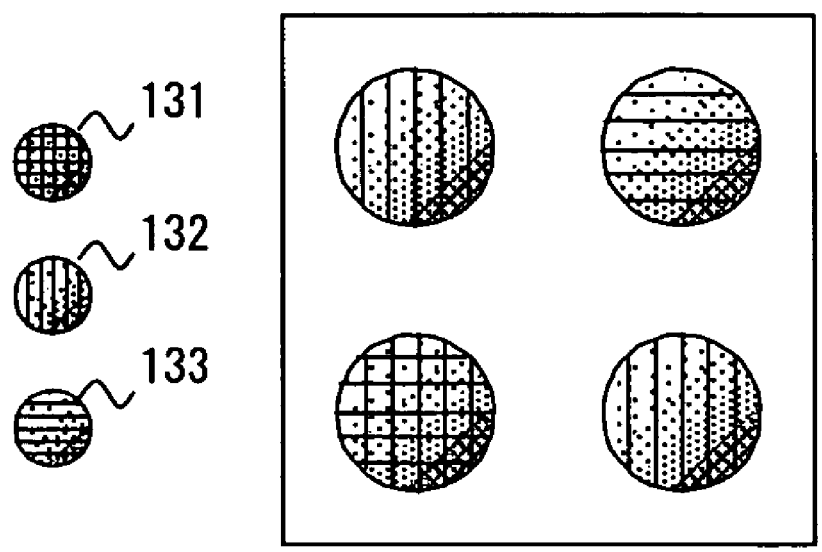
FIG. 47 shows an example of displaying a three-dimensional color image before an area is segmented.
Figure 48:
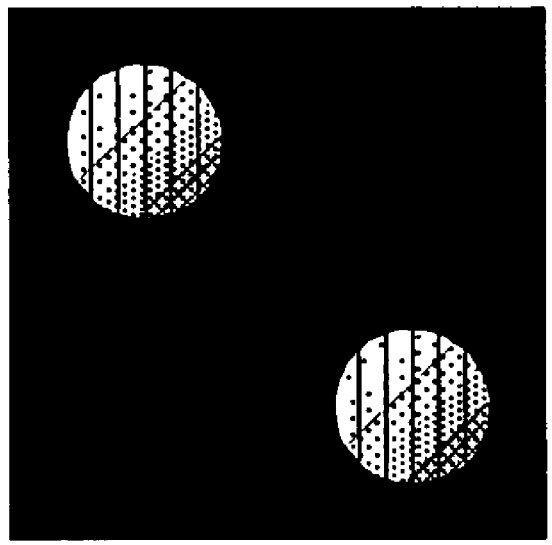
FIG. 48 shows an example of displaying a three-dimensional color image after an area is segmented.
Figure 49:
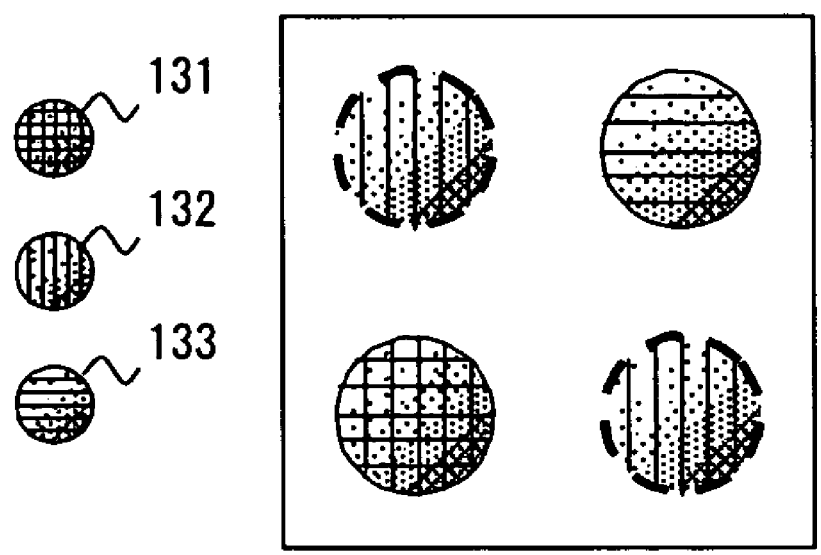
FIG. 49 shows an example of displaying a three-dimensional color image after an area is segmented.

FIGS. 47, 48, and 49 show an example of displaying a three-dimensional color image displayed in this case. FIG. 47 shows an example of displaying the three-dimensional color image before distinguishing the area. FIGS. 48 and 49 show an example of displaying the three-dimensional color image after distinguishing the area. FIG. 48 shows a part of the three-dimensional color image shown in FIG. 45. The example shown in FIG. 48 is an example distinguishing an area as a measuring range from other areas in different colors. In this example, the range represented in black is indicated as the areas of the other ranges. The example shown in FIG. 49 is an example of distinguishing the area as a measuring range displayed as enclosed by dotted lines from the area in the other range. If the areas can be distinguished, other outstanding lines can be used instead of the dotted lines. Furthermore, as another displaying example, the examples shown in FIGS. 48 and 49 can be used in combination. A user can select one of the above-mentioned display of distinguishing an area as a measuring range from other areas, a user can select it.

Back in FIG. 46, in S4605, the process of determining "requested range?" can be performed. That is, it is determined whether or not the area as a measuring range being selected has been determined by a user. If the determination result is YES, then control is passed to step S4606. If it is NO, then control is returned to S4603, and the above-mentioned process is repeated. If the determination is not performed, an updated three-dimensional color image is displayed in S4604 when a color is specified in S4603.

In S4606, the process of "selecting measuring method" is performed. That is, a measurement item is selected according to the designation of a user. A selected measurement item is used in the conventional confocal microscope such as a height measurement (difference measurement), area measurement, coarseness measurement, particle analysis, line width measurement, film thickness measurement, etc.

In S4607, the process of "measurement" is performed. That is, the measurement is performed depending on the measurement item selected in the preceding step on the area of the three-dimensional color image selected as the measuring range in S4603.

In S4608, the process of "displaying measurement result" is performed. That is, the result of the measurement performed in the preceding step is displayed on the display unit of the computer 111, thereby terminating the present process.

The above-mentioned processes are the measuring process according to the seventh embodiment of the present invention. This process is performed by the CPU of the computer 111, thereby selecting the area of the three-dimensional color image having the same colors as the color corresponding to the designation of the user as a measuring range of the sample 120, and the measurement is performed on the measuring range.

In S4603, when the designation of the range of the density, etc. is not issued, the area of the three-dimensional color image having the same color as the color corresponding to the designation relating to the above-mentioned RBG can be selected as a measuring range.

In S4603 in the present flow, not the designation of the range of the density, etc. but the designation of only the density, etc, can be performed. In this case, the area of the three-dimensional color image having the same color as the color corresponding to the designation of the density, etc. is selected as a measuring range.

In S4603, the determined approximate color range can also be displayed on the display unit of the computer 111 as the color information using a color bar, etc.

Furthermore, in S4603 of the present flow, the color contained in the corresponding range, that is, the approximate color range, can be selected by representing the ratio of the primary colors of RBG by numbers, and designating the range of the ratio by numbers.

Additionally, in S4603 of the present flow, the content of each of the plurality of colors RBG can be designated by numbers, the approximate color range of each of the designated colors can be specified, and all colors contained in the approximate color range can be selected.

Figure 50:
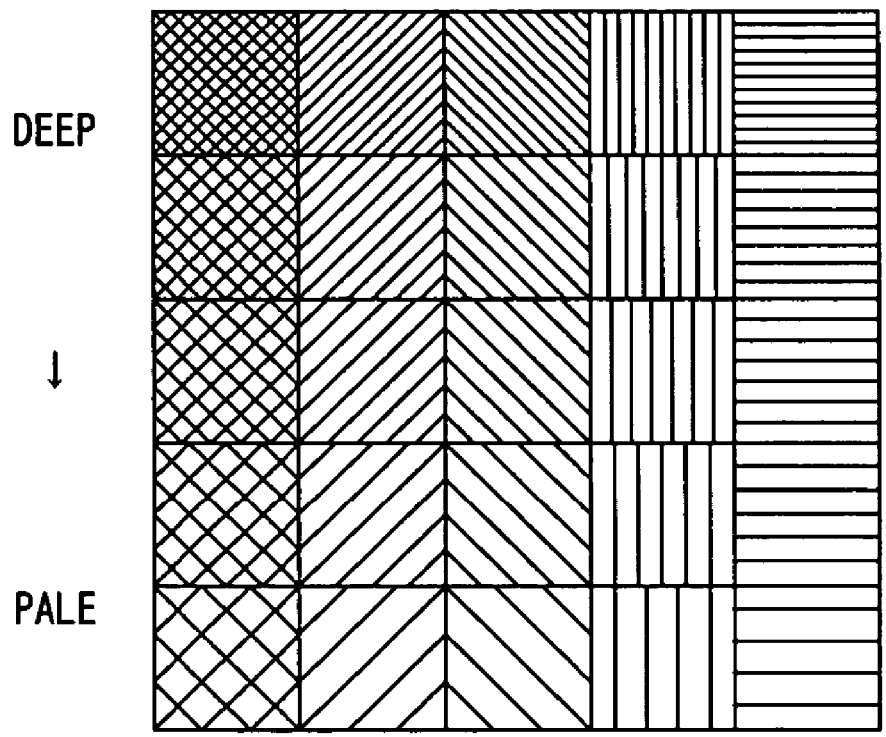
FIG. 50 shows an example of a color palette displayed on the display unit of a computer.

Furthermore, in S4603, the content of the RBG is specified by numbers to designate a color, but a color can be designated by numbers using the above-mentioned color palette. FIG. 50 shows an example of the color palette displayed on the display unit of the computer 111. On the color palette shown in FIG. 50, the upper columns indicate the deeper color. On the other hand, the lower columns indicate the lighter color. The left columns indicate a color containing larger content of red component (R), and the right columns indicate a color containing larger content of blue component (B). In FIG. 50, the central position indicates a color containing larger content of green component (G). By designating a desired color from the above-mentioned color palette, the color can be designated. A plurality of colors can be designated.

Figure 51:
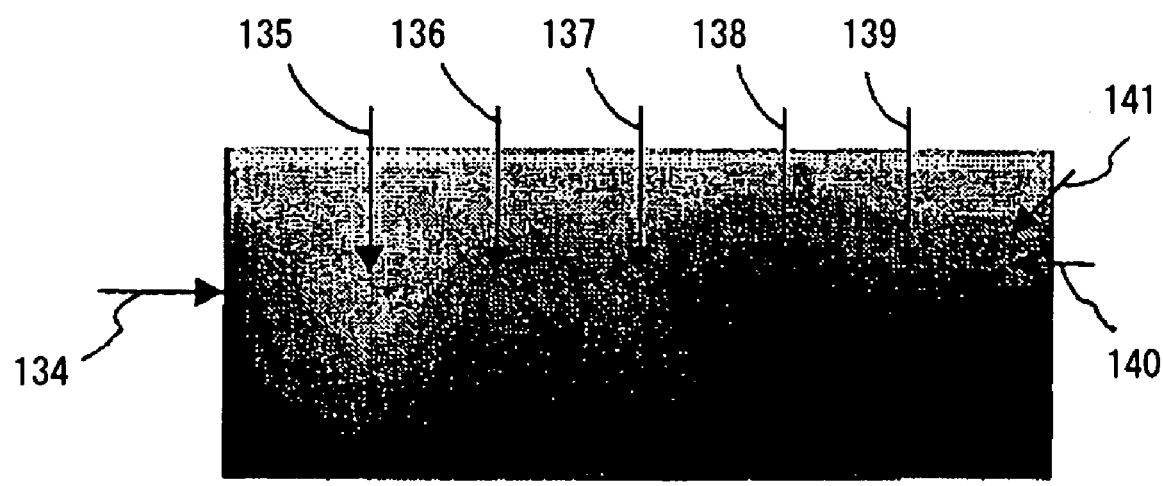
FIG. 51 shows an example of a color map displayed on the display unit of a computer.

In S4603 of the present flow, the color in the approximate color range can be selected by designating the range of the density, etc. of the specified color, but the designation can be performed using a color map. FIG. 51 shows an example of a color map displayed on the computer 10 of the computer 111. For example, the colors indicated by 134, 135, 136, 137, 138, 139 indicate red, yellow, green, blue, purple and pink. When the above-mentioned desired point on the color palette is specified by the user, the color in a predetermined range is selected using the point as the center as an approximate color range. For example, if the point indicated by the arrow 140 is specified, the color in the range indicated by the arrow 141 centering the point is selected as an approximate color range. There can be a plurality of points indicated. In addition, only the color of the point indicated by the user can be selected.

Figure 52:
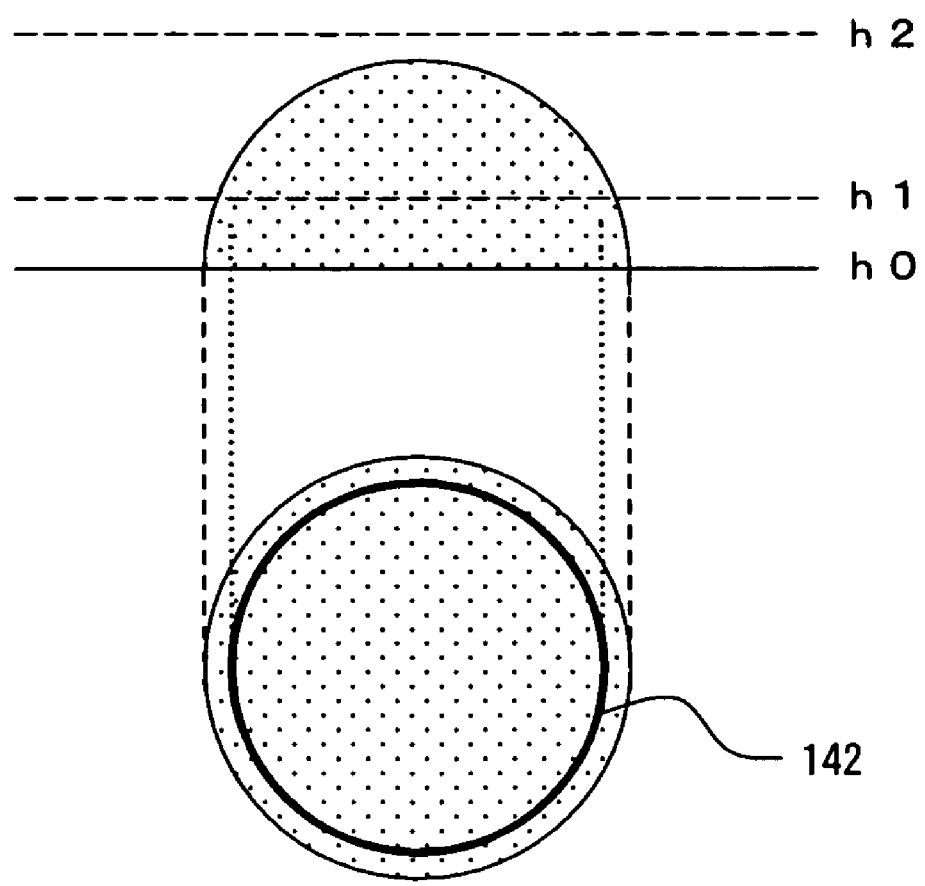
FIG. 52 shows an example of the area as a selected measuring range and the range of a specified height.

In S4607 of the present flowchart, for example, when a measurement is performed relating to the area measurement, particle analysis, etc., not only the area as a measuring range selected in the process in the above-mentioned S4603, but also a height range is specified, and the area as the selected measuring range and a portion corresponding to the range of a specified height can be measured. FIG. 52 shows an example of the area as a selected measuring range and the range of a specified height. The example shown in FIG. 52 shows that h1 to h2 is specified as the height range, and the area 142 indicated by the bold line as the area as the measuring range is selected. Thus, the measurement is performed on the area in the measuring range indicated by the bold line and the portion in the height range (h1~h2).

As described above, according to the seventh embodiment, the user can easily select the area as a measuring range only by specifying the color, thereby reducing the load of the user engaged in a selecting operation of the measuring range.

Eighth Embodiment

The eighth embodiment is different from the seventh embodiment in measuring process. Therefore, the measuring process is mainly described below in detail.

Figure 53:
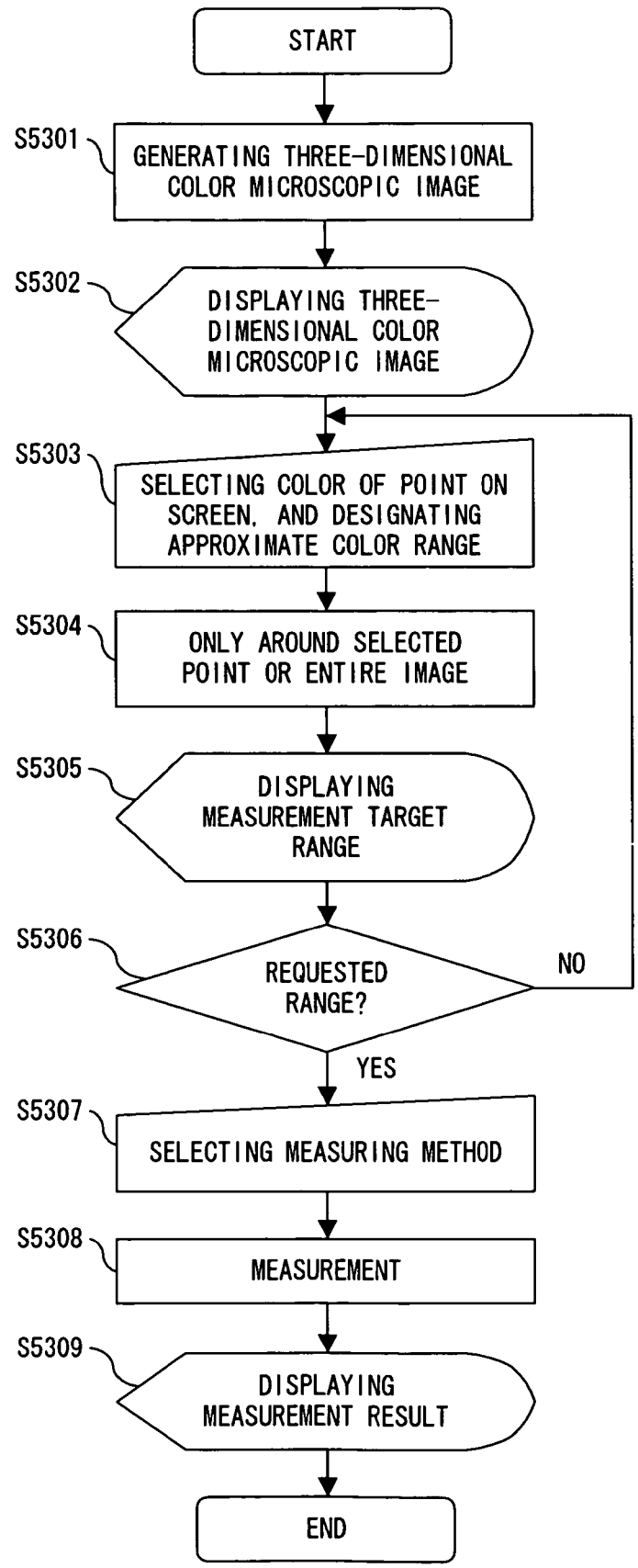
FIG. 53 is a flowchart showing the contents of the measuring process according to the eighth embodiment.

FIG. 53 is a flowchart showing the contents of the measuring process according to the eighth embodiment of the present invention. The measuring process according to the present embodiment is also realized by the CPU of the computer 111 reading and executing the control program stored in the internal memory.

In FIG. 53, in S5301, the process of "generating three-dimensional color microscopic image" is performed. That is, as in the process in S4601 shown in FIG. 46, a three-dimensional color image is generated and obtained.

In S5302, the process of "displaying three-dimensional color microscopic image" is performed. That is, the three-dimensional color image obtained in the preceding step is displayed on the display unit of the computer 111, and displaying is performed relating to the color selection GUI.

The color selection GUI according to the present embodiment has the function of selecting the color contained in a predetermined range having the point at the center which is designated in the displayed three-dimensional color image, etc.

In S5303, the process of "selecting color of point on screen, and designating approximate color range" is performed. That is, a point on the three-dimensional color image is specified by the user through the above-mentioned color selection GUI, and the color contained in a predetermined range having the point at the center which is designated in the three-dimensional color image is selected as the color contained in the approximate color range. In the present step, the range of the density, etc. of the color of the specified point in the three-dimensional color image can be designated by numbers, thereby selecting the color contained in the approximate color range.

In S5304, the process of "only around selected point or entire image" is performed. That is, the user specifies whether the area selected as a measuring range of the sample 120 is defined as an area only in the approximate color range having the point at the center which is designated in the three-dimensional color image in the preceding step, or as an area in the three-dimensional color image having the same color as the color in the approximate color range selected in the preceding step.

In S5305, the process of "displaying a measurement target range" is performed. That is, the three-dimensional color image whose measuring range area and other areas are distinguished depending on the area specified in the preceding step is displayed on the display unit of the computer 111. At this time, the display example is as shown in FIGS. 47 through 49.

In the subsequent processes in S5306 through S5309, the processes similar to those in S4605 through S4608 shown in FIG. 46 are performed.

The above-mentioned processes are measuring processes according to the eighth embodiment, and are performed by the CPU of the computer 111, thereby selecting the area in the approximate color range having the point at the center which is designated by the user, or the area of the three-dimensional color image having the same colors as those contained in the approximate color range as the measuring range of the sample 120, and performing the measurement on the measuring range.

In S5303 in the present flow, the determined approximate color range can also be displayed on the display unit of the computer 111 as color information using the color bar, etc.

In S5303 of the present flow, a plurality of points are designated in the displayed three-dimensional color image, and all colors contained in the predetermined range having each of the plurality of designated points as the center can be selected as the color contained in the approximate color range.

In S5303, the color of the point only can be selected by designating the point of the displayed three-dimensional color image.

According to the above-mentioned eighth embodiment, the user can easily select the area as a measuring range only by designating the point in the three-dimensional color image obtained from the confocal color microscope, thereby reducing the load of the user engaged in selecting operation on the measuring range.

Ninth Embodiment

The ninth embodiment of the present invention is different from the seventh embodiment in measuring process. Therefore, the measuring process is mainly described below in detail.

Figure 54:
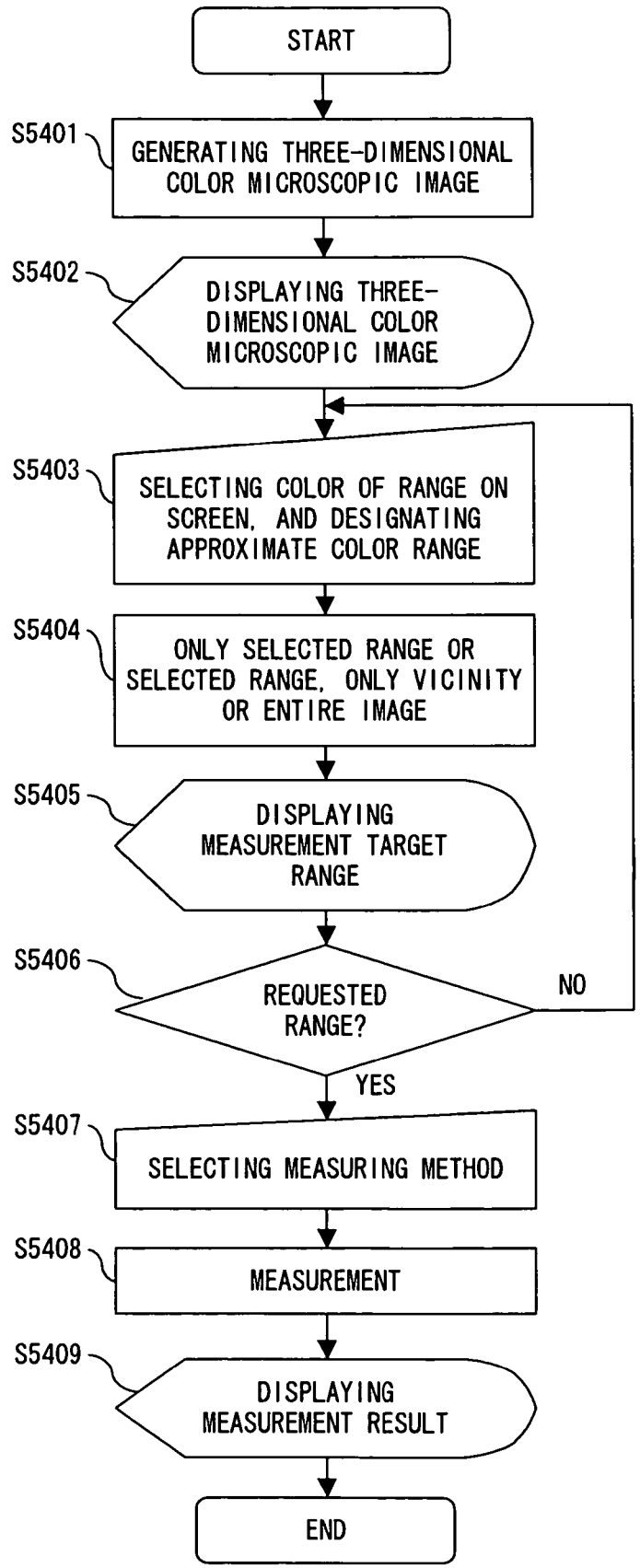
FIG. 54 is a flowchart showing the contents of the measuring process according to the ninth embodiment.

FIG. 54 is a flowchart showing the contents of the measuring process according to the ninth embodiment of the present invention. The measuring process according to the present embodiment is also realized by the CPU of the computer 111 reading and executing the control program stored in the internal memory.

In FIG. 54, in S5401, the process of "generating three-dimensional color microscopic image" is performed. That is, as in the process in S4601 shown in FIG. 46, a three-dimensional color image is generated and obtained.

In S5402, the process of "displaying three-dimensional color microscopic image" is performed. That is, the three-dimensional color image obtained in the preceding step is displayed on the display unit of the computer 111, and displaying is performed relating to the color selection GUI.

The color selection GUI according to the present embodiment has the function of selecting the color contained in a range which is designated in the displayed three-dimensional color image, etc. The designation of the range is performed by, for example, the user enclosing the area in the three-dimensional color image by a straight line, a curve, etc.

In S5403, the process of "selecting color of range on screen, and designating an approximate color range" is performed. That is, as an approximate color range, the user designates the range in the three-dimensional color image through the above-mentioned color selection GUI, and the color contained in the designated approximate color range is selected. Furthermore, when the range of the density, etc. of the color contained in the designated approximate color range is designated by numbers, the color contained in the new approximate color range based on the designation is selected.

In S5404, the process of "only selected range or selected range, only vicinity or entire image" is performed. That is, the user specifies whether the area selected as a measuring range of the sample 120 is defined as an area only in the approximate color range in the three-dimensional color image specified in the preceding step, an area in the three-dimensional color image having the same color as the color in the approximate color range, an area only in a new approximate color range determined by designating by numbers the range of the density, etc. of the color contained in the approximate color range in the three-dimensional color image designated in the preceding step, or an area in the three-dimensional color image having the same color as the color in the new approximate color range.

In S5405, the process of "displaying measurement target range" is performed. That is, the three-dimensional color image whose measuring range area and other areas are distinguished depending on the area designated in the preceding step is displayed on the display unit of the computer 111. At this time, the display example is as shown in FIGS. 47 through 49.

In the subsequent processes in S5406 through S5409, the processes similar to those in S4605 through S4608 shown in FIG. 46 are performed.

The above-mentioned processes are measuring processes according to the ninth embodiment, and are performed by the CPU of the computer 111, thereby selecting the area only in the approximate color range in the approximate color range in the three-dimensional color image specified by the user, the area in the three-dimensional color image having the same colors as those contained in the approximate color range, the area only in the new approximate color range determined by designating by numbers for the range of the density, etc. of the color contained in the approximate color range in the three-dimensional color image specified by the user, or the area in the three-dimensional color image having the same colors as the colors contained in the new approximate color range as the measuring range of the sample 120, and performing the measurement on the measuring range.

In S5403 in the present flow, the determined approximate color range can also be displayed on the display unit of the computer 111 as color information using the color bar, etc.

According to the above-mentioned ninth embodiment, the user can easily select the area as a measuring range only by designating the range in the three-dimensional color image obtained from the confocal color microscope, thereby reducing the load of the user engaged in selecting operation on the measuring range.

In the seventh through ninth embodiments, the measuring process of the three-dimensional color image are described. However, it is obvious that the measuring process can be performed also on the two-dimensional color image.

In the seventh through ninth embodiments, what is displayed on the display unit of the computer 111 can also be displayed on, for example, an external display device, etc.

Additionally, in the seventh through ninth embodiments, the area as the measuring range of the three-dimensional color image and other areas can be inverted so that the other areas can be the area as the measuring range.

In the seventh through ninth embodiments, the area of the measuring range of the three-dimensional color image can be enlarged or reduced in several pixel units.

Furthermore, in the seventh through ninth embodiments, the measuring process can be automatically performed by designating the color, the measurement item, etc. in advance.

In the seventh through ninth embodiments, when the area enclosed by the area as the measuring range of the three-dimensional color image contains an area not recognized as a measuring range, and when the area not recognized as a measuring range is only small, the area including the area not recognized as the measuring range can be defined as the measuring range.

Additionally, in the seventh through ninth embodiments, the configuration shown in FIG. 43 is applied as an example of a confocal color microscope. However, a confocal color microscope with another configuration in which a three-dimensional color image can be obtained can also be applied. For example, a confocal disk scanning microscope can be applied as a confocal color microscope. In addition, an XY stage for moving the sample 120 perpendicular to the optical axis can be used as a scanning mechanism for relatively scanning the surface of the sample 120 using the converged light by the objective lens 115. Furthermore, a mechanism for moving the objective lens 115 can be used instead of the Z stage 119 for moving the position of the sample 120 as a moving mechanism for relatively moving the converging position of the objective lens 115 and the position of the sample 120. Additionally, the stage on which the sample 120, etc. are mounted can be manually operated. A manually operated sample feed device can be provided for the confocal color microscope, or an automatically operated sample feed device is provided so that the above-mentioned measuring process can be automatically performed on a plurality of samples. However, in this case, a color and a measurement item are designated in advance. Furthermore, if no display is performed on the display unit during the measuring process, the time taken for the measuring process on one sample can be shortened. Furthermore, other means can replace the color CCD 126 to obtain a color image.

Figure 42:
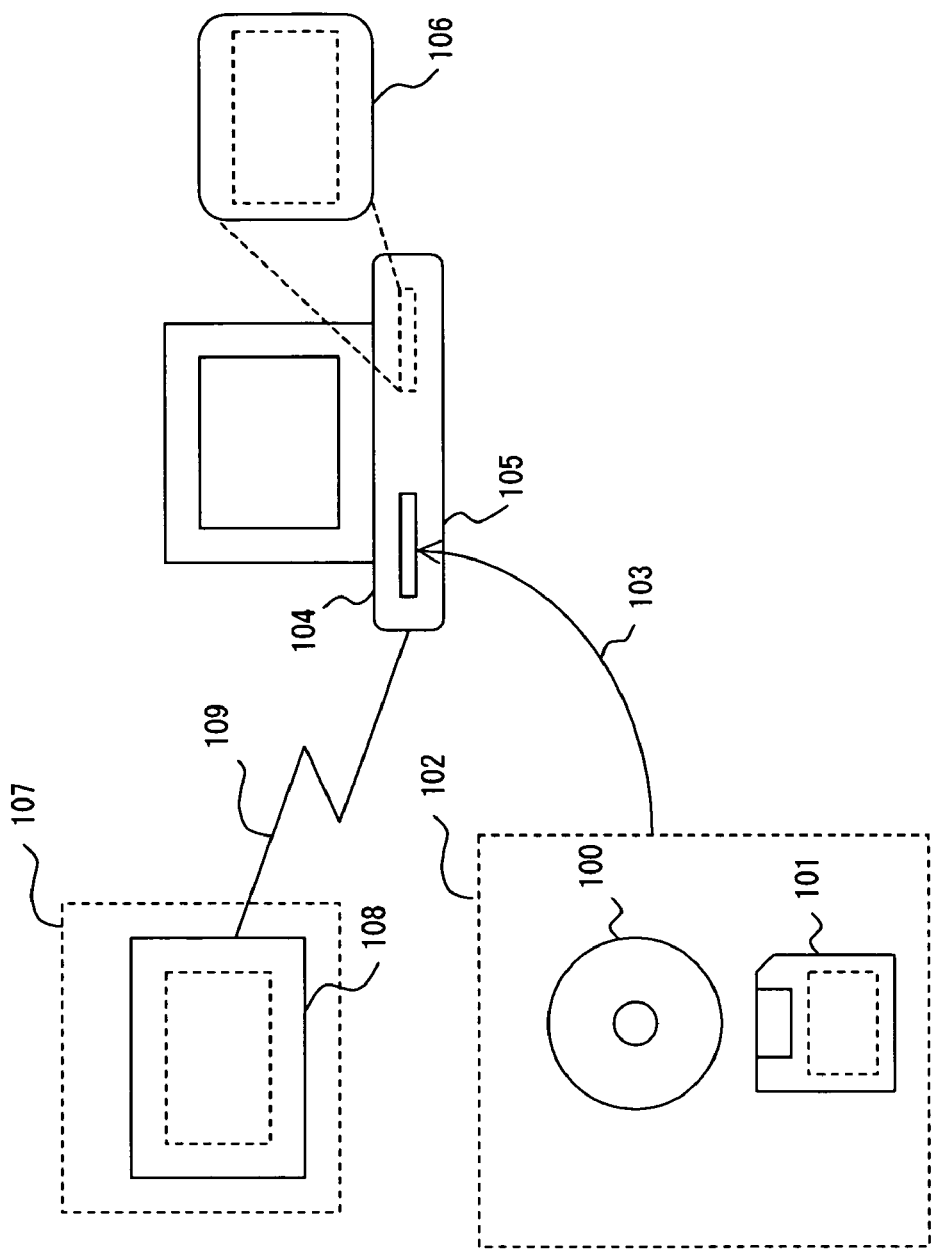
FIG. 42 shows an example of the storage medium storing a control program.

In the seventh through ninth embodiments, the controlling process performed by the CPU of the computer 111 of the confocal color microscope can also be executed by a computer as shown in FIG. 42. In this case, the control program stored in the internal memory of the computer 111 of the confocal color microscope can be stored in a portable storage medium 102 such as CD-ROM 100, a flexible disk 101 (or MO, DVD, CD-R, CD-RW, removable hard disk, etc.), the inserted (arrow 103) portable storage medium 102 can be read by a medium drive device 105 of a computer 104, a read control program can be stored in internal memory (RAM, ROM, hard disk, etc.) 106 of the computer 104, and the control program can be executed by the computer 104. Otherwise, the control program can be stored in a storage unit (database, etc.) 108 in an external device (server, etc.) 107 of an information provider, transferred to the computer 104 in the communications through a network circuit 109, stored in the memory 106, and executed by the computer 104. The control program stored in the above-mentioned units can be executed only for a part of the controlling process performed by the CPU of the computer 111 of the confocal color microscope.

As described above, according to the seventh through ninth embodiments, the user can easily select the area of the confocal microscopic image having color information as the measuring range of a sample only by specifying the color information, and the load of the user engaged in selecting an area as a measuring range can be reduced. Furthermore, if color information is specified in advance, the measuring process can be automatically performed.

The confocal scanning microscope, the image generating method, the three-dimensional measuring method, the measuring range selecting method, etc. are described above in detail, but the present invention is not limited to the above-mentioned embodiments, and can include various improvements and amendments within the scope of the gist of the present invention.

As described above in detail, according to the present invention, a high-precision three-dimensional image can be obtained, and the color information about the sample surface can be regenerated. Furthermore, the color information about the sample surface obtained through a confocal optical system can be easily compared with the actual sample. In addition, the load of the user engaged in selecting an area of the three-dimensional image obtained from the confocal scanning microscope as a measuring range of a sample can be successfully reduced.

What is claimed is:

1. A confocal scanning microscope for generating a three-dimensional image or an image having a large depth of focus of a sample by obtaining an observed image of the sample while moving a focal-plane of the sample in an optical axial direction, comprising:

a capture means for performing a photoelectric conversion on light from the sample and outputting a plurality of brightness signals of different wavelength bands of light;

a selection means for selecting a brightness signal of an optimum wavelength band from among the plurality of brightness signals of different wavelength bands of light output from said capture unit; and an image forming means for generating a three-dimensional image or an image having a large depth of focus of the sample using only the brightness signal of the optimum wavelength band selected by said selection unit;

wherein said capture means is a color image pickup device and the selection means generates an I-Z curve for each R, G, and B brightness signal of a predetermined pixel or pixels in a predetermined area of the color image pickup device, and selects any of the R, G, and B brightness signals on the basis of peak brightness of the generated I-Z curve for each of the R, G, and B brightness signals.

2. The microscope according to claim 1, wherein said image forming means obtains a highest brightness of the brightness signal of the optimum wavelength band and a position in the z direction which is a position for the highest brightness in the optical axial direction for each pixel of an image pickup device of said capture unit, and generates a three-dimensional image or an image having a large depth of focus of the sample using the highest brightness and the position in the z direction.

3. The microscope according to claim 1, wherein:

said selection means selects the brightness signal of the optimum wavelength band for each pixel of an image pickup device of said capture means; and said image forming means corrects the position in the z direction which is a position in the optical axial direction according to chromatic aberration information among wavelength bands of the plurality of brightness signals.

4. The microscope according to claim 1, further comprising a plurality of color filters, wherein said plurality of brightness signals are obtained by switching said plurality of color filters.

5. A confocal scanning microscope for generating a three-dimensional image or an image having a large depth of focus of a sample by obtaining an observed image of the sample while moving a focal-plane of the sample in an optical axial direction, comprising:

a mask pattern member means for changing and operating in a predetermined pattern;

an illumination unit for emitting illuminating light;

an objective lens for forming an image of the illuminating light emitted from said illumination unit on the sample through said mask pattern member;

a capture means for performing a photoelectric conversion on a reflected light from the sample and outputting a plurality of brightness signals of different wavelength bands of light;

a selection means for selecting a brightness signal of an optimum wavelength band from among the plurality of brightness signals of different wavelength bands of light processed in a photoelectric conversion and output by said capture unit; and an image forming means for generating a three-dimensional image or an image having a large depth of focus of the sample using only the brightness signal of the optimum wavelength band selected by said selection unit;

wherein said capture means is a color image pickup device and the selection means generates an I-Z curve for each R, G, and B brightness signal of a predetermined pixel or pixels in a predetermined area of the color image pickup device, and selects any of the R, G, and B brightness signals on the basis of peak brightness of the generated I-Z curve for each of the R, G, and B brightness signals.

6. The microscope according to claim 5, wherein said image forming means obtains a highest brightness of the brightness signal of the optimum wavelength band and a position in the z direction which is a position for the highest brightness in the optical axial direction for each pixel of an image pickup device of said capture means, and generates a three-dimensional image or an image of a large depth of focus of the sample using the highest brightness and the position in the z direction.

7. The microscope according to claim 5, wherein:

said selection means selects the brightness signal of the optimum wavelength band for each pixel of an image pickup device of said capture means; and said image forming means corrects the position in the z direction which is a position in the optical axial direction according to chromatic aberration information among wavelength bands of the plurality of brightness signals.

8. The microscope according to claim 5, further comprising a plurality of color filters, wherein said plurality of brightness signals are obtained by switching said plurality of color filters.

9. The microscope according to claim 5, wherein said mask pattern member is a pinhole disk or a slit disk.

10. The microscope according to claim 5, wherein said mask pattern member is a liquid crystal panel in which light can be controlled to be passed or cut off by changing a predetermined pattern.

* * * * *